US 6,680,746 B2

(12) United States Patent
Kawai et al.

(10) Patent No.: US 6,680,746 B2
(45) Date of Patent: *Jan. 20, 2004

(54) APPARATUS AND METHOD FOR CONTROLLING CONFIGURATION OF VIDEO CAMERA

(75) Inventors: Tomoaki Kawai, Yokohama (JP); Kazuko Tsujimura, Kawasaki (JP); Takashi Oya, Yokohama (JP)

(73) Assignee: Canon Kabushiki Kaisha (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/563,703

(22) Filed: Nov. 28, 1995

(65) Prior Publication Data

US 2002/0067412 A1 Jun. 6, 2002

(30) Foreign Application Priority Data

| Nov. 28, 1994 | (JP) | ............................................. 6-292525 |
| Nov. 30, 1994 | (JP) | ............................................. 6-296681 |
| Mar. 9, 1995  | (JP) | ............................................. 7-049764 |
| Jun. 12, 1995 | (JP) | ............................................. 7-144460 |

(51) Int. Cl.⁷ ............................ H04N 5/232; H04N 7/14
(52) U.S. Cl. ................................ 348/211.9; 348/14.07; 348/14.09; 348/211.3; 348/211.8; 348/211.13
(58) Field of Search .......................... 348/20, 135, 139, 348/141, 143, 159, 207, 211, 212, 213, 218, 222, 239, 333, 334; H04N 7/18, 9/47, 5/232, 5/262

(56) References Cited

U.S. PATENT DOCUMENTS

| 4,037,250 A | 7/1977 | McGahan et al. .......... 348/159 |
| 4,507,683 A | 3/1985 | Griesshaber et al. |
| 4,516,156 A | 5/1985 | Fabris et al. ................... 348/15 |
| 4,527,201 A | 7/1985 | Cappels ....................... 348/334 |
| 4,989,085 A | * 1/1991 | Elberbaum ................... 348/159 |
| 4,992,866 A | * 2/1991 | Morgan ........................ 348/14 |
| 5,111,288 A | 5/1992 | Blackshean ................. 348/143 |
| 5,182,641 A | * 1/1993 | Diner .......................... 348/113 |

(List continued on next page.)

FOREIGN PATENT DOCUMENTS

| EP | 0 513 601 A1 | 11/1992 | ......... G08B/13/196 |
| EP | 0513601 | * 11/1992 | ......... G08B/13/196 |
| WO | WO 93/06690 | 4/1993 | .......... H04N/5/232 |
| WO | WO 94/24813 | 10/1994 | .......... H04N/5/222 |

OTHER PUBLICATIONS

N. Thouvenot, "Urban Video Surveillance System," 1225 Electrical Communication, pp. 143–147, Published 2nd Quarter 1994.

European Search Report in corresponding foreign application EP95 30 8464 which cites the references disclosed in this Form PTO–1449.

Primary Examiner—Ngoc-Yen Vu
(74) Attorney, Agent, or Firm—Morgan & Finnegan, LLP

(57) ABSTRACT

A camera control system for displaying a video image inputted from a plurality of cameras, wherein in order to easily control each camera, a map showing positions of cameras is prepared. Along with the map, icons indicating the positions of cameras are displayed on the map so that that the directions of the cameras can be identified on the map. An operator is able to select a camera referring to the map and see the video image of the selected camera. When each of the cameras is to be operated, an operator uses a pointing device to operate an icon for a camera on the map. In this camera control system, a camera corresponding to each icon can be controlled for zooming, panning, tilting and focusing by operating the icon for each camera. An operator may delete, add or move the icon for a camera according to an actual structure of the camera system.

76 Claims, 51 Drawing Sheets

U.S. PATENT DOCUMENTS

| | | | |
|---|---|---|---|
| 5,237,408 A | 8/1993 | Blum et al. | 348/154 |
| 5,241,379 A | 8/1993 | Tsujita | 348/157 |
| 5,258,837 A * | 11/1993 | Gormley | 348/211 |
| 5,396,287 A * | 3/1995 | Cho | 348/211 |
| 5,412,708 A | 5/1995 | Katz | 348/14.05 |
| 5,479,206 A * | 12/1995 | Ueno et al. | 348/211 |
| 5,508,737 A * | 4/1996 | Lang | 348/159 |
| 5,652,849 A * | 7/1997 | Conway | 348/115 |
| 5,657,246 A * | 8/1997 | Hogan | 348/14 |
| 5,757,418 A * | 5/1998 | Inagaki | 348/15 |
| 5,825,432 A * | 10/1998 | Yonezawa | 348/153 |
| 5,872,594 A | 2/1999 | Thompson | 348/213 |
| 6,002,995 A * | 12/1999 | Suzuki | 348/211 |

\* cited by examiner

| CAMERA NUMBER | POSITION (x, y) | POINTING DIRECTION (deg.) |
|---|---|---|
| 1 | (100, 200) | 25 |
| 2 | (57, 30) | 75 |
| 3 | (24, 130) | 135 |
| ⋮ | ⋮ | ⋮ |

FIG. 7

| CAMERA NUMBER | APPARATUS ADDRESS | MAP NAME | POSITION (x, y) | POINTING DIRECTION |
|---|---|---|---|---|
| 1 | 150.61.31.1 | OfficeA | (100, 200) | 25 |
| 2 | 150.61.31.1 | OfficeA | (57, 30) | 75 |
| 3 | 150.61.31.1 | OfficeA | (24, 130) | 135 |
| 4 | 150.61.31.2 | OfficeB | (100, 250) | 25 |
| 5 | 150.61.31.2 | OfficeB | (100, 270) | 245 |
| 6 | 150.61.31.3 | OfficeC | (300, 400) | 220 |
| 7 | 150.61.31.3 | OfficeC | (340, 450) | 210 |
| ⋮ | ⋮ | ⋮ | ⋮ | ⋮ |

— · — CENTRAL LINE

— · — CENTRAL LINE

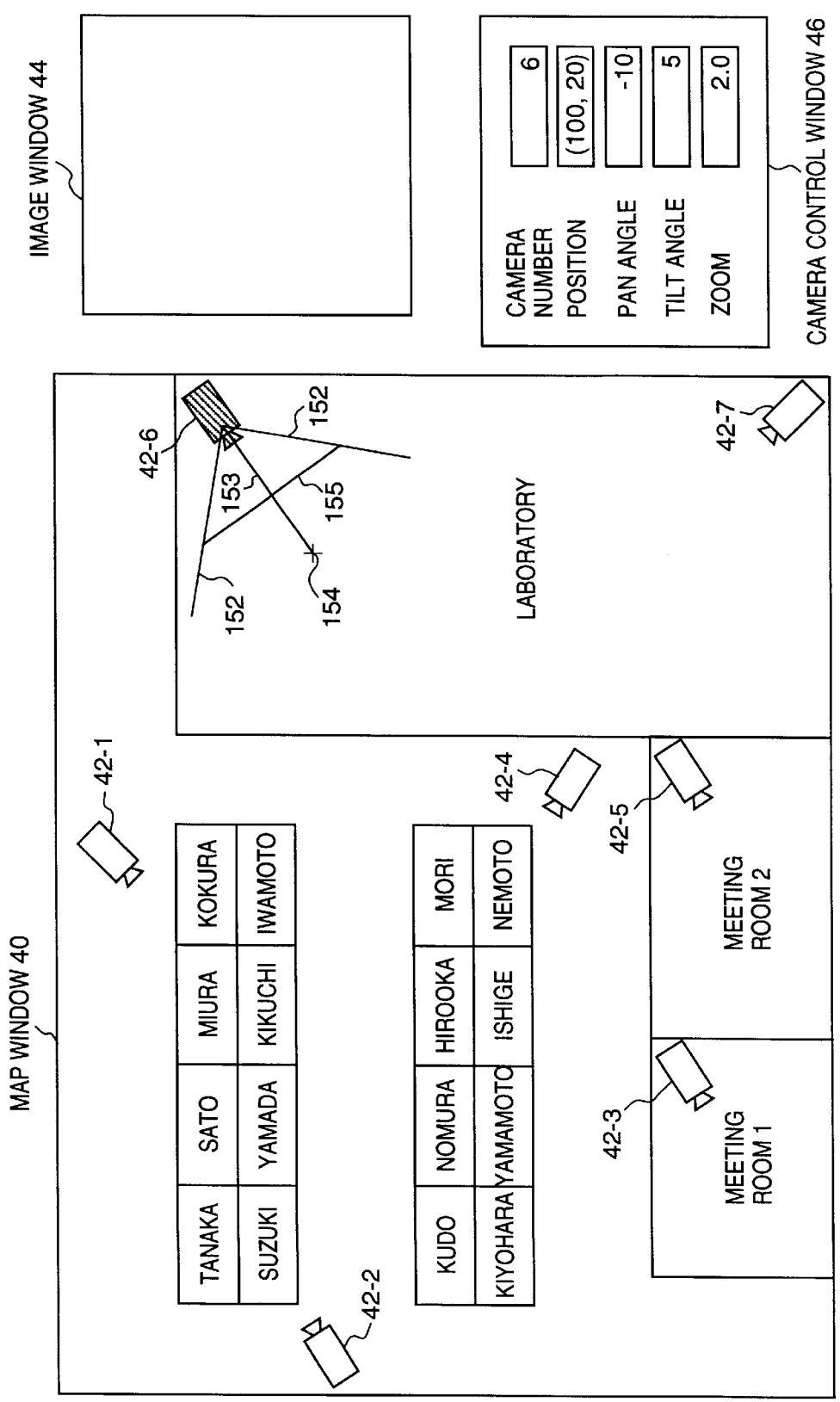

FIG. 19

```
typedef struct camera_in {
    double  tilt_angle ;
    double  pan_angle ;
    int     zoom ;
} camera_in ;

typedef struct func_out {
    int     ret ;
} func_out ;

CLIENT *camera_open (char *host) ;
void *camera_close (CLIENT *cl) ;

func_out *camera_pan_pos_1(camera_in *, CLIENT *cl) ;
func_out *camera_tilt_pos_1(camera_in *, CLIENT *cl) ;
func_out *camera_zoom_pos_1(camera_in *, CLIENT *cl) ;
```

FIG. 20

```
typedef struct host_name {
    char name [MAXNAME] ;
} host_name ;

void append_camera_list_1(host_name *, CLIENT *cl) ;
void delete_camera_list_1(host_name *, CLIENT *cl) ;
``` camera_in :
tilt_angle
pan_angle 
zoom func_out :
ret

FIG. 24

```
typedef struct access_in {
    char target_name [MAXNAME] ;
    char user_name [MAXNAME] ;
} access_in ;

func_out *access_begin_1(access_in *,CLIENT *cl) ;
func_out *access_end_1((access_in *,CLIENT *cl) ;
```

```
typedef struct change_in {
    char target_name [MAXNAME] ;
    int  access_mode ;
} change_in ;

func_out *change_access_mode_1(change_in *,CLIENT *cl) ;
```

FIG. 37

| CAMERA NUMBER | SETTING POSITION (x, y) | SETTING DIRECTION | CONTROL CHARACTER-ISTICS | MAXIMUM FIELD ANGLE | MAXIMUM PAN ANGLE | MAXIMUM ZOOM RATIO |
|---|---|---|---|---|---|---|
| 1 | (100, 200) | 90 | 0 | 120 | 180 | 8.0 |
| 2 | (57, 30) | 290 | 2 | 100 | — | — |
| 3 | (20, 200) | 45 | 2 | 60 | — | — |
| 4 | (40, 100) | 90 | 1 | 90 | — | 4.0 |
| 5 | (80, 100) | 270 | 0 | 120 | 180 | 4.0 |
| 6 | (80, 300) | 180 | 1 | 80 | — | 8.0 |
| 7 | (125, 50) | 100 | 2 | 100 | — | — |
| 8 | (200, 321) | 10 | 0 | 90 | 120 | 2.0 |

CONTROL CHARACTERISTICS
  0: ROTATION/ZOOM CONTROLLABLE
  1: ZOOM CONTROLLABLE
  2: UNCONTROLLABLE

FIG. 38

| CAMERA NUMBER | CURRENT CAMERA DIRECTION | CURRENT ZOOM RATIO |
|---|---|---|
| 1 | 27 | 8.0 |
| 2 | — | — |
| 3 | — | — |
| 4 | — | 4.0 |
| 5 | 225 | 1.0 |
| 6 | — | 4.0 |
| 7 | — | — |
| 8 | 104 | 1.5 |

FIG. 44

| CAMERA NUMBER | APPARATUS ADDRESS | MAP NAME |
|---|---|---|
| 1 | 150.61.31.1 | OfficeA |
| 2 | 150.61.31.2 | OfficeA |
| 3 | 150.61.31.3 | OfficeB |
| 4 | 150.61.31.4 | OfficeB |
| 5 | 150.61.31.4 | OfficeB |
| 6 | 150.61.31.4 | OfficeB |
| 7 | 150.61.31.2 | OfficeA |
| 8 | 150.61.31.2 | OfficeA |

F I G. 48

| CAMERA NAME | SETTING POSITION (x, y, z) | INITIAL DIRECTION (PAN, TILT) |
|---|---|---|
| CAMERA 1-1 | (250, 30, 120) | (50, 10) |
| CAMERA 1-2 | (50, 30, 100) | (20, 25) |
| CAMERA 1-3 | (160, 30, 90) | (-10, -5) |
| ------ | ------------ | --------- |

FIG. 53

| MAP INFORMATION (ID) | FLOOR NAME | BIT-MAP FILE NAME | SIZE OF BIT MAP |
|---|---|---|---|
| 001 | A-26F | a26f.bmf | 350 × 200 |
| 002 | A-19F | a19f.bmf | 400 × 250 |
| 003 | B-3F | b3f.bmf | 380 × 200 |
| ---- | ---- | ------- | ------- |

FIG. 54

| CAMERA NAME | SETTING PLACE NAME | SETTING POSITION (x, y, z) | INITIAL DIRECTION (PAN, TILT) |
|---|---|---|---|
| CAMERA 1-1 | A-26F | (250, 30, 120) | (50, 10) |
| CAMERA 1-2 | A-26F | (50, 30, 100) | (20, 25) |
| CAMERA 1-3 | B-3F | (160, 30, 90) | (-10, -5) |
| ------ | ---- | ------------ | --------- |

APPARATUS AND METHOD FOR CONTROLLING CONFIGURATION OF VIDEO CAMERA

BACKGROUND OF THE INVENTION

The present invention relates to a camera controller and, more particularly, to a camera controller including at least one video camera in which panning, tilting, zooming, and the like can be controlled.

A plurality of video cameras whose panning, tilting, zooming, and the like can be externally controlled are often equipped as monitor cameras or the like. When a plurality of cameras are remote-controlled by a single controller, a single video camera as an object to be operated is selected by a serial number, a name, or the like that can identify each camera, and the selected video camera is panned, tilted, zoomed, or the like by operating, e.g., up, down, right, and left buttons on an operation panel shown in FIG. 16 while observing an image picked up by the selected video camera.

However, it is often difficult to recognize a camera to be controlled by only its name and an image more specifically, it is not easy for an operator to recognize the relationship between an like and the position and direction of a camera by observing the image.

In such a camera symbol display system, it is desirable that a user himself or herself can change the initial setting state of the system upon a change in layout of cameras or upon addition of a new map. It is very troublesome to ask a system manager of a network for executing such a change each time a change is required. Since the camera control system must be temporarily stopped to change the initial setting state, and must be restarted after the change, other users cannot use the system during this interval.

SUMMARY OF THE INVENTION

The present invention has been made in consideration of the above-mentioned situation, and has as its object to provide a camera control system which allows a user to visually recognize the system state.

It is another object of the present invention to provide a camera control system which allows an easy change of the system configuration.

In order to achieve the above object, a video controller according to the present invention comprises the following arrangement. That is, a video controller for controlling a video input operation, comprises:

video input means including at least one externally controllable input unit;

selection means for selecting one of the input units, and receiving an image input from the selected input unit;

video display means for displaying the image input from the input unit selected by the selection means;

map display means for displaying a map indicating a target video input region of the video input means, and displaying, on the map, each of the input units as a predetermined symbol in correspondence with a position of the input unit;

operation means for operating the symbol on a display screen; and control means for controlling the input unit corresponding to the operated symbol in accordance with operation result of the symbol by the operation means.

A video control system according to the present invention comprises the following arrangement. That is, a video control system for controlling a video input device connected to a network, comprises:

a client apparatus which is connected to the network, requests use of a desired video input device, and controls the video input device to receive an image when the client apparatus is connected to the video input device; and a management apparatus for managing a connection state between the client apparatus and the video input device, wherein upon receiving a request from the client apparatus, the management apparatus checks if a predetermined condition is satisfied, and if it is determined that the condition is satisfied, the management apparatus permits the client apparatus to use the video input device.

A camera controller according to the present invention comprises the following arrangement. That is, a camera controller comprises:

at least one externally controllable camera;

selection means for selecting one of the cameras and receiving an image input from the selected camera;

video display means for displaying the image input from the camera selected by the selection means;

map display means for displaying a map of a region where the cameras are disposed, and displaying, on the map, each of the cameras as a predetermined symbol in correspondence with a position of the camera;

operation means for operating the symbol on a display screen; and control means for controlling the camera corresponding to the operated symbol in accordance with an operation result of the symbol.

A camera control method according to the present invention comprises the following arrangement. That is, a camera control method for controlling a remote camera, comprises:

the display step of displaying a map, and displaying symbols of cameras on the map;

the selection step of selecting a desired symbol from the symbols;

the step of displaying an image input from the camera corresponding to the symbol selected in the selection step; and the change step of changing a state including a pan angle of the camera selected in the selection step.

Alternatively, a camera control method for controlling a remote camera, comprises:

the step of reading an initial setting state;

the display step of displaying a map and displaying symbols of cameras on the map on the basis of the initial setting state;

the operation step of performing operations including addition, deletion, change of position, and change of direction of the symbol by operating the symbol using coordinate indication means; and the step of storing the symbol operated in the operation step as the initial setting state.

A camera management method according to the present invention comprises the following arrangement. That is, a camera management method for managing an access to a remote camera, comprises:

the step of identifying a request destination apparatus on the basis of an access request to the camera;

the first discrimination step of discriminating if an access source of the access request is permitted to access the camera of an access destination;

the second discrimination step of discriminating if the camera corresponding to the access request is in use when it is determined in the first discrimination step that the access source is permitted to access the camera;

the step of making an access to the camera when the camera is not in use;

the request step of issuing a change request of a condition for permitting an access in the first discrimination step; and the step of changing a table, which is looked up in the first discrimination step, and registers permission or non-permission of access requests of access request source apparatuses in units of cameras, in correspondence with the change request.

Alternatively, a camera management method for managing an access to a remote camera, comprises:

the step of identifying a request destination apparatus on the basis of an access request to the camera;

the discrimination step of discriminating, with reference to a table, which registers permission or non-permission of access requests of access request source apparatuses in units of cameras, if an access source of the access request is permitted to access the camera of an access destination;

the step of receiving a change request of the table, and identifying a request source of the change request; and the step of changing permission or non-permission of the access in the table corresponding to the request source of the change request in correspondence with the change request.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 is a table showing an example of the contents of camera position information used when the first embodiment is applied to a network;

FIG. 14 is a view showing a display example of a map in the second embodiment;

FIG. 19 shows a function for calling a camera control server 41;

FIG. 20 shows a function for registering/deleting a user;

FIG. 24 shows an example of a program, i.e., a function for performing access processing;

FIG. 37 is a table showing the structure of a camera information file and an example of data;

FIG. 38 is a table showing the structure of a camera state table and an example of data;

FIG. 44 is a table showing additional information used when the fourth embodiment is applied to a network;

FIG. 48 is a table showing an example of the configuration of a camera initial setting file;

FIG. 53 is a table showing an example of map information;

FIG. 54 is a table showing an example of camera initial setting information;

DESCRIPTION OF THE PREFERRED EMBODIMENTS

First Embodiment

The first embodiment of the present invention will be described in detail below with reference to the accompanying drawings.

Figure 1:
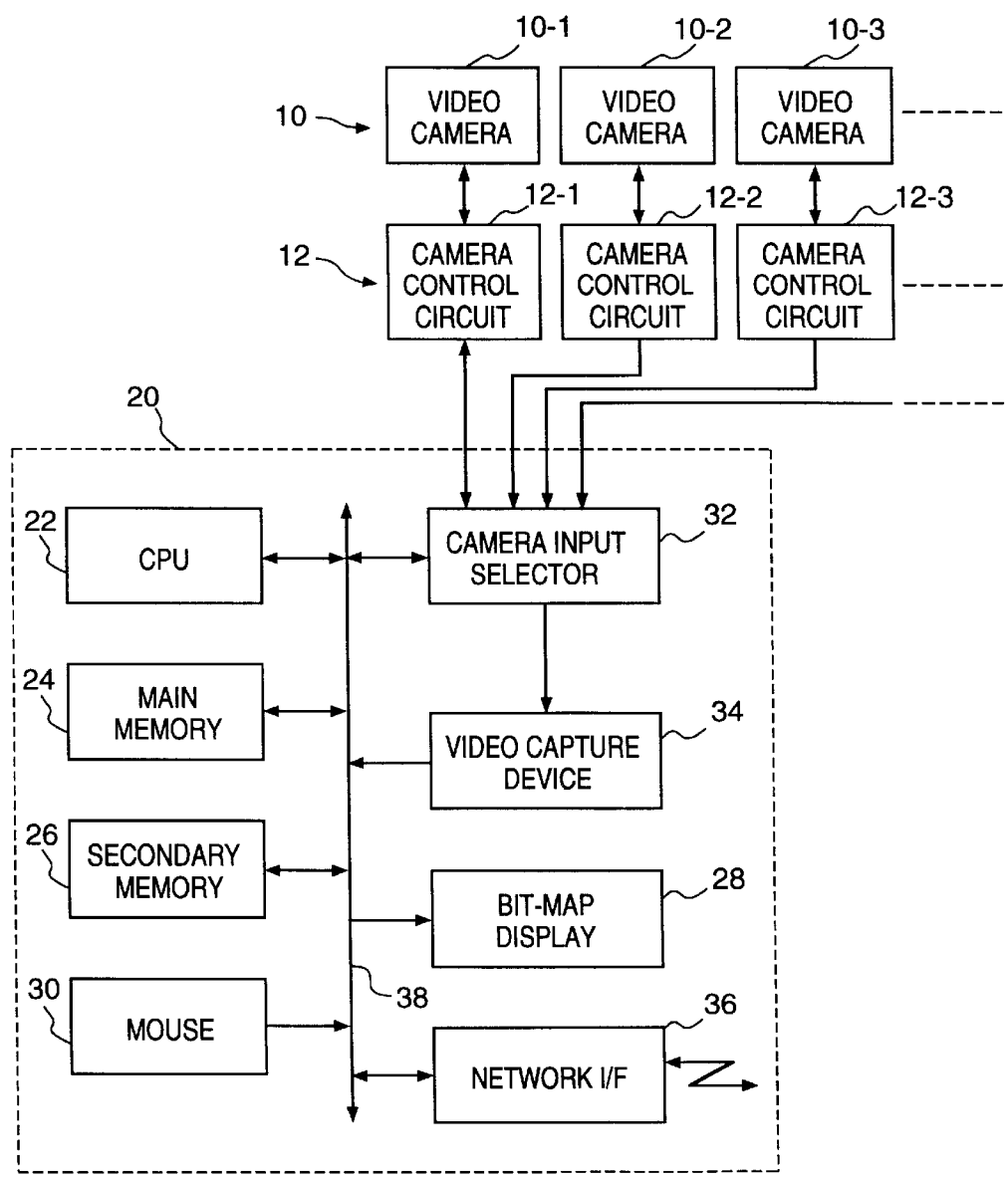
FIG. 1 is a schematic block diagram showing the arrangement according to the first embodiment of the present invention.

FIG. 1 is a schematic block diagram showing the arrangement of a camera control system according to the first embodiment of the present invention. Camera control circuits 12 (12-1, 12-2, 12-3 . . . ) directly control panning, tilting, zooming, focusing, diaphragm setting, and the like of video cameras 10 (10-1, 10-2, 10-3, . . . ) in accordance with external control signals. As control signal lines, for example, RS-232C interfaces may be used. However, the present invention is not limited to them.

A camera operation unit 20 is a computer system for controlling the video cameras 10 by supplying control commands to the camera control circuits 12. A CPU 22 controls the entire apparatus. A main memory 24 and a secondary memory 26 (e.g., a hard disk) store programs to be executed by the CPU 22, data, and the like. A bit-map display 28 displays an image such as a map (to be described later). A mouse 30 is a pointing device for indicating a position on the display 28.

A camera selector 32 selects one of the plurality of video cameras 10. The selected camera is operated under the control of the camera operation unit 20. A video capture device 34 captures an output video signal from the video camera 10 selected by the camera selector 32. A network interface 36 connects the camera operation unit 20 to a computer network or a communication network. A system bus 38 connects the respective devices (the CPU 22 to the network interface 36) to each other. A camera control signal can be supplied to the camera operation unit 20 via the network by the network interface 36, thus controlling the cameras 10.

The camera selector 32 selects one of the control signal lines and video outputs connected to the plurality of camera control circuits 12, supplies the selected video output to the video capture device 34, and logically connects the selected control signal line to the bus 38. As the format of a video signal, for example an NTSC signal of the luminance color difference separation method is known. The video capture device 34 captures the video output selected by the camera selector 32. The captured video signal is displayed as a motion image on a predetermined window of the bit-map display 28.

The secondary memory 26 stores map data indicating the layout diagram of the cameras 10, camera position information data indicating the position information of each camera 10, icon (camera icon) data for specifying each camera 10, and the like.

Figure 2:
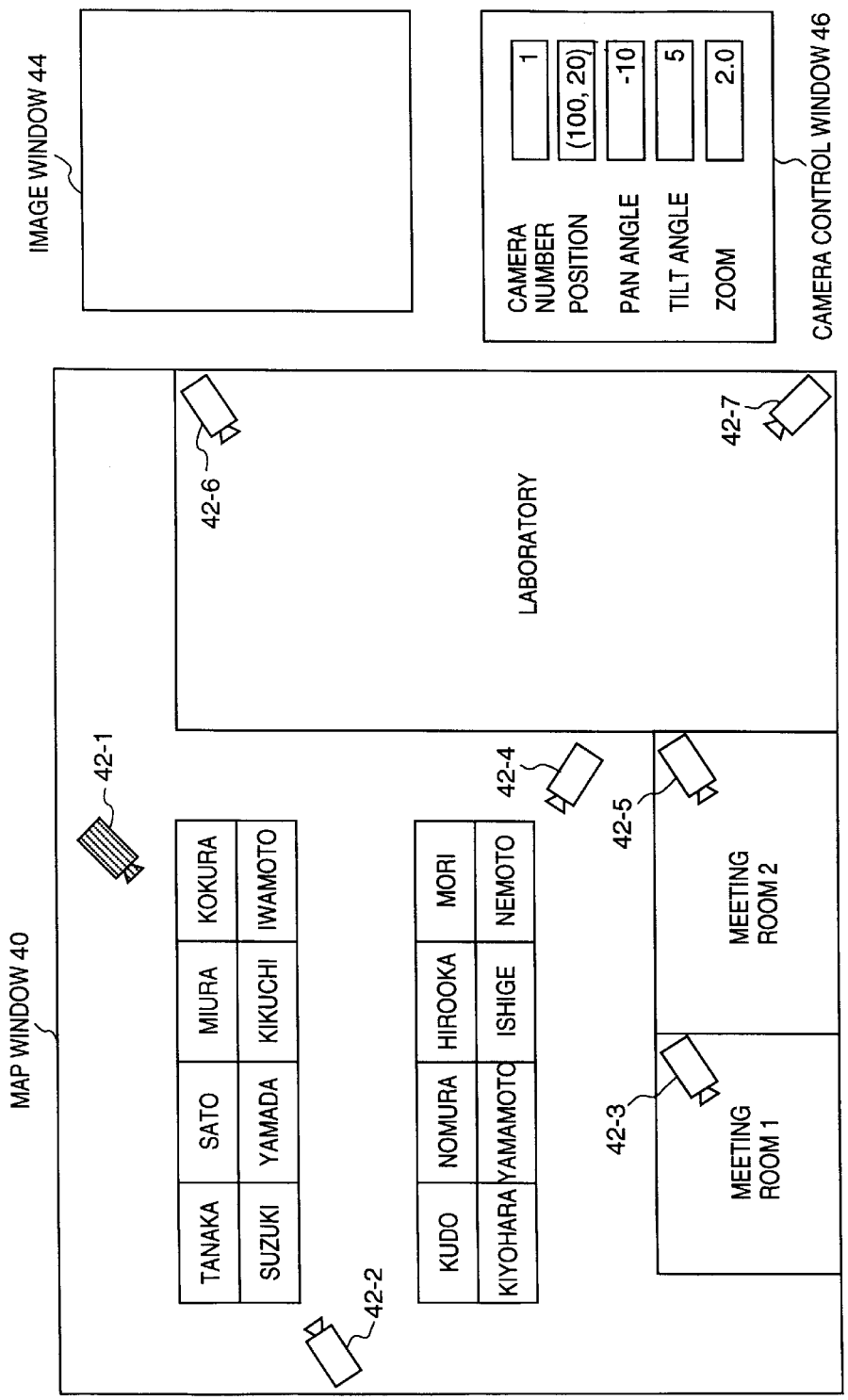
FIG. 2 is a view showing an example of a display screen of the first embodiment.

FIG. 2 shows an example of the display screen on the bit-map display 28. Assume that a multi-window system capable of simultaneously displaying a plurality of windows is running on the bit-map display 28. A map of, e.g., an office layout is displayed on a map window 40, and camera icons 42-1 to 42-7 indicating the positions of the plurality of cameras disposed in the office are displayed on the map. The camera icons 42-1 to 42-7 are displayed to have directions substantially the same as those of the cameras 10-1 to 10-7 corresponding to the icons. An image output from the camera 10 selected by the camera selector 32 are displayed on an image window 44. In order to identify the selected camera 10 on the map window 40, the camera icon corresponding to the selected camera is displayed in a color different from those of the camera icons corresponding to non-selected cameras. In FIG. 2, the camera 10-1 is selected, and the camera icon 42-1 corresponding to this camera is displayed in a color different from those of other camera icons.

The serial ID (identifier) number, position, pan angle, tilt angle, and zoom ratio of the camera to be controlled are displayed on a camera control window 46. In the column of the position, the position of the camera corresponding to the input of the column of the camera number is displayed. Data can be input to columns other than that of the position. In FIG. 2, the selected camera has camera number 1, and its position is expressed by (100, 20). The pan angle is 10°, the tilt angle is 5°, and the zoom ratio is two. These angles have values based on the setting direction when the camera is set.

In this embodiment, four functions, i.e., panning, tilting, zooming, and focusing can be controlled for each camera 10. In this embodiment, the following three modes are provided. That is, Mode #1: change pan angle and focal point Mode #2: change zoom ratio Mode #3: change tilt angle As will be described in detail later, when the camera icon of the selected camera is double-clicked, the above-mentioned three modes are cyclically selected.

If the position (central point) of the selected camera icon is assumed to be a point C (cx, cy), and the position (designated point) of a mouse cursor is assumed to be a point M (mx, my), the direction of a vector C→M is defined as the horizontal (panning) direction of the camera. Note that the direction of the camera is defined by the direction pointed by the center of its lens, and is expressed by the horizontal angle (pan direction) and the vertical angle (tilt direction) with respect to the above-mentioned reference line.

Note that the coordinate position on the map is expressed by an X-Y coordinate system defined on the map.

On the other hand, let L be the distance between the points C and M. In addition, when the pan direction of the camera is defined as a positive direction of an x-axis, and an axis perpendicular thereto is defined as a y-axis, the front side of the camera icon, i.e., a region satisfying x>0 is defined as a positive direction, and an opposite region, i.e., a region satisfying x<0 as the side behind the camera icon is defined as a negative direction. Under these conditions, the sign of the designated position for the camera icon is defined. That is, operations are defined as follows in correspondence with the designated position, M:

Mode #1: change designated position M to focal point position (in-focus point)
Mode #2: change zoom ratio to (L×constant)
Mode #3: change tilt angle to (L×constant×sign of designated position with respect to camera icon)

Using the parameters defined by the camera position C and the designated position M, the selected camera is actually controlled. Note that the pan angle falls within the range from −90° to +90° to have the central angle of 0°, and the tilt angle falls within the range from −70° to +70° to have an angle corresponding to the horizontal state as 0°, an angle in the upward direction as a positive angle, and an angle in the downward direction as a negative angle. In the operation of mode #3, the tilt angle is changed upward when the designated point M is located in front of the camera; the tilt angle is changed downward when the designated point M is located behind the camera.

The selected camera icon is displayed in different colors depending on the selected mode so as to allow easy recognition of a selected one of the three modes. More specifically, the icon is displayed in green in mode #1; blue in mode #2; and yellow in mode #3.

As camera operation commands, in this embodiment, tilt($\theta$), pan($\emptyset$), zoom(z), and focus(F) are used. $\theta$ indicates the pan angle, $\emptyset$ indicates the tilt angle, z indicates the zoom ratio, and F indicates the focal point position. As a switch command of a camera to be controlled, change(n) is used. n is the camera number. The CPU 22 supplies these commands to the camera selector 32 as needed, and the camera selector 32 supplies the above-mentioned control commands supplied from the CPU 22 and associated with panning, tilting, zooming, and focusing to the camera control circuit 12-n and the camera 10-n, which were selected by the command change(n) previously or immediately before this operation. The camera selector 32 also transfers a video signal output from the selected camera 10 to the video capture device 34.

Figure 3:
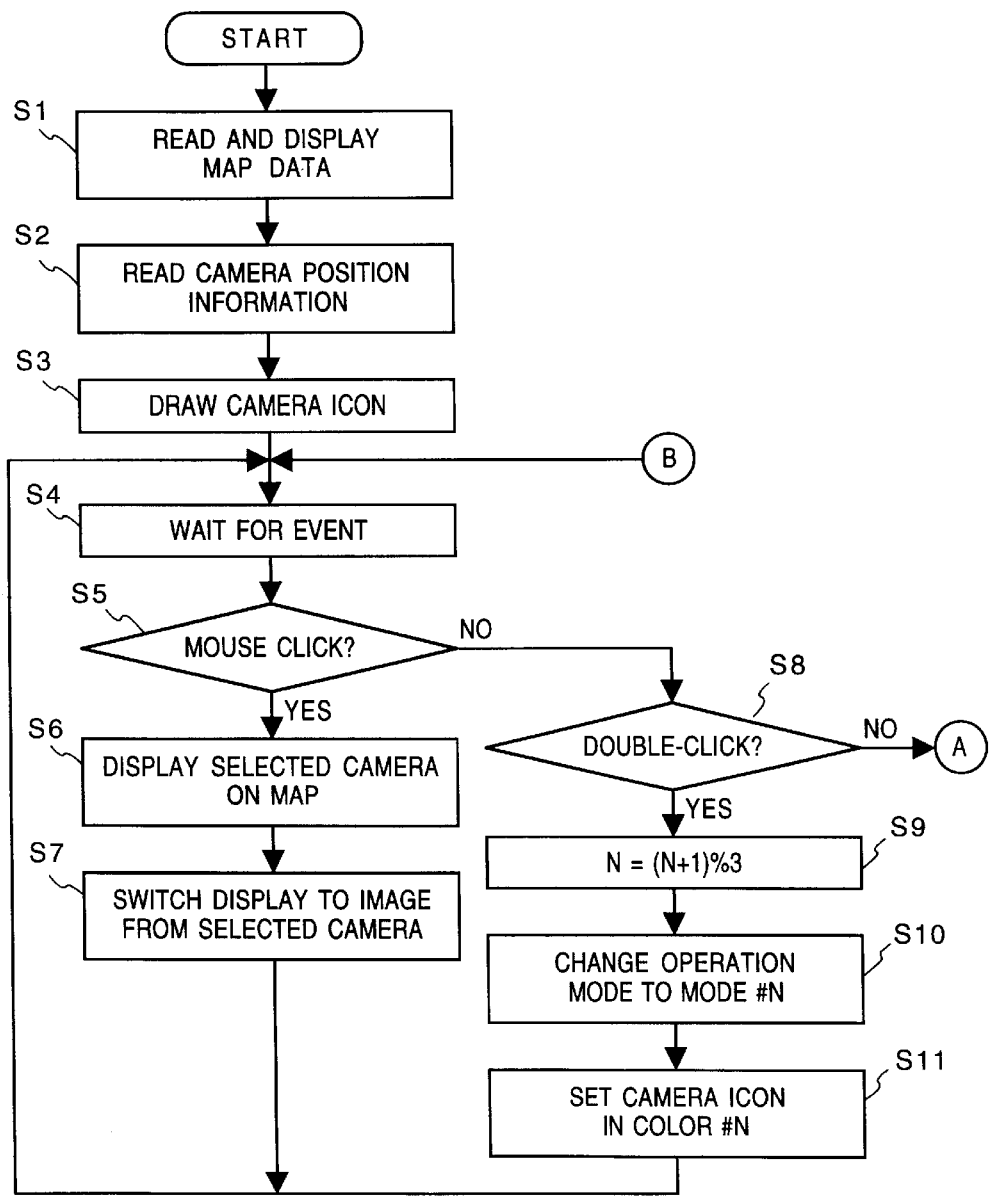
FIG. 3 is a partial operation flow chart of the first embodiment.
Figure 4:
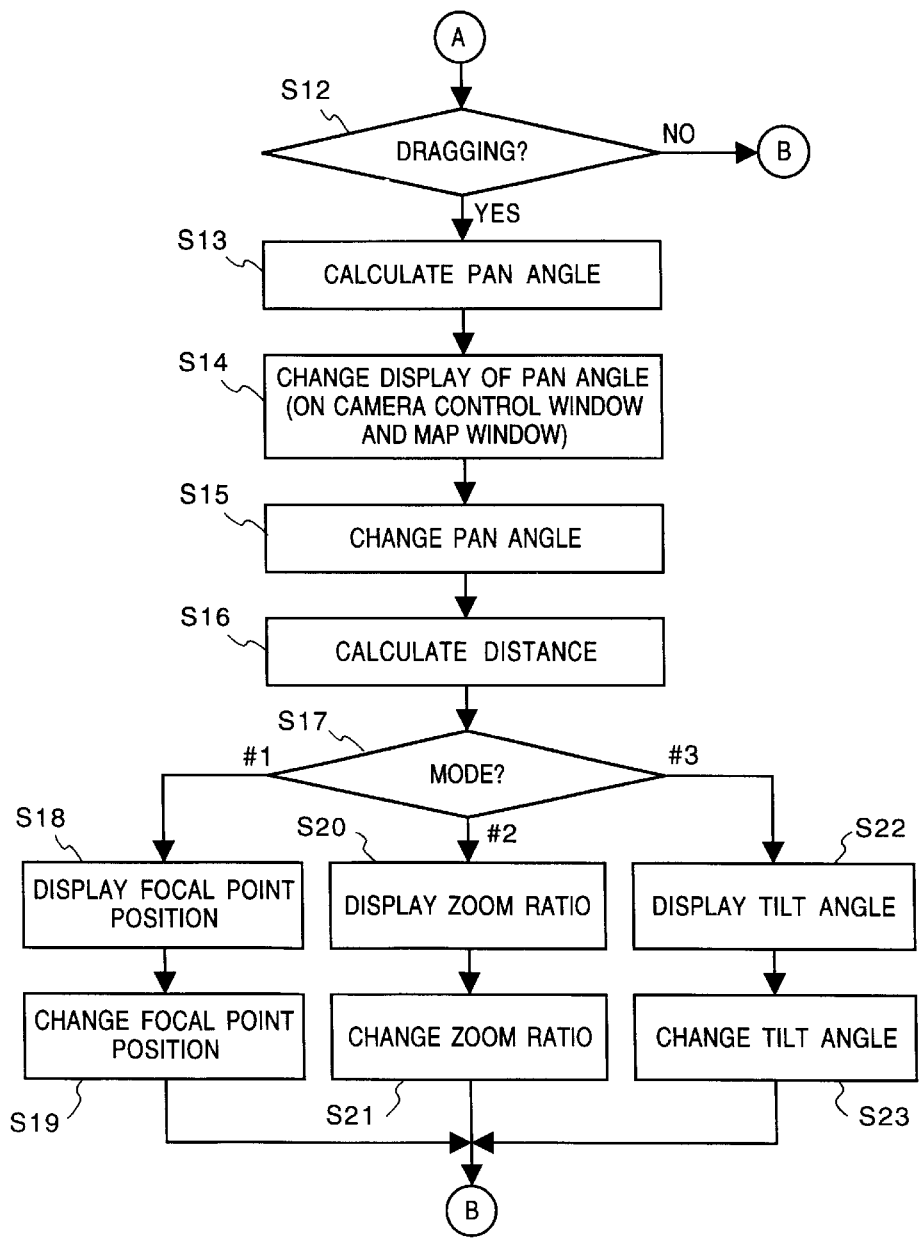
FIG. 4 is a partial operation flow chart of the first embodiment.

FIGS. 3 and 4 are flow charts of this embodiment as a whole. The operation of this embodiment will be described below with reference to FIGS. 3 and 4. These flow charts are realized when the CPU 22 executes the program stored in the main memory 24.

First, map data stored as, e.g., a file in the secondary memory 26 is read, and is displayed as a bit-map image of an office layout in the map window 40, as exemplified in FIG. 2 (step S1). Then, a file (position information file) having position information indicating the actual positions of the cameras is read (step S2), and the camera icons 42-1 to 42-7 are drawn at the corresponding positions on the map window 40 on the basis of the position information (step S3). This position information file stores the camera numbers, camera coordinate positions, and pointing directions (the camera directions when the camera pan angle=0°) of all the cameras to be disposed. The pointing direction is the direction of the above-mentioned reference line. In this embodiment, assume that all the cameras are set in an initial state (tilt angle=0°, focal point position=infinity, and zoom ratio=1.0) immediately after the system is started.

The control waits for a mouse operation (event) of a user (step S4). If one of the camera icons 42-1 to 42-7 is selected by clicking the mouse (Yes in step S5), the color of the clicked camera icon is changed to one indicating a selected state (in this case, red), and the red icon is displayed on the map window 40 (step S6). The camera number n corresponding to the camera position is obtained from the position information file, and a camera switch command change (n) is supplied to the camera selector 32. Thus, the object to be controlled is switched to camera #n, and an image output from camera #n is displayed on the image window 44 (step S7).

Every time the mouse is double-clicked on the selected camera icon in a state wherein one of the cameras is selected (Yes in step S8), the mode is cyclically switched like #1→#2→#3→#1→#2→#3→•••. In this process, the color of the selected icon is changed in correspondence with the mode (step S9 to S11). More specifically, the icon is displayed in green in mode #1; blue in mode #2; and yellow in mode #3.

Similarly, if the mouse is dragged (to move the mouse with the mouse button held down) in a predetermined pattern while one of the cameras is selected (step S12), processing corresponding to the current mode is executed as follows. More specifically, the position (corresponding to the center of movement of a panpod) of the selected camera icon is assumed to be a point C (cx, cy), and the position of the mouse which is being dragged is assumed to be a point M (mx, my).

First, a pan angle is calculated (step S13). If mx>cx, the angle $\theta$(deg.) of the vector C→M is:

$$\theta = \arctan((my-cy)/(mx-cx))$$

if mx<cx, the angle $\theta$ is:

$$\theta = \arctan((my-cy)/(mx-cx)) + 180$$

Figures 5, 6:
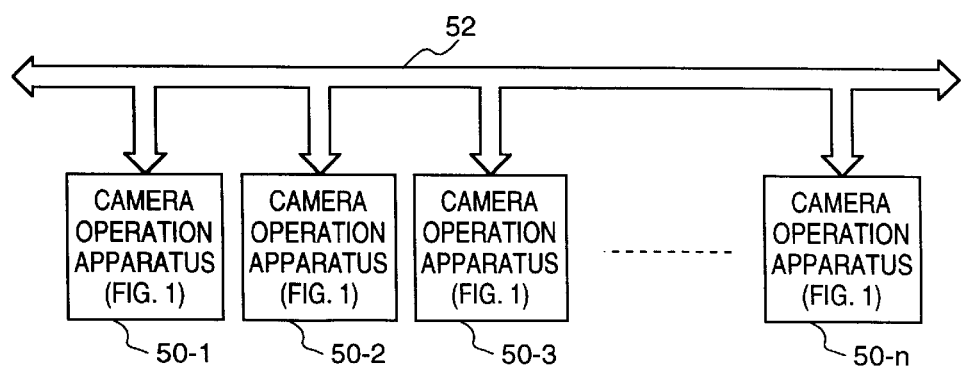
FIG. 5 is a table showing an example of the contents of camera position information.
FIG. 6 is a diagram showing an example of the arrangement used when the first embodiment is applied to a network.

Therefore, a value $\theta 1$ obtained by subtracting $\theta$ from the value of the camera pointing direction shown in FIG. 5 corresponds to the pan angle. In this case, since the pan angle falls within the range from −90° to 90° in this embodiment, if the calculated angle exceeds this range, the upper or lower limit value, i.e., 90° or −90° is set.

The direction of the camera icon to be drawn is changed in correspondence with the calculated pan angle (step S14), and a camera angle change command pan($\theta 1$) is supplied to the control circuit 12-n of camera #n via the camera selector 32, thus panning camera #n of interest in the corresponding direction (S15).

The distance L between the points C and M is calculated (step S16), and processing in units of modes is executed in correspondence with the distance L as follows (step S17 to S23).

More specifically, if mode #1 is selected (#1 in step S17), the distance L is determined as a new camera focal point position F, and a mark indicating the focal point position is drawn at the designated point M on the map window 40 (step S18). In addition, a camera focal point change command focus (F) is supplied to the camera selector 32 (step S19).

If mode #2 is selected (#2 in step S17), the zoom ratio z is determined based on the distance L, and the determined zoom ratio z is displayed as, e.g., a character string on the map or the camera control window 46 (step S20). In addition, a zoom ratio change command zoom(z) is supplied to the corresponding camera control circuit 12 via the camera selector 32 (step S21). Note that z is set to be a value obtained by multiplying the distance L with a given constant.

If mode #3 is selected (#3 in step S17), the camera vertical angle (tilt angle) ø is determined based on the distance L, and the tilt angle is displayed as, e.g., a character string on the map or the camera control window 46 (step S22). In addition, a tilt angle change command tilt(ø) is supplied to the corresponding camera control circuit 12 via the camera selector 32 (step S23). Note that ø is given by arctan(L× constant×(sign of designated position with respect to camera icon)).

The parameters calculated in steps S18, S20, and S22 are forcibly changed to fall within the setting ranges even when the calculation result exceeds the setting range.

Upon completion of the above-mentioned processing in steps S5 to S23, the flow returns to step S4 to wait for generation of the next event.

In this embodiment, as described above, since one of the camera icons disposed on the map displayed on the display is selected and operated, the relationship between the actual position and direction of the camera and an image can be easily recognized, and the plurality of cameras disposed in, e.g., an actual office can be remote-controlled by a user interface that is easy to operate.

The embodiment shown in FIG. 1 can be applied to a network. For example, as shown in FIG. 6, a plurality of camera operation apparatuses 50-1 to 50-n each having the same arrangement as that of the camera control system shown in FIG. 1 are connected to a network 52. As the network 52, a local area network (LAN) or a wide area network (WAN) which has a bandwidth large enough to transmit digital motion image data captured by the video capture device 34 and camera control signals is assumed. However, the present invention is not limited to these networks.

Each of the camera operation apparatuses 50-1 to 50-n can output video data captured by the video capture device as a packet to the network 52, and can receive a video data packet from the network 52. The bit-map display in each apparatus displays video data captured by the video capture device and video data received from the network on the video window. Each of the camera operation apparatuses 50-1 to 50-n can transmit/receive camera operation commands tilt(θ), pan(ø), zoom(z), and focus(F), and a camera switch command change(n) onto/from the network 52. The camera operation commands and the camera switch command received from the network 52 are processed in the same manner as those generated in each apparatus. Such a technique is known to those who are skilled in the art.

Note that the camera information additionally includes an item of apparatus addresses uniquely assigned in units of camera operation apparatuses and an item of map names (i.e., office names) in correspondence with the network, as shown in FIG. 7, in place of the information shown in FIG. 5. Upon selection of a camera, the apparatus address and/or the map name must be selected using, e.g., a menu to switch the camera operation apparatus and/or the map. Note that the item of map names is effective not only for the network but also for a case wherein cameras are disposed at remote places, and cannot be drawn on a single map. In this case, a plurality of maps can be selectively displayed on the map window 40.

When the camera to be controlled is selected, and its camera number is detected, the table shown in FIG. 7 is looked up to obtain the apparatus address based on the camera number. When the selected camera cannot be directly controlled, i.e., must be controlled via the network, the camera operation commands and the camera switch command are issued via the network. In the camera image display operation, if the camera operation apparatus at which a camera operation input is performed is represented by A, and the camera operation apparatus to which the selected camera is connected is represented by B, when the map is displayed and the camera is selected, the apparatus A requests the apparatus B to transmit a camera image, and video data captured by the apparatus B is transmitted to the apparatus A via the network.

As described above, when this embodiment is applied to a network, even when the number of inputs of the camera input selector is limited, a larger number of cameras can be controlled. One or a plurality of cameras at remote places can be easily bidirectionally controlled.

Second Embodiment

Figure 8:
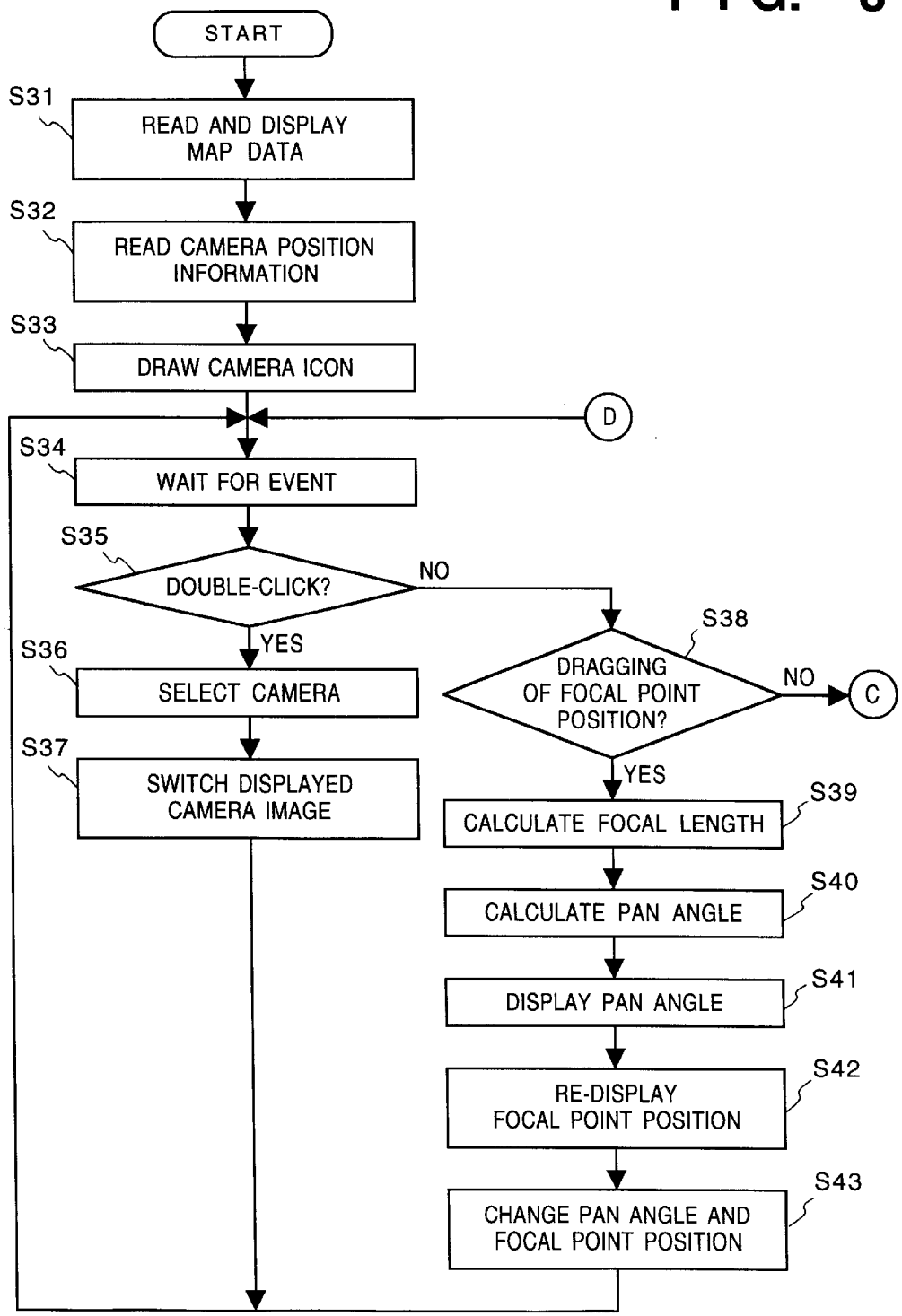
FIG. 8 is a partial operation flow chart of the second embodiment.
Figure 9:
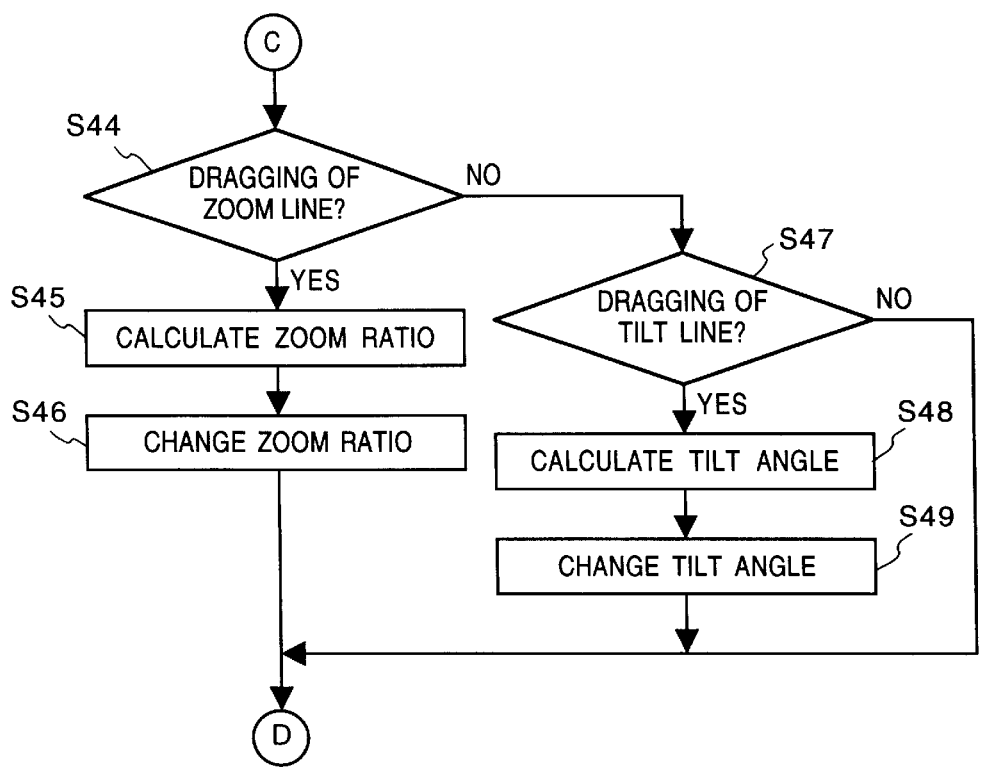
FIG. 9 is partial operation flow chart of the second embodiment.

An embodiment which improves the operability of the camera control system shown in FIG. 1 will be described below. This embodiment realizes a camera operation on the map window 40 by means of a graphical user interface. FIGS. 8 and 9 are operation flow charts as a whole which are executed in response to an operation by in operator.

This embodiment has no camera operation modes, and the focal point, pan angle, tilt angle, and zoom ratio are adjusted by operating the camera and its auxiliary line on the map using the mouse. Although the map to be displayed is the same as that shown in FIG. 2, the selected camera is displayed, as shown in FIG. 14. Referring to FIG. 14, a pan direction line (central line) 153, zoom lines 152, a tilt line 155, and a focal point symbol 154 are displayed together with the camera icon 42-6.

In the operation, map data stored in the secondary memory 26 is read, and is displayed as a bit-map image of an office layout, as exemplified in the map window 40 (step S31). Then, a position information file is read (step S32), and the camera icons 42-1 to 42-7 are drawn at the corresponding positions on the map window 40 on the basis of the position information (step S33).

The control waits for a mouse operation by the user (step S34). If one of the camera icons 42-1 to 42-7 is selected by double-clicking the mouse (Yes in step S35), the display state of the double-clicked camera icon is changed to the selected state (step S36). The camera number n corresponding to the camera position is obtained from the position information file, and a camera switch command change(n) is supplied to the camera selector 32. With this operation, the object to be controlled to switched to camera #n, and an image output form camera #n is displayed on the image window 44 (step S37).

Figure 10:
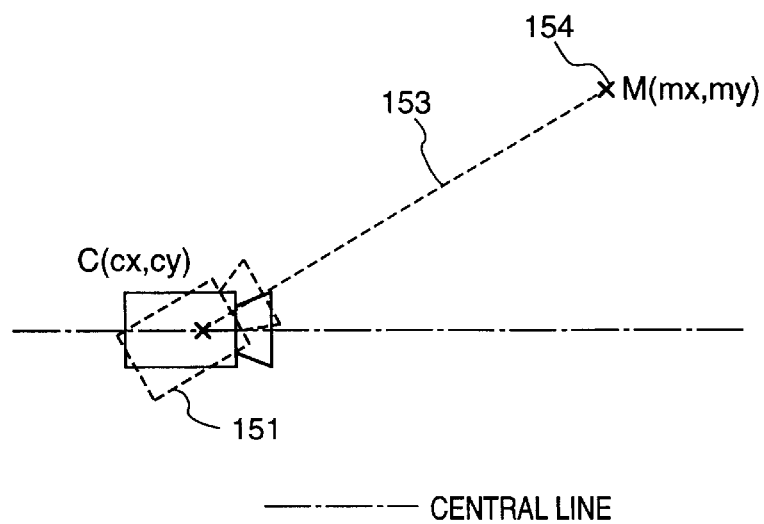
FIG. 10 is an explanatory view of the change operation of the pan angle and the focal point position.

If the generated event is a dragging operation of the focal point position (Yes in step S38), steps S39 to S43 are executed FIG. 10 is a view for explaining the operation method for changing the pan angle and the focal point position. A point C indicates the center of rotation upon changing of the pan angle of the camera, and a point M indicates the pointer position designated by the mouse. Note that the "central line" is a line indicating the camera direction before the camera is operated, and is illustrated in FIGS. 10 to 13B for the sake of convenience, but is not displayed on the map window 40. As for the pan angle, the camera direction is calculated based on a vector C→M by the same method that has been described above with reference to FIGS. 3 and 4 (step S39). When the pan angle exceeds its movable range, it is replaced by a value at the corresponding movable end, as in the above embodiment. The focal length is calculated based on the scale of the map data and parameters of a lens so that the position of the point M matches the focal point position (step S40). After the camera direction and the focal point position are obtained, the camera icon is re-drawn to indicate the panned camera direction, and a line segment is drawn between the point M indicating the focal point position and the point C to indicate that the point M is the focal point position and the camera direction is the direction of C→M (steps S41, S42). A pan command and a focal point position moving command are issued to the camera to be controlled via the camera control circuit so as to pan the camera in the designated direction, and to change the focal point position to the designated position (step S43). In order to indicate the camera direction using a camera icon, a portion indicating the direction of a lens is added to the camera icon, and the camera icon can be displayed, so that the lens portion points the designated direction.

Figure 11:
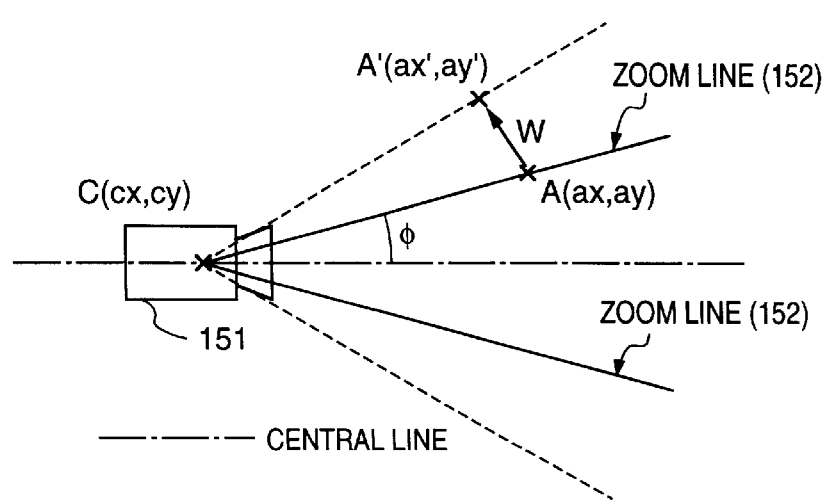
FIG. 11 is an explanatory view of the zoom ratio change operation in the wide-angle direction.
Figure 12:
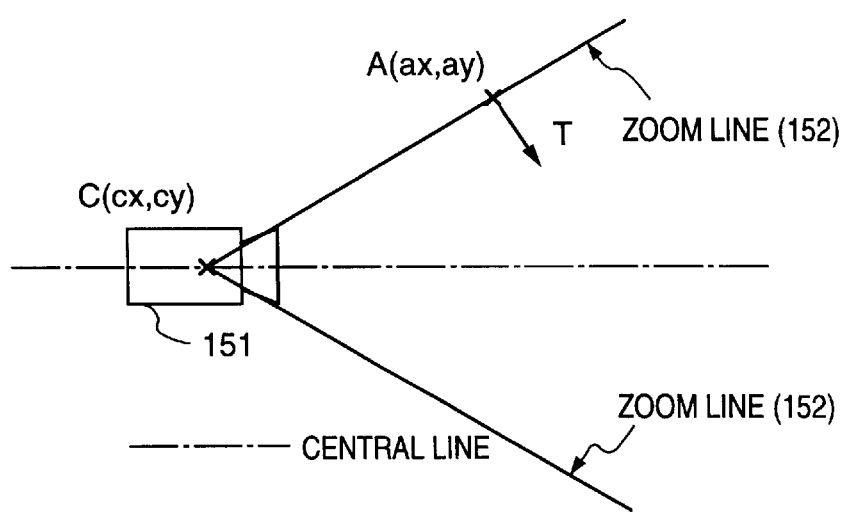
FIG. 12 is an explanatory view of the zoom ratio change operation in the telephoto direction.

If the generated event is a dragging operation of the zoom line (Yes in step S44), steps S45 and S46 are executed. FIGS. 11 and 12 are views for explaining the zoom ratio change operation. FIG. 11 shows a zooming operation toward the wide-angle side, and FIG. 12 shows a zooming operation toward the telephoto side. When one of the zoom lines indicating the outer edges of the current field range is dragged inwardly or outwardly, a change operation of the zoom ratio can be instructed. For example, in the zooming operation toward the wide-angle side, the mouse button is clicked at an appropriate point A on the zoom line indicated by a solid line in FIG. 11, and the mouse is dragged outwardly while holding down the mouse button. When a 4 desired angle is obtained (point A' in FIG. 11), the mouse button is released. The CPU draws a half line having the point C as the start point and passing the point A' as a new zoom line, and at the same time, draws a similar half line at a position symmetrical about the central line. The zoom ratio is calculated, so that angle ø formed between the central line and the zoom line corresponds to the horizontal distance of the photographing field of the camera to be controlled (step S45). The calculated zoom ratio is input to the camera control circuit connected to the camera to be controlled via the camera input selector (step S46).

Similarly, when an appropriate point A on the zoom line is dragged inwardly (in a direction T), as shown in FIG. 12, the zoom ratio is changed in the telephoto direction.

Figure 13A:
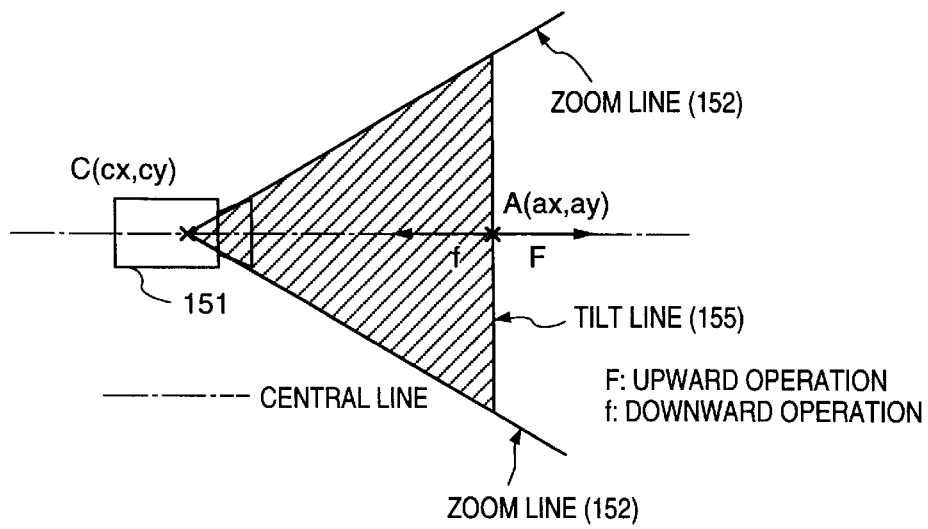
FIGS. 13A and 13B are explanatory view of the tilt angle change operation.
Figure 13B:
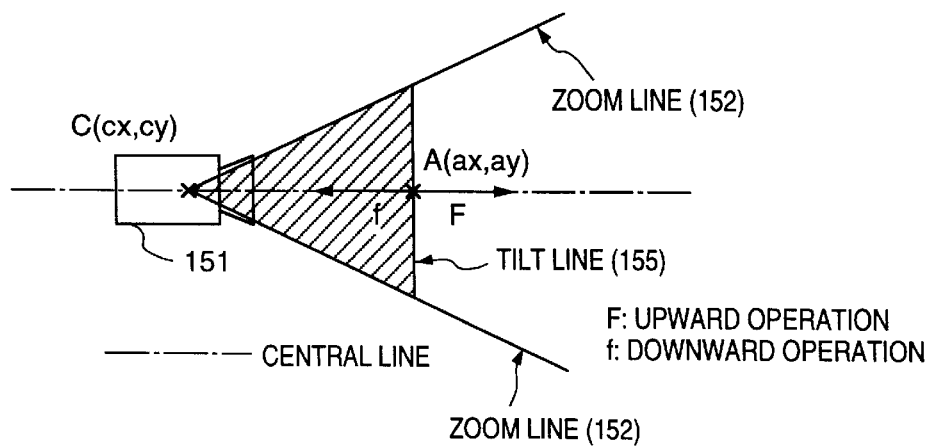

If the generated event is a dragging operation of the tilt line (Yes in step S47), steps S48 and S49 are executed. FIGS. 13A and 13B show two examples of the tilt angle changing operation. The tilt angle can also be changed in the map (i.e., on the horizontal plane). In this embodiment, the tilt line is drawn between the two zoom lines, as a line segment perpendicular to the central line (photographing optical axis). More specifically, an isosceles triangle is formed by the two zoom lines having the point C as the start point and the line segment perpendicular to the central line, and the base of this isosceles triangle is defined as the tilt line. When an arbitrary point (e.g., a point A) on the tilt line is dragged in a direction to approach or to separate from the camera icon, the tilt angle is changed. In this embodiment, when the point A is dragged in a direction F in FIG. 13A or 13B, the tilt angle is changed upward; when the point A is dragged in a direction f, the tilt angle is changed downward.

If the distance between the points C and A is represented by L, the tilt angle ø can be calculated by the following equation (S48):

$$\phi = \arctan((L-a)/b)$$

where $\underline{a}$ and b are constants, and especially, $\underline{a}$ indicates the position of the tilt line, which serves as a reference point above or below which the tilt angle is positive or negative with respect to the horizontal angle. When the angle ø calculated by the above equation exceeds the movable range of the tilt angle, it is replaced by a value at the corresponding end, as in the pan angle. When the calculated tilt angle ø is supplied to the camera control circuit and the camera to be controlled the camera is tilted through the angle ø (step S49). In this embodiment, the interior of the isosceles triangle formed by the two zoom line and the tilt line is displayed in a different color. Thus, the tilt angle call be displayed in an easy-to-see manner.

With this arrangement, the operation contents, i.e., panning, tilting, zooming, or focusing, of the camera can be visually recognized.

Upon selection of a camera on the map window by clicking the mouse, one, closest to the click position of the mouse, of the plurality of cameras on the map window may be selected, and the dragging operation of the focal point position may be immediately started. With this control, upon clicking the mouse, the closest camera on the map is directed to the clicked point, and at the same time, the focal point position is controlled to match the clicked point. More specifically, since the camera selection and the panning operation can be simultaneously attained, the camera closest to the point of interest can be immediately directed to the point of interest.

Figure 15:
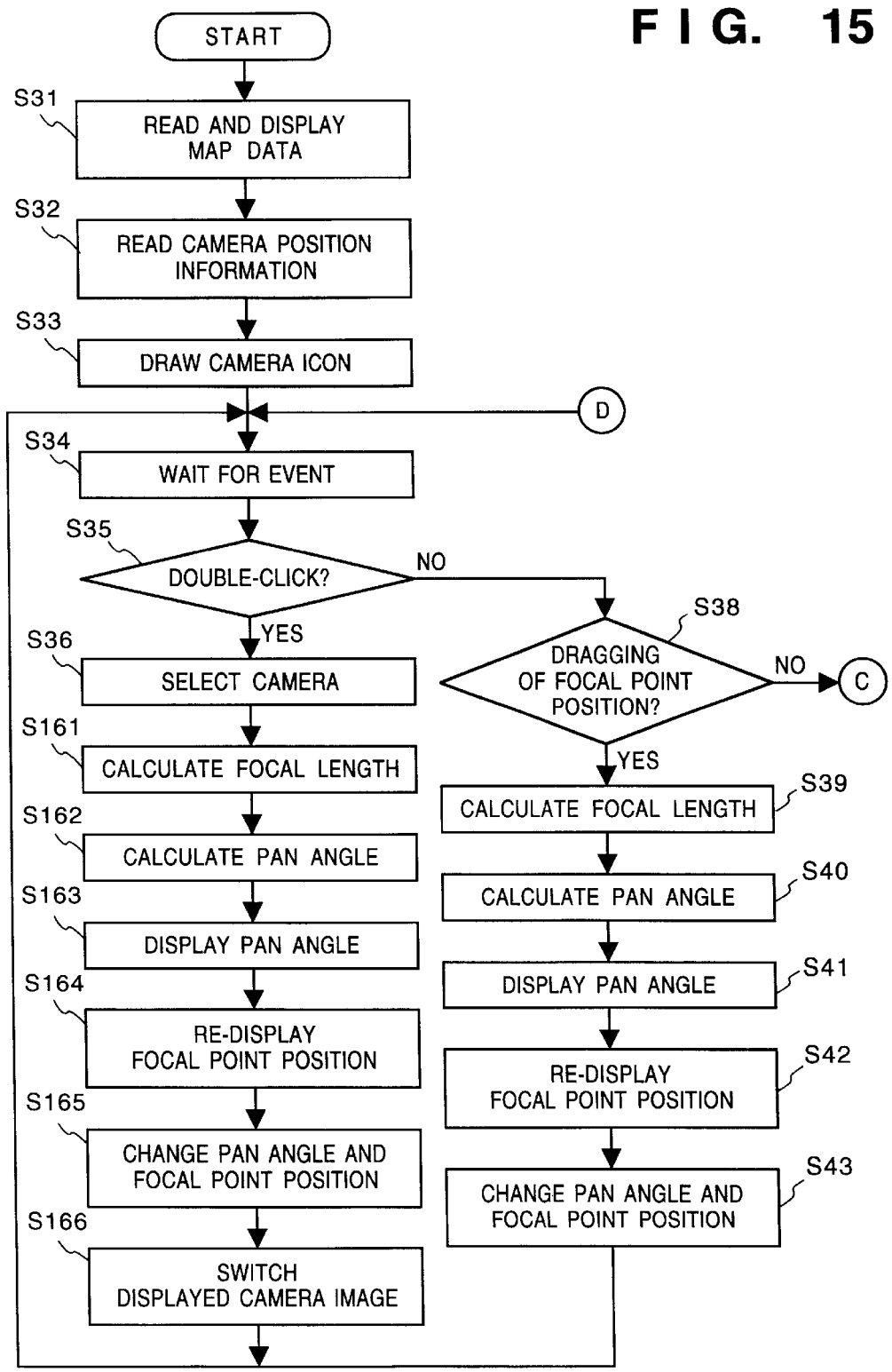
FIG. 15 is a flow chart showing the sequence upon combination of the first and second embodiments.
Figure 16:
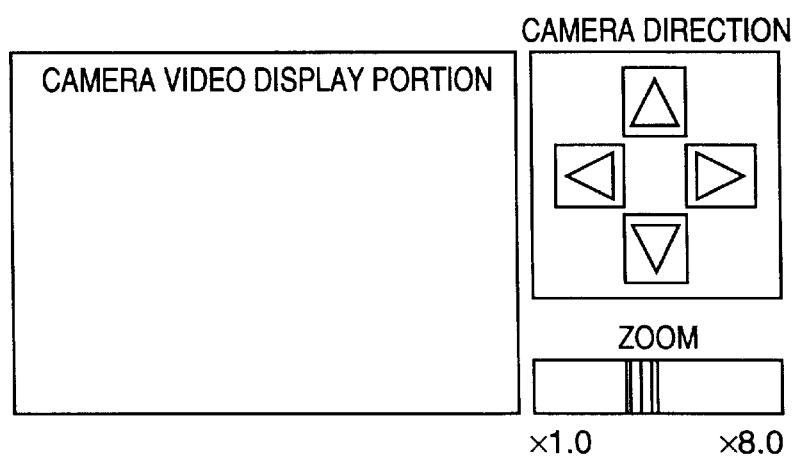
FIG. 16 is a view showing an example of a conventional operation screen.

FIG. 15 shows this sequence. The same reference numerals in FIG. 15 denote the same processing steps as those in FIG. 8.

Even when a camera is selected by double-clicking, the pan angle is displayed on the camera control window 46 after the calculations of the focal length and the pan angle (step S163), and the map shown in FIG. 14 is re-displayed in correspondence with the new focal length and pan angle (step S164) Thereafter, the camera to be controlled is operated (step S165) to display a new camera image (step S166).

The above-mentioned embodiments may be combined or may be selectively utilized.

As can be easily understood from the above description, according to the camera control system of this embodiment, since the layout of cameras and their positions are image-displayed using the map and camera icons, a visual user interface which can be easily operated can be provided. When an arbitrary one of the plurality of cameras is selected and operated, the operability can be greatly improved.

Third Embodiment

A video control system according to the third embodiment of the present invention will be described in detail below with reference to the accompanying drawings. This third embodiment suggests the video control system described in the above first and second embodiment. The system in the third embodiment is operated with a software shown in FIG. 18. Note that the relation between the system described in the first and second embodiment and the system described in this third embodiment will be comprehended from the fifth embodiment.

Figure 17:
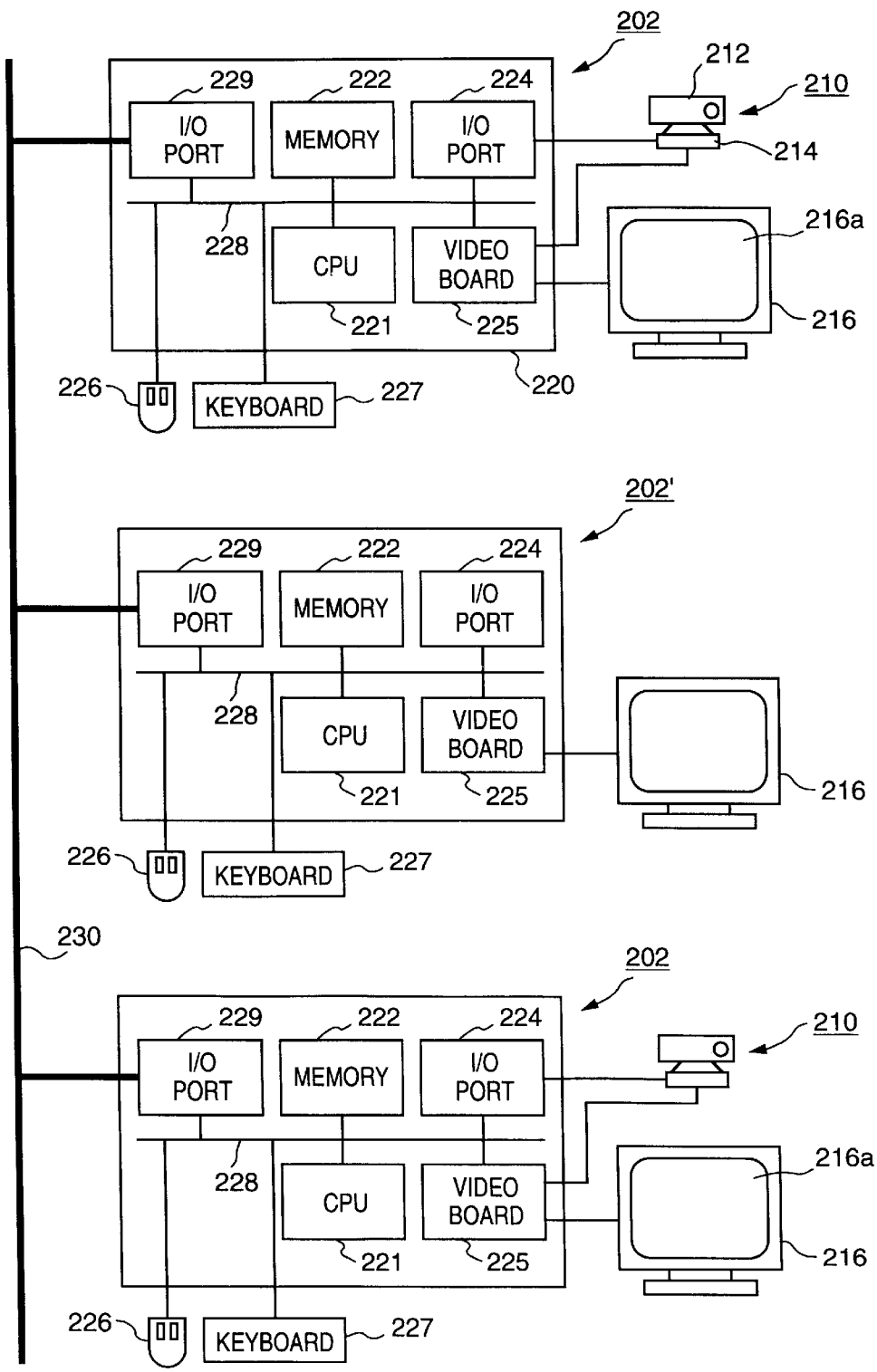
FIG. 17 is a schematic block diagram showing the arrangement according to the third embodiment of the present invention.

FIG. 17 is a schematic block diagram showing the arrangement of a camera controller in the video control system according to the third embodiment of the present invention. A camera device 210 has a camera unit 212 which can photograph an object and can execute a zooming operation, and a panpod 214 which can control the posture of the camera unit 212 in the pan direction (right-and-left direction in FIG. 17) and in the tilt direction (up-and-down direction in FIG. 17). A display device 216 can display an image picked up by the camera unit 212 on its screen 216a. A workstation 220 comprises a CPU 221, a memory unit 222 including a ROM and a RAM (neither are shown), I/O ports 224 and 229 as input/output units, and a video board 225 so as to issue commands for controlling the state (e.g., the positions in the pan and tilt directions and the position in the zoom direction) of the camera device 210, and to display image information picked up by the camera device 210 on the display device 216 as display means. Also, the workstation 220 is connected with a mouse 226 as a pointing device, and a keyboard 227 so as to input data. These elements are connected via a bus 228. The CPU 221 as a system control unit controls the system. On the other hand, the ROM in the memory unit 222 stores a program for executing system control, and the RAM stores various data. The I/O port 224 outputs state control signals of the camera generated by the CPU 221 to the camera device 210, and receives values indicating the respective states of the camera device 210 from the camera device 210. In this embodiment, the I/O port 224 is connected to the camera device 210 via an RS-232C port. The video board 225 transmits image information obtained from the camera device 210 to the display device 216. In this embodiment, a signal to be output is converted from the NTSC format into the RGB format.

A plurality of camera controllers 202 as described above can be connected via a network 230, and transmit/receive signals via their I/O ports 229. With this arrangement, a so-called video meeting can be realized. In this embodiment, workstations are utilized as controllers in consideration of versatility and processing performance. Alternatively, personal computers may be used, or special-purpose controllers may be used. In such a video meeting system, since a user may participate in the meeting only as an observer, a camera controller 202' to which no camera device 210 is connected may be connected to the network 230.

Figure 18:
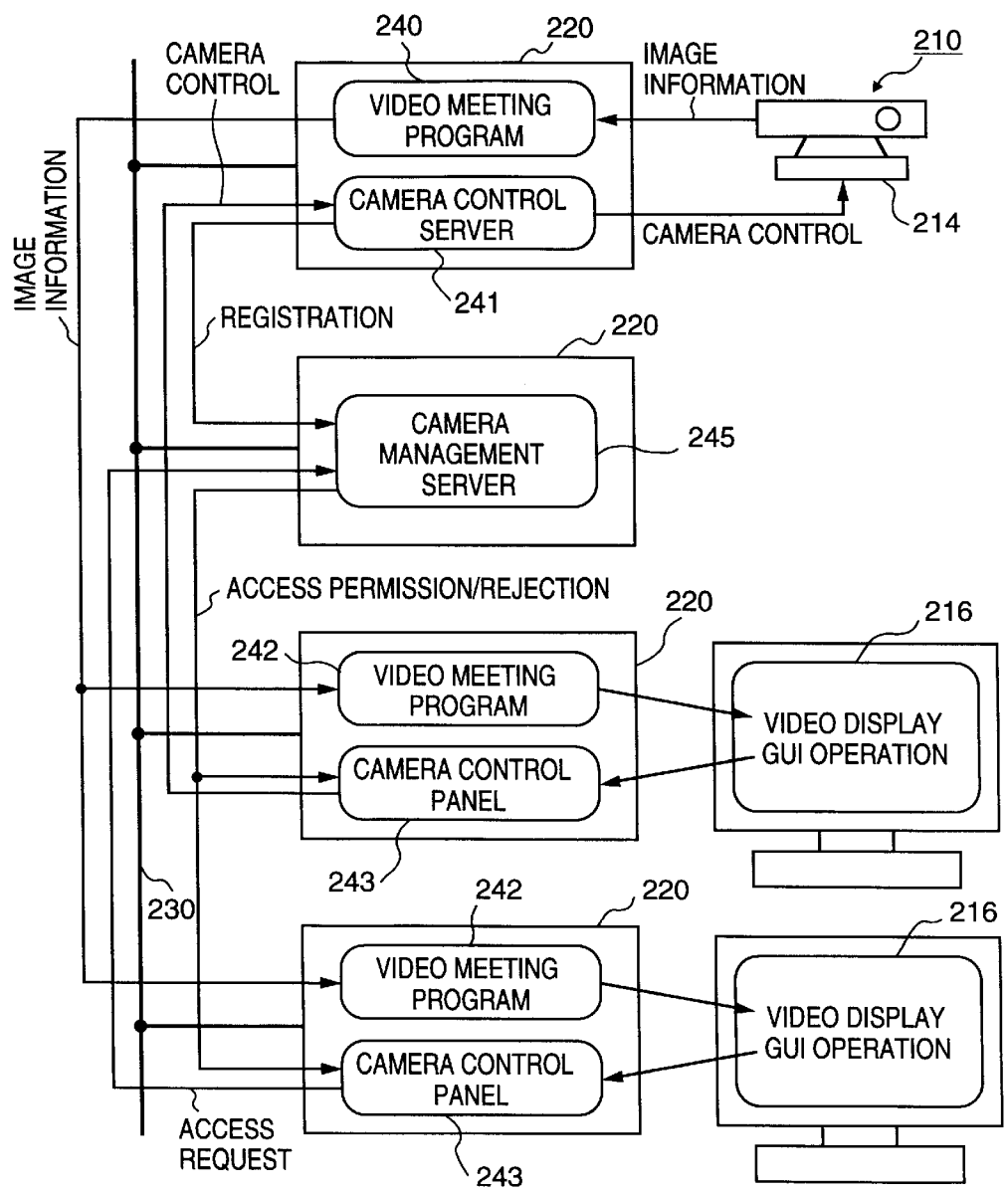
FIG. 18 is a block diagram showing the software arrangement for executing the operation of the third embodiment.

FIG. 18 is a block diagram showing the software arrangement for realizing the system of this embodiment. The software arrangement includes the following programs. The workstation 220 (strictly speaking, the memory unit 222) connected to the camera device 210 stores a video meeting program 240 as a program for transmitting image information obtained by the camera device 210 to another location such as a remote location, and a camera control server 241 as a program for performing camera control. The camera control server 241 registers data indicating that the camera device 210 is connected to the video meeting system (network) in a camera management server 245 (to be described later) upon starting of the camera device 210. Therefore, in this embodiment, the camera management server 245 can be considered as registration means.

On the other hand, the workstation 220 (strictly speaking, the memory unit 222) to which the display device 216 is connected stores a video meeting program 242 as a program for displaying received image information, and a camera control panel 243 as a program for remote-controlling the camera. The camera control panel 243 allows to look up, describe, or correct the contents of an access permission list (to be described in detail later) managed by the camera management server 245. Therefore, in this embodiment, the camera control panel 243 can be considered as a portion of setting means. When the camera management server 245 permits connection to the camera device 210, the camera control panel 243 transmits camera control signals to the camera control server 241 without going through the camera management server 245.

Note that a combination of the above-mentioned programs 241 and 243 will be referred to as a "camera control client" hereinafter.

Furthermore, the camera management server 245 is prepared as a program for managing accesses to all the camera devices 210. The camera management server 245 need only be connected to at least one workstation 220 connected to the system. Note that the camera management server 245 may be stored in all the workstations 220, and one of the workstations 220 may serve as the server upon starting of the video meeting system on the network. In the above description, the workstations 220 are respectively connected to the camera device 210 and the display device 216. However, since each user normally uses the camera device 210 and the display device 216, the camera device 210 and the display device 216 are connected to one workstation 220, as shown in the block diagram of FIG. 17.

Therefore, the video meeting programs 240 and 242 serve as a single program.

Subsequently, remote control of the camera device 210 by the camera control server 241, user management by the camera management server 245, and access management by the camera management server 245 as principal operations in the arrangement of this embodiment will be explained below.

Remote Control of Camera

Implementation means which allows a given workstation 220 connected to the network 230 to remote-control a camera device 210 connected to another workstation 220 will be described below.

Since the camera device 210 can be controlled by transmitting control signals from the workstation 220 which stores the camera control server 241 to the camera device 210 via the RS-232C port, a method of outputting a command string corresponding to camera control operations to an RS-232C port (not shown) of the panpod 214 by remote-starting camera control functions such as panning, tilting, zooming, and the like present on the camera control server 241 using a "Remote Procedure Call" (RPC) need only be realized Of the control signals (command string), signals associated with the operation of the panpod 214 such as panning, tilting, and the like are transmitted to a control section (not shown) of the panpod 214, and signals associated with the operation of the camera unit 212 such as zooming are transmitted to a control section (not shown) of the camera unit 212.

A function shown in FIG. 19 is prepared as a function of calling the camera control server 241 at a remote place from the camera control client using the RPC. In the following description of this function, commands and the like shown in FIG. 19 are described in "[" and "]". The following description is based on C language adopted in this embodiment, but other languages may be used. In the function shown in FIG. 19, [struct camera_in ••• camera_in] is a statement of a data type for setting a set [camera_in] of parameters to be delivered from the camera control panel 243 to the camera control server 241 so as to operate the camera device 210. In this case, the set includes real numbers [tilt_angle] and [pan_angle], and an integer "zoom". On the other hand, [struct func_out ••• func_out]

is a statement of a data type [func_out] for setting an output value. For example, when the processing result of the function has no problem, ret=0 can be set; when the processing result has a problem, ret=−1 can be set. Furthermore, [camera_open] is a function for creating a client handler [CLIENT*cl] required for a communication with the camera control 241. As a result of execution of this function, connection between the workstation which instructed execution and the camera control server is established. A client handler for using the server thereafter is created, and its address is returned. Similarly, [camera_close] is a function for deleting the client handler.

The camera control client acquires an access permission to the camera. Thereafter, the camera control client calls the function [camera_open] to connect a communication with the camera control server 241, and then executes the functions such as [camera_pan_pos_1], and the like. Finally, the camera control client calls the function [camera_close] to end the camera control.

Figure 21A:
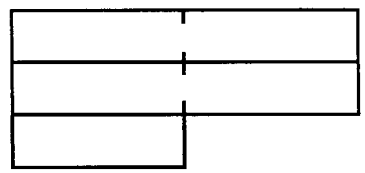
FIG. 21A is a view showing a function [camera_in]
Figure 21B:
FIG. 21B is a view showing a function [func_out]

For example, when the camera control client calls, for example, the function [camera_pan_pos_1], the value of the [func_out] type is returned as the processing result. By testing this value, the execution result can be discriminated. FIGS. 21A and 21B are views of the data types defined by FIGS. 19 and 20.

User management by the camera management server 245 will be described below.

Figure 22:
FIG. 22 is a view showing an example of a camera state list.

The camera management server 245 uses a camera state list 250 shown in FIG. 22 to attain user management. The camera state list 250 stores the host names registered in the camera control server 241, i.e., the names indicating the camera devices 210 connected to the network 230, and the use states of the camera devices 210 (ready, or being accessed by another user), and also stores the positions (x, y, z) of the camera devices 210 and their posture data (pan and tilt angles). As will be described in this embodiment, the host name can be the user name when only one camera device 210 is connected to one camera controller 202, but should not be the same as the user name when a plurality of camera devices 210 are connected to one camera controller 202. In an example shown in this list 250, four camera devices 210 indicated by host1, host2, host3, and host4 are connected, the camera device 210 of host2 can be controlled by the user of host3, and the camera device 210 of host4 can be controlled by the user of host1. The camera devices 210 of host1 and host3 are not operated by any users.

Figure 23A:
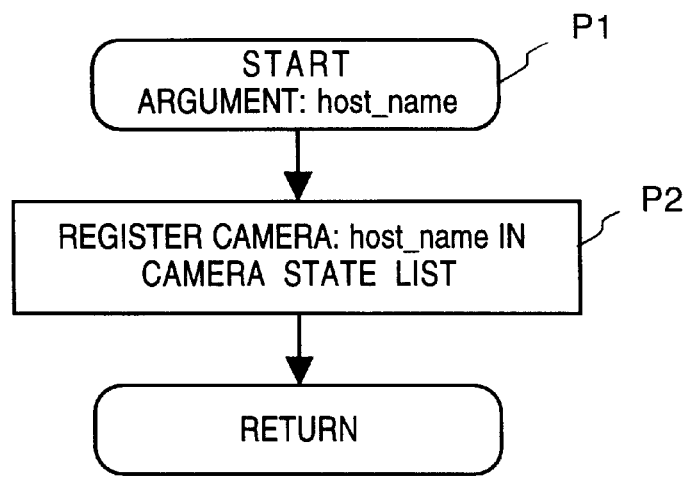
FIG. 23A is a flow chart showing the registration processing upon start of a camera.
Figure 23B:
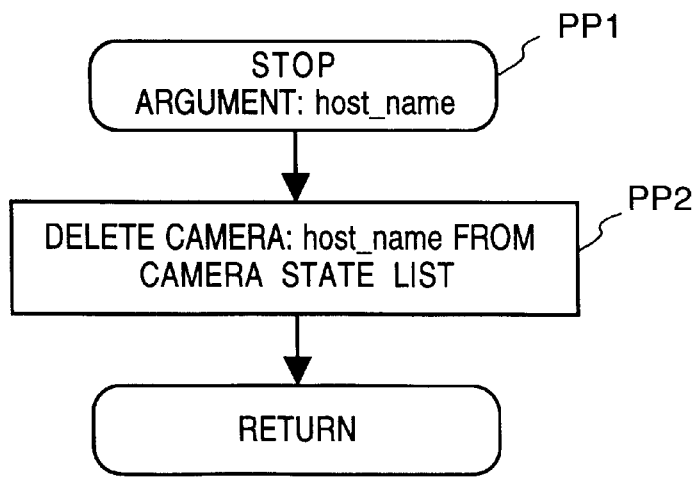
FIG. 23B is a flow chart showing the deletion processing upon stop of a camera.

Upon registration/deletion of a user, processing for informing the name of a user who started the camera control server 241 to the camera management server 245 and registering the user name in the camera state list 250 upon starting of the camera control server 241, and processing for deleting the user name from the camera state list 250 upon stopping of the camera control server 241 are realized using a function shown in FIG. 20 that uses the RPC. In the function shown in FIG. 20, [struct host_name ••• host_name] is a statement of a data type [host_name] for setting parameters to be delivered from the camera control panel 243 to the camera control server 241 so as to set the host name, and the number of characters of the name to be set is defined by [MAXNAME]. On the other hand, [append_camera_list_1] is the function started by the camera control server 241, and is executed in the camera management server 245. When this function is executed, i.e., when the camera control server 241 is started (step P1), as shown in FIG. 23A, the camera management server 245 registers the host name in the camera state list 250 (step P2). As can be seen from FIG. 20, the host name is defined by a host_name type, and is indicated by [host_name->name]. Thereafter, data indicating that the corresponding camera device 210 can be controlled via the camera control server 241 is stored. When the camera control server 241 is stopped, as shown in FIG. 23B, another program calls a function for starting [delete_host_list_1] in the camera control server 241 (step PP1), and thereafter, the camera control server 241 deletes the host name, thus ending execution of the process (step PP2). Therefore, in this embodiment, the camera management server 245 can also be considered as setting means.

Access Management

Access management by the camera management server 245 will be described below. In order to perform the above-mentioned camera control and the like, an access permission to the camera must be acquired. This processing is performed by the camera management server 245.

As the sequence for access management by the camera management server 245, functions [access_begin_1] and [access_end_1] started by the camera control client and executed by the camera management server 245 are used (see FIG. 24). These functions can execute the start and end of an access. Note that [struct access_in ••• access_in] is a statement of parameters to be delivered from the camera control panel 243 to the camera management server 245 so as to set an access target. More specifically, a partner to be accessed is set by [target_name] whose maximum value is defined by [MAXNME], and a user (own) is set by [user_name].

Figure 25:
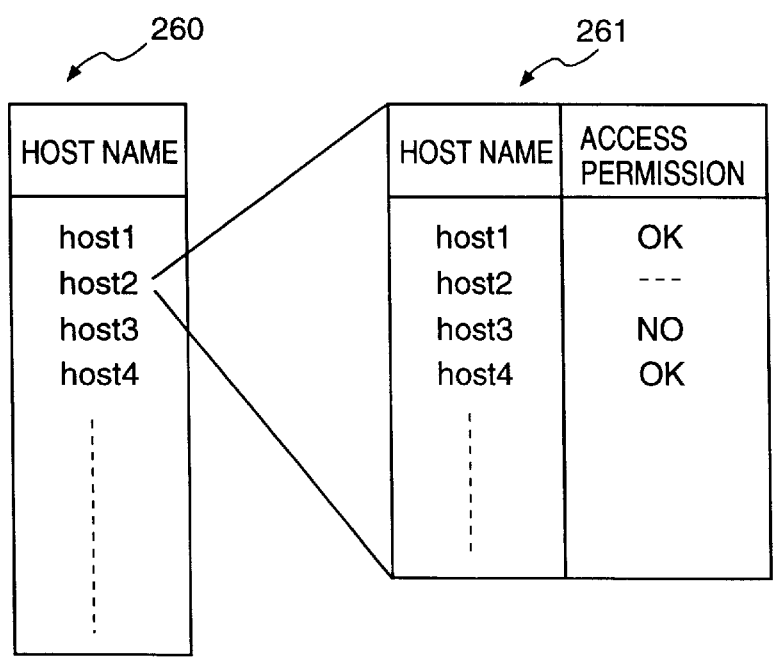
FIG. 25 is a view showing an example of an access permission list.

The sequence of the access request processing will be described below. Prior to the description, an access permission list 260 will be explained with reference to FIG. 25. The access permission list 260 (261) is held by the camera management server 245, and has lists 261 of users who can access the camera device 210 registered in the list 260 in units of camera devices 210. FIG. 25 exemplifies the list 261 for the camera device 210 indicated by host2. In this list, accesses from users indicated by host1 and host4 are permitted, and an access from a user indicated by host3 is not permitted. Note that the user of host2 does not participate in this list 261 since he or she can control the camera device 210 indicated by host2 without going through the camera management server 2. The usage status of the camera device 210 by the user of host2 is managed by the camera management server 2. This access permission list can be changed, as will be described later.

Figure 26:
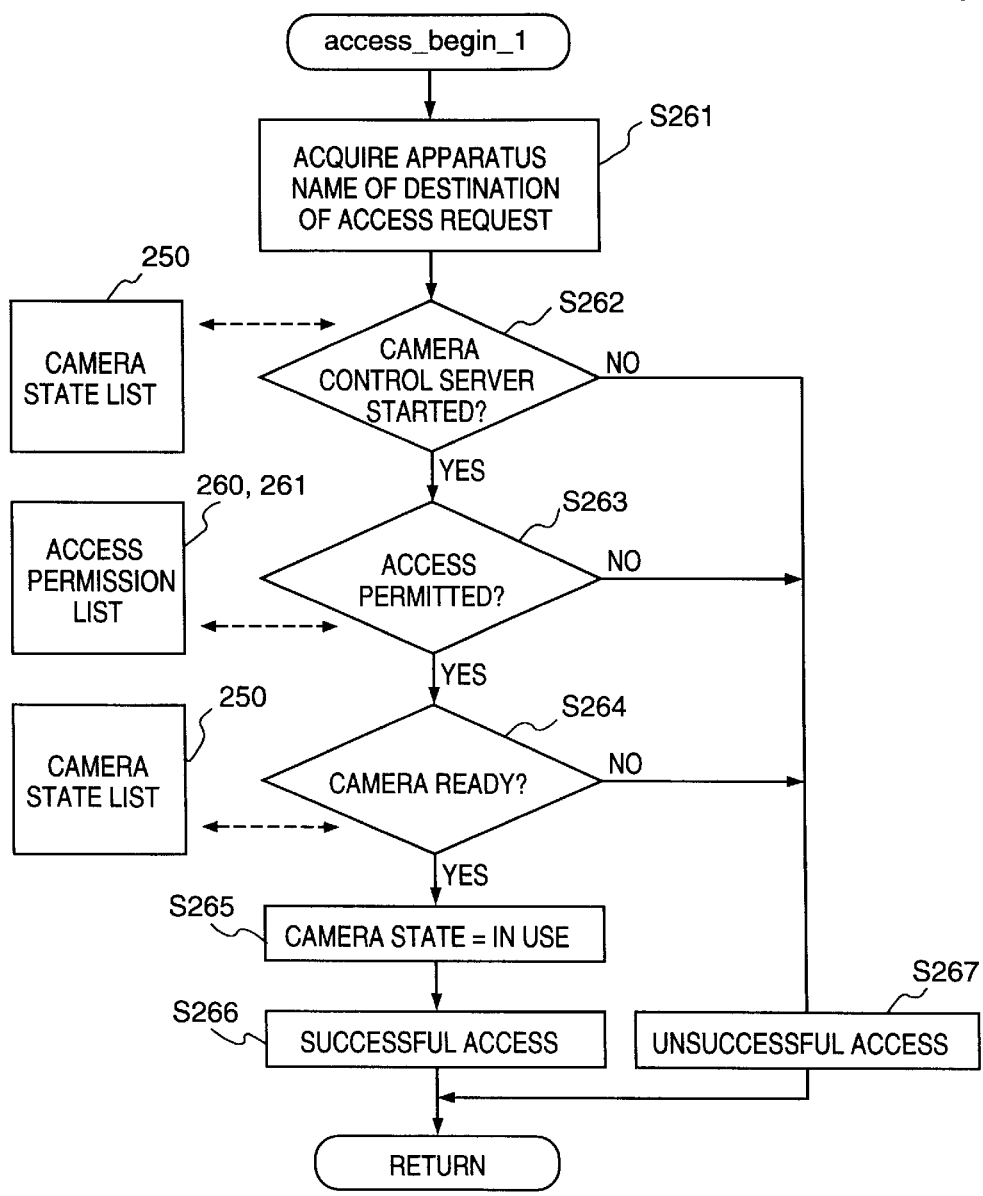
FIG. 26 is a flow chart showing the processing executed in response to a camera access request.

The access request processing executed by the function [access_begin_1] is executed in accordance with the flow chart shown in FIG. 26.

When the camera control client issues an access request to the camera device 210, the camera device name whose access is requested by the camera control client is decoded from the parameter [target_name] in the function [access_begin_1] (step S261).

It is then checked with reference to the camera state list 250 if the camera device 210 of interest is started, i.e., if there is a user who is using the camera control server of the camera device of interest (step S262). If NO in step S262, the flow advances to step S267.

On the otherhand, if YES in step S262, the parameter [user_name] in the function [access_begin_1] is decoded, and it is confirmed with reference to the access permission list 261 if the user indicated by this name has a right of accessing the camera device 210 indicated by [target_name] (step S263). If NO in step S263, the flow advances to step S267.

On the other hand, if YES in step S263, it is confirmed with reference to the camera state list 250 if the camera device of interest is unused by another user (step S264). If NO in step S264, the flow advances to step S267.

On the other hand, if YES in step S264, the user name (host name) is registered in the camera state list 250 (step S265), and it is determined that the access request is successful (step S266). Thereafter, the flow returns to the main routine.

In step S267, it is determined that an access is not successful, and the flow returns to the main routine.

The access result is returned to the client who issued the access request.

The camera control client side must execute the functions [access_begin_1] and [access_end_1] before and after an access operation.

Figures 27, 28:
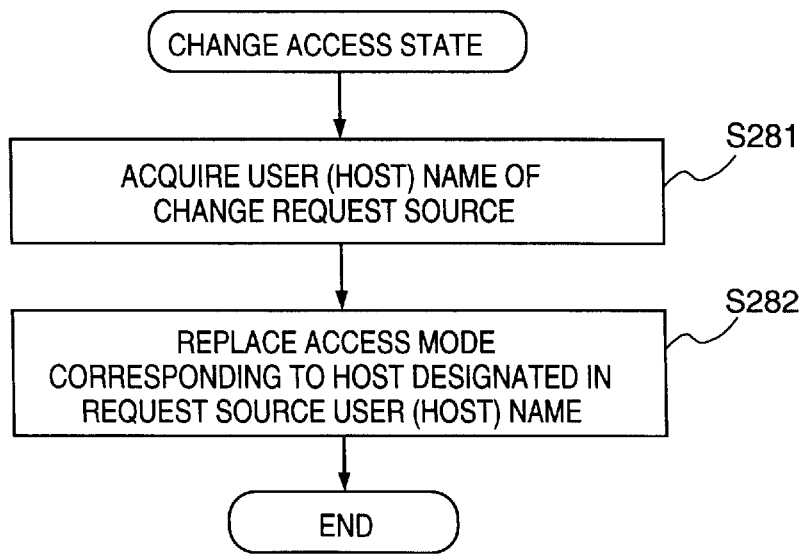
FIG. 27 shows an example of a program, i.e., a function for setting access permission.
FIG. 28 is a flow chart showing the processing for changing an access state.

Furthermore, in order to implement means for setting a permission of the right of access in units of users by a user himself or herself, a function [change_access_mode_1] with which the user changes the access permission lists 260 and 261 in the camera management server 245 is prepared. This function will be described below with reference to FIG. 27. This function is also executed by the camera management server 245.

The camera control client sets the host name, whose access permission is changed, in [target_name], and the changed access state in [access_mode] as variables of a [struct_change_in ••• change_in] type, and requests the camera management server 245 to execute [change_access_mode_1]. The camera management server 245 executes a command [gethost] as a library function of the UNIX to confirm the user (i.e. host name to say precisely) who called the command. Then, the server 245 changes the item of the camera indicated by [target_name] of the item of the user who called the command to a mode indicated by [access_mode]. As the contents of [access_mode], a mode for permitting an access, and a mode for inhibiting an access are set.

When the mode for permitting an access is set, "OK" is displayed in the list 261 shown in FIG. 25; when the mode for inhibiting an access is set, "NO" is displayed. Therefore, in this embodiment, the camera management server 245 can be considered as connection permission setting means.

Figure 29:
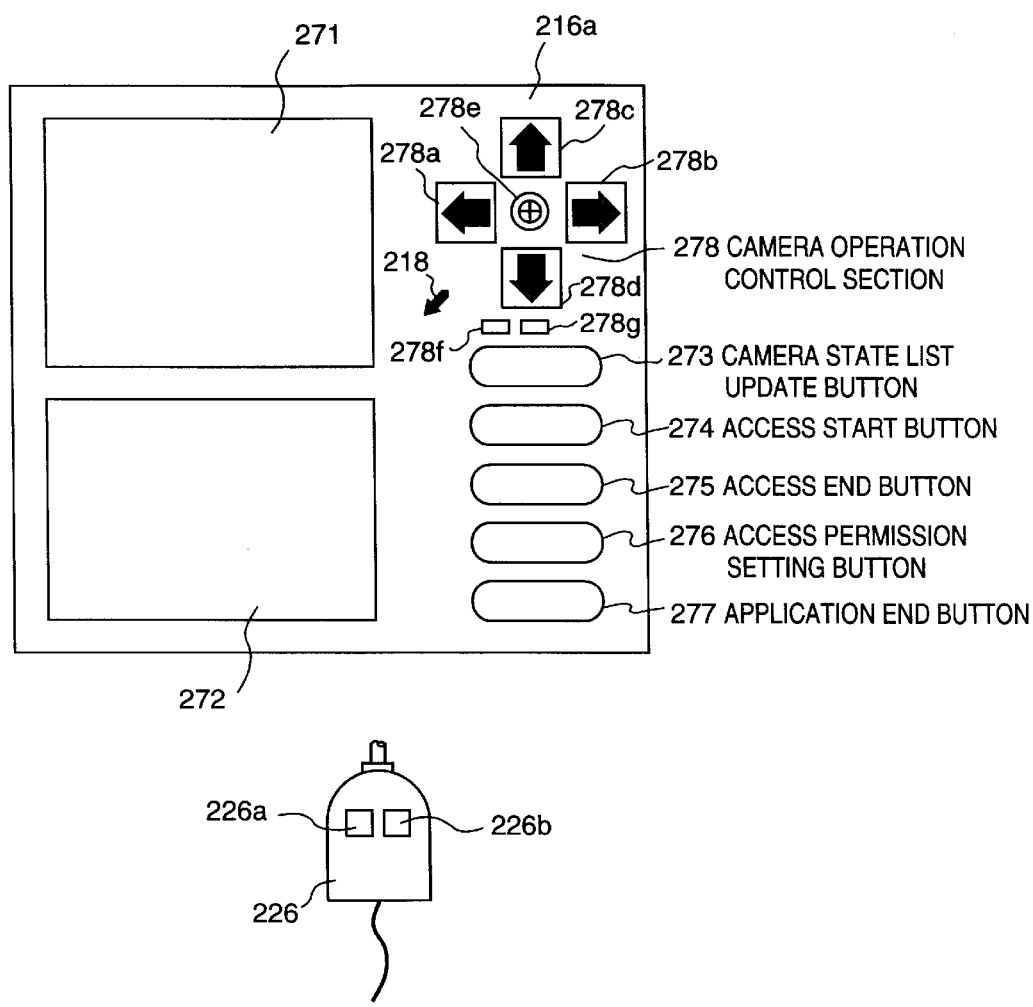
FIG. 29 is a view showing an example of a GUI.

In this embodiment, in order to realize means for accurately informing the access state to the user, and facilitating an access request, processing for changing the access permission state, and the like, a GUI (Graphical User Interface) shown in FIG. 29 is displayed on the screen 216a. With this GUI, the user can acquire information associated with the current registration state, user state, and use permission state of the camera devices 210. Also, with this GUI, the camera device 210 can be switched, and the access permission state can be changed. An example of an operation using the GUI shown in FIG. 29 will be explained below.

The user can acquire the current access information of the cameras from the camera management server 245 by depressing a list update button 273 by a method similar to the method using the RPC described above. The button is depressed by moving a cursor 218 to a position on a desired button by operating the mouse 226, and clicking a first button 226a of the mouse. The acquired information is displayed on a list window 272. On the other hand, the user can set a camera device 210 to be controlled by operating the mouse 226 or the keyboard 227 on the camera state list 250 displayed on this list window 272.

The above-mentioned access request processing and the access end processing, i.e., the sequence shown in FIG. 26, are respectively executed by depressing an access start button 274 and an access end button, 275. On the other hand, in the above-mentioned access permission state change processing, i.e., the sequence shown in FIG. 28, by depressing an access permission setting button 276, an image of the list corresponding to the access permission list 260 is displayed on the list window 272, and a desired access permission state can be changed by operating the mouse 226 or the keyboard 227 on the list. An application end button 277 is depressed when all the operations end. Therefore, in this embodiment, the mouse 226 or the keyboard 227 can be considered as a portion of the setting means or the connection permission setting means.

An image window 271 is arranged on the screen 216a, and an image picked up by the camera device 210 is displayed. The user can control the camera device 210 by operating pan operation buttons 278a and 278b, tilt operation buttons 278c and 278d, a home position return button 278e, and zoom operation buttons 278f (enlargement) and 278g (reduction) in a camera control section 278 on the screen 216a. With this control, an image to be displayed on the image window 271 is changed. This control is attained by moving the cursor 218 to a position on a predetermined button using the mouse 226, and clicking the first button 226a of the mouse. Note that the operation buttons 278a, 278b, 278c, and 278d are arranged in correspondence with the pan and tilt moving directions, and are easily identified. On the other hand, since the home position return button 278e is arranged, the camera device 210 can be easily returned to its home position (reference position: the centers of the pivot angles in the pan and tilt directions in this embodiment). In addition, since this button 278e is disposed at the central blank space of the operation buttons 278a, 278b, 278c, and 278d, returning the camera device to its home position can be visually understood, resulting in an easy operation for the user. Note that only one zoom operation button may be arranged, and the enlargement/reduction may be designated by the first button 226a or a second button 226b on the mouse.

A case will be exemplified below wherein a video meeting is held by operating the above-mentioned GUI.

Prior to the beginning of the video meeting, the video meeting programs 240 and 242, the camera management server 245, the camera control server 241, and the camera control panel 243 are started. In consideration of the functions of these programs, the programs are preferably started in this order. However, the programs may be simultaneously started in synchronism with the power-ON operation of the camera device 210. When the user wants to participate in a video meeting already in session, the camera management server 245 need not be started.

In this state, when the user wants to participate in a video meeting, he or she depresses the list update button 273 to display the camera state list 250 on the list window 272, selects one to be operated of the camera devices 210 displayed in the camera state list 250, and subsequently depresses the access start button 274. With these operations, the above-mentioned access processing is performed, and the camera device 210 can be controlled.

When the user exits the video meeting, he or she depresses the access end button 275. At this time, the function [access_end_1] is executed. In this state, since the camera device 210 is connected to the network 230, it can be controlled by another user, and image information transmitted from the camera device 210 can be displayed on the display device 216. When all the operations end, the user depresses the application end button 277.

To summarize the above description, the sequence for accessing the camera from the camera control panel 243 will be described below with reference to the flow charts.

Figure 30:
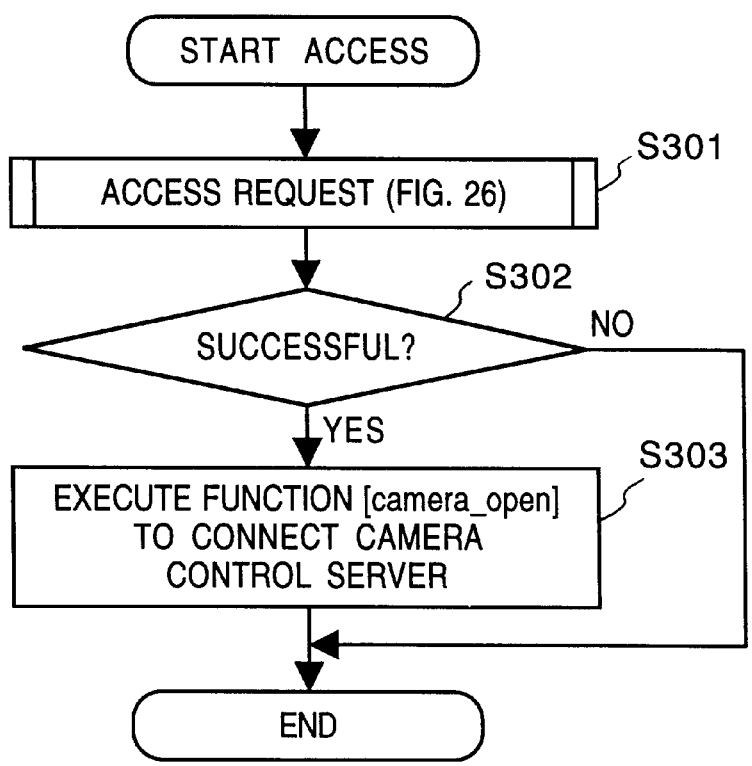
FIG. 30 is a flow chart showing the access start processing.

FIG. 30 shows the sequence executed upon depression of the access start button 274. First, an access request is issued to the camera management server 241, and the server 241 executes the sequence shown in FIG. 26 (S301). If an access is permitted (Y in S302), a camera open request is issued to the camera control server 241, and the server 241 executes the function [camera_open] to connect the user who issued the request and the camera control server 241.

Figure 31:
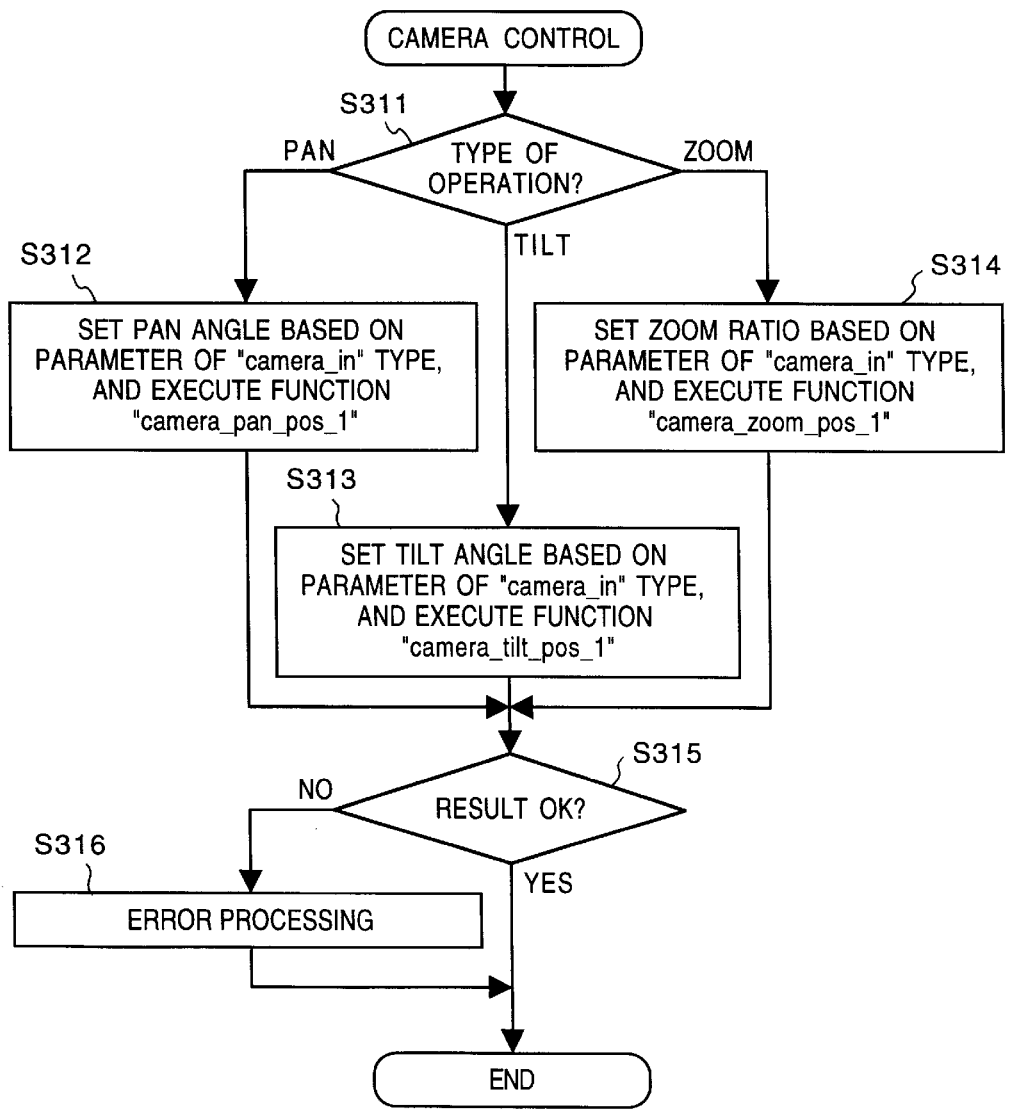
FIG. 31 is a flow chart showing the sequence for controlling a camera.

FIG. 31 shows the sequence of the processing executed by the camera control server 241 in correspondence with the type of operation upon operation of each of the buttons in the camera operation control section.

When a pan operation is performed, the pan angle is set to be a value corresponding to the operation, and a function [camera_pan_pos_1] is executed as the parameter of [camera_in] type (S312). With this processing, the camera panpod 214 is panned through the angle designated by the parameter.

When a tilt operation is performed, the tilt angle is set to be a value corresponding to the operation, and a function [camera_tilt_pos_1] is executed as the parameter of [camera_in] type (S313). With this processing, the camera panpod 214 is tilted through the angle designated by the parameter.

When a zoom operation is performed, the zoom ratio is set to be a value corresponding to the operation, and a function [camera_zoom_pos_1] is executed as the parameter of [camera_in] type (S314). With this processing, the camera is zoomed to the ratio designated by the parameter.

Figure 32:
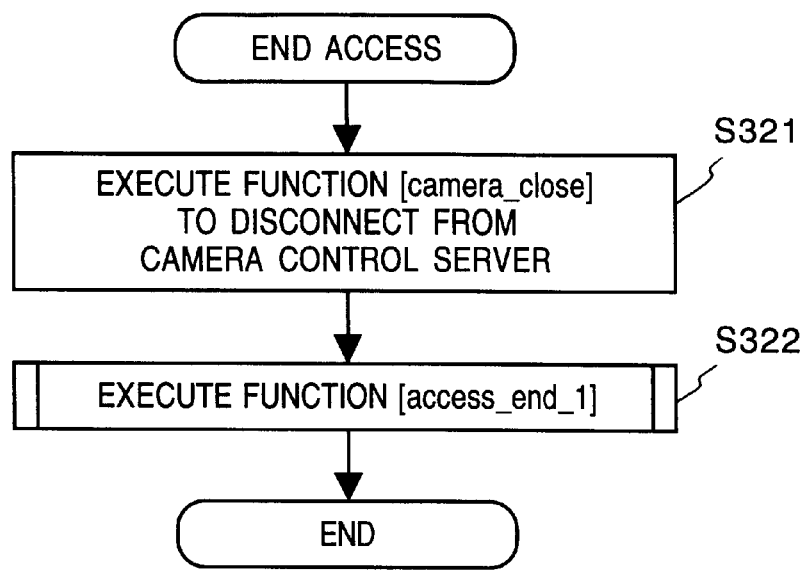
FIG. 32 is a flow chart showing the access end processing.

FIG. 32 shows the sequence executed when the access end button 275 is depressed.

Figure 33:
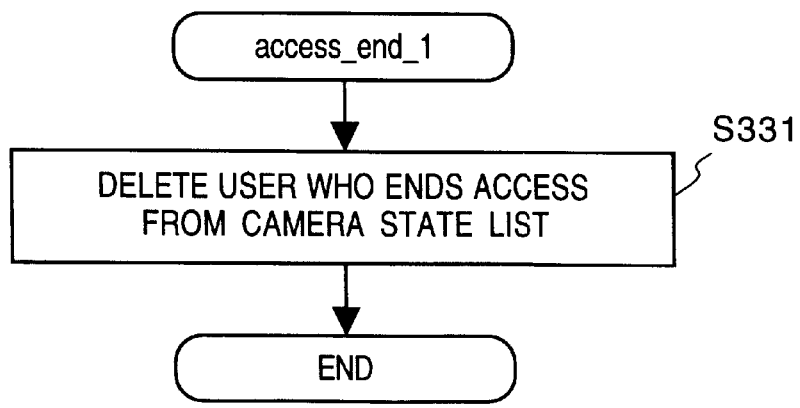
FIG. 33 is a flow chart showing the sequence of a function [access_end_1]

The camera control panel 243 requests the camera control server 241 to execute a function [camera_close] to disconnect the user from the camera (S321), and requests the camera management server 245 to execute the function [access_end_1] (S322). The function [access_end_1] is executed by the camera management server 245, and the user as the parameter of the function, i.e., the host where the access end button was depressed, is deleted from the host computer which is using the camera state list (S331 in FIG. 33).

Figure 34:
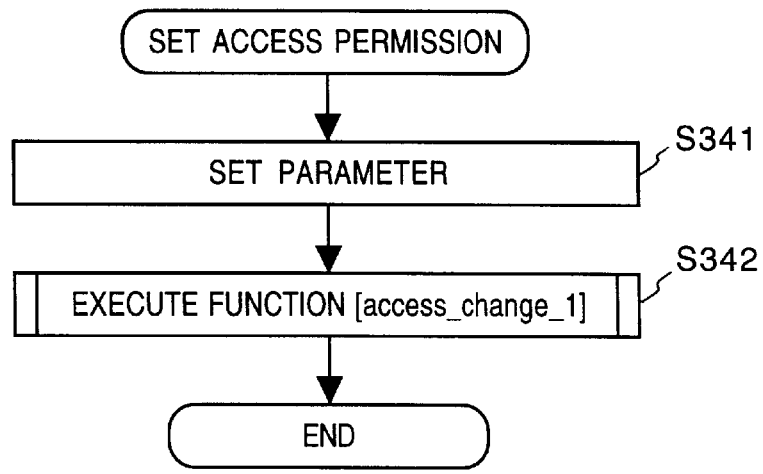
FIG. 34 is a flow chart showing the access permission setting processing.

FIG. 34 shows the sequence executed when the access permission setting button 276 is depressed.

The camera control panel 243 sets the access permission state (OK or NO), which is set by an operator based on the displayed access permission list, as the parameter (S341), and requests the camera management server 245 to execute the function [access_change_1]. In this manner, the access permission list is changed, as set by the parameter (S342).

In this embodiment, operations and functions described as those of the user can also be regarded as those of the camera controller 202.

As described above, according to the present invention, a camera device control system in which a large number of users can control camera devices connected to a network as needed without stopping the system can be provided.

Also, a camera device control system in which a user can easily participate in or exit a video meeting can be provided.

Fourth Embodiment

The fourth embodiment of the present invention will be described below with reference to the accompanying drawings.

FIG. 1 is a schematic block diagram showing the arrangement of a video control system according to the fourth embodiment. Since the system arrangement is the same as that in the first embodiment, a detailed description thereof will be omitted.

Note that the secondary memory 26 stores a camera information file storing position information and view field information of each camera 10, a camera state table storing the current camera state information, and icon (camera icon) data indicating the respective cameras 10 in this embodiment, in addition to map data indicating the layout of the cameras 10 The camera information file and the camera state table will be described in detail later.

In this embodiment, cameras to be operated are assumed to include cameras that allow all the pan, tilt, and zoom functions to be externally controlled, cameras that allow only the zoom function to be externally controlled, and cameras which cannot be externally controlled, and these cameras will be referred to as rotation/zoom controllable cameras, zoom controllable cameras, and uncontrollable cameras hereinafter. Therefore, the camera control characteristics stored in the secondary memory 26 must distinguish at least these rotation/zoom controllable, zoom controllable, and uncontrollable cameras from each other. As for individual elements (rotations and zoom), the controllable ranges may be stored. In the case of an uncontrollable camera, the upper and lower limit values of its controllable range need only be set to be equal to each other. The camera control circuit 12 accepts all pan, tilt, and zoom commands if a rotation/zoom controllable camera 10 is connected thereto. However, if a zoom controllable camera 10 is connected to the circuit 12, the circuit 12 accepts only the zoom command, and if an uncontrollable camera 10 is connected to the circuit 12, the circuit 12 accepts none of these commands. If an unacceptable command is input to the circuit 12, the circuit 12 returns an error signal to the unit 20.

Figure 35:
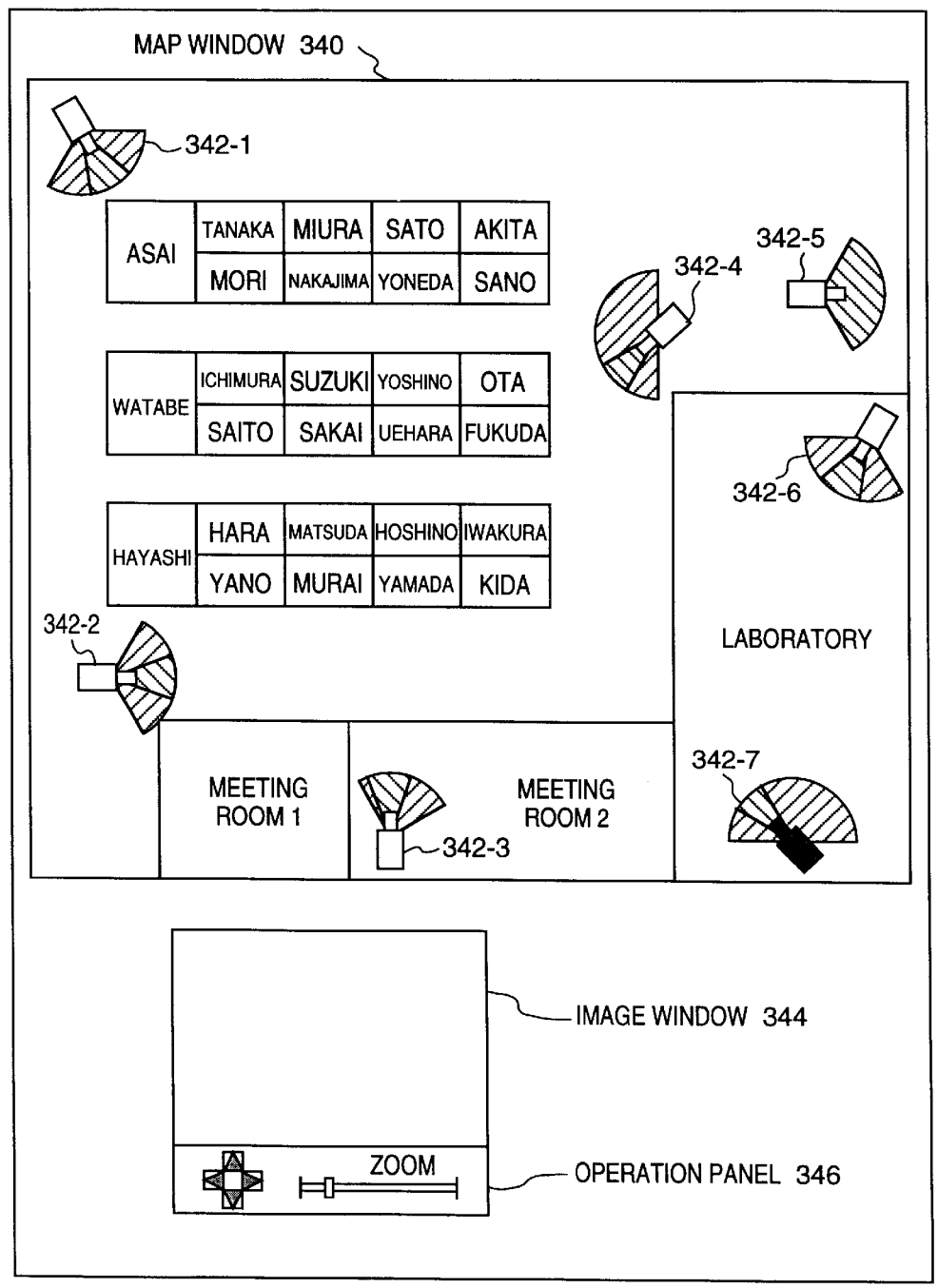
FIG. 35 is a view showing an example of a screen of the fourth embodiment.

FIG. 35 shows an example of the display screen on the bit-map display 28. Assume that a window display system capable of simultaneously displaying a plurality of windows is running on the bit-map display 28. A map indicating, e.g., the office layout is displayed on a map window 340, and camera icons 342-1 to 342-7 indicating the positions of the plurality of cameras 10 disposed in the office are displayed on the map. As will be described in detail later, the camera icons 342-1 to 342-7 are displayed in substantially the same directions as those of the corresponding cameras, and their pan ranges and current field angles are simultaneously displayed.

An image output from the camera 10 selected by the camera selector 32 is displayed on an image window 344. Note that the camera icon corresponding to the selected camera is displayed in a color different from those corresponding to the non-selected cameras so as to identify the selected camera 10 on the map window 340.

An operation panel 346 is displayed under the image window 344. On the operation panel 346, rotation operation buttons used for the pan and tilt operations and a slide button used for the zoom operation are displayed. By operating these buttons, the rotation and zoom operations of an arbitrary designated camera can be attained. When the selected camera is a zoom controllable camera (i.e., a rotation uncontrollable camera), the rotation operation buttons are displayed in an inoperable state, and when the selected camera is an uncontrollable camera, both the rotation and zoom operation buttons are displayed in an inoperable state.

Figure 36:
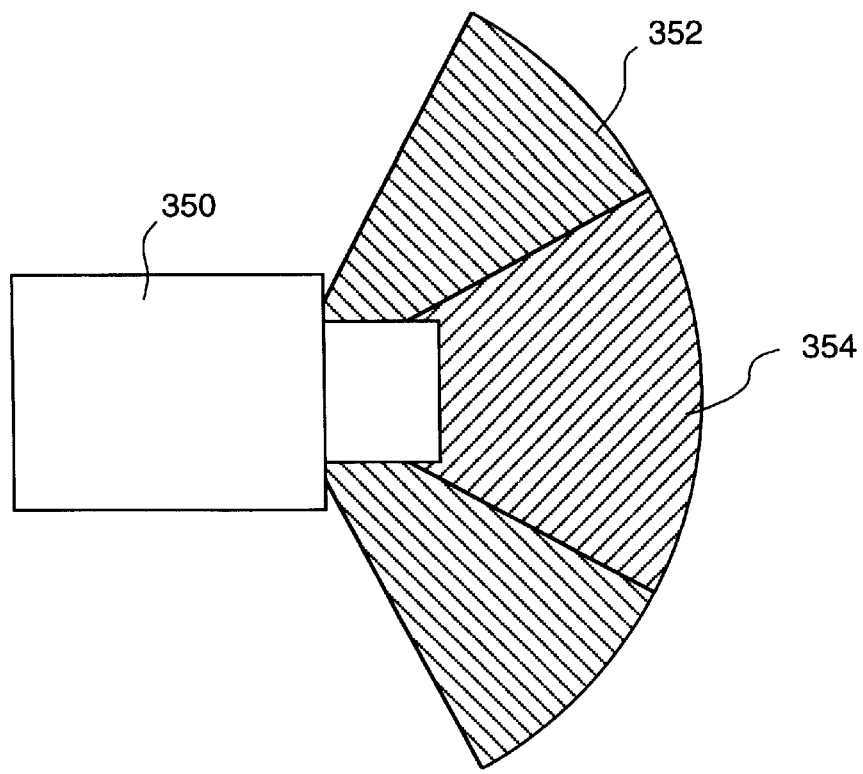
FIG. 36 is a view showing the basic arrangement of a camera icon.

FIG. 36 is an enlarged view of the camera icons 342-1 to 342-7. The camera icon of this embodiment is formed by a camera body FIG. 350 indicating the current direction of the camera, a fan-shaped maximum pan angle FIG. 352 indicating the maximum pan angle range, and a fan-shaped current field angle FIG. 354 indicating the current photographing range. In the uncontrollable camera, the maximum pan angle FIG. 352 has a fan shape having an angle of 0°, i.e., becomes a straight line. In this case, whether or not such a line is displayed depends on a user's favor. For this reason, whether or not such a line is displayed is preferably selected by a user The maximum pan angle FIG. 352 and the current field angle FIG. 354 should have different display colors and patterns to be sufficiently identifiable from each other. The current field angle is determined by the focal length of the photographing lens.

FIG. 37 shows the architecture of the camera information file and an example of data. As shown in FIG. 37, the camera information file stores the camera number as a serial number inherent to the camera, the camera setting position (X, Y), the camera setting direction (the direction of the center of the camera when the pan angle=0°), the control characteristics (0: rotation/zoom controllable, 1: zoom controllable, 2: uncontrollable), the maximum field angle (the field angle when the zoom ratio=1.0), the maximum pan angle, and the maximum zoom ratio. Note that the camera setting angle is expressed as an angle with respect to an x-axis while assuming an x-y coordinate system on the map.

FIG. 38 shows the architecture of the camera state table and an example of data. As shown in FIG. 38, the camera state table stores the camera number, the current camera direction, and the current zoom ratio. The camera number in the camera state table is used for linking the camera information file shown in FIG. 37. As for the current camera direction and the current zoom ratio, each time a mouse operation is performed on the operation panel 346, the corresponding portion of the selected camera is updated. The current camera direction is effective for only cameras having the rotation function, and the current zoom ratio is effectively for only cameras having the zoom function.

Figure 39:
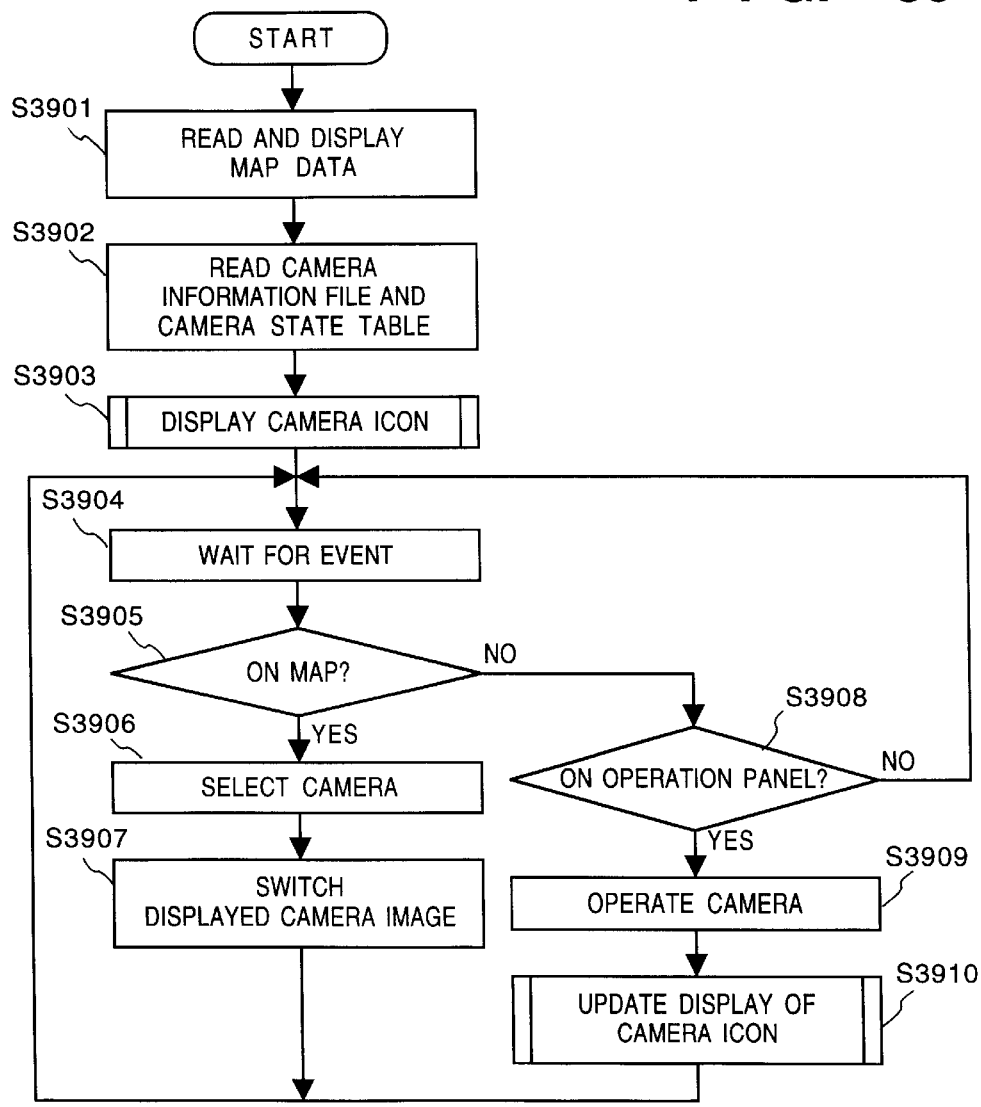
FIG. 39 is an operation flow chart of the fourth embodiment.

FIG. 39 is a flow chart showing the map display operation by the CPU 22 in this embodiment.

The CPU 22 reads map data stored in the secondary memory 26, and displays the read map on the map window 340 (step S3901). Then, the CPU 22 reads the camera information file storing the position information and view field information of the disposed cameras, and the camera state table storing the current camera state information (step S3902), and draws the camera icons 342-1 to 342-7 on the corresponding positions on the map window 340 on the basis of these pieces of information, as shown in FIG. 35 (step S3903). The CPU 22 then waits for a mouse operation by a user (step S3904).

When one of the camera icons 342-1 to 342-7 on the map window 340 as selected by clicking the mouse (step S3905), the CPU 22 changes the color of the selected one of the camera icons 342 1 to 342-7 to one (in this case, red) indicating the selected state, and acquires the camera number of the camera icon from the camera information file (step S3906). Assume that the camera 10-*n* is selected. The CPU 22 supplies a camera switch command to the camera selector 32 to switch the control signal line and the camera output to those of the camera 10-*n* (step S3907). The output from the camera 10-*n* is supplied to the display 28 via the camera selector 32, the video capture device 34, and the bus 38, and an output image is displayed on the image window 344.

If the operation panel 346 under the image window 344 is operated (step S3908), the CPU 22 transmits a camera control command corresponding to the operation contents to the camera control circuit 12-*n* via the camera selector 32 (step S3909). Of course, the user is allowed to perform only an operation corresponding to the control characteristics (rotation/zoom controllable, zoom controllable, or uncontrollable) of the currently selected camera 10-*n*. The camera control circuit 12-*n* controls the camera 10-*n* in accordance with the received camera control command. At the same time, the CPU 22 updates the display state of the selected camera icon to match a new state.

Figure 40:
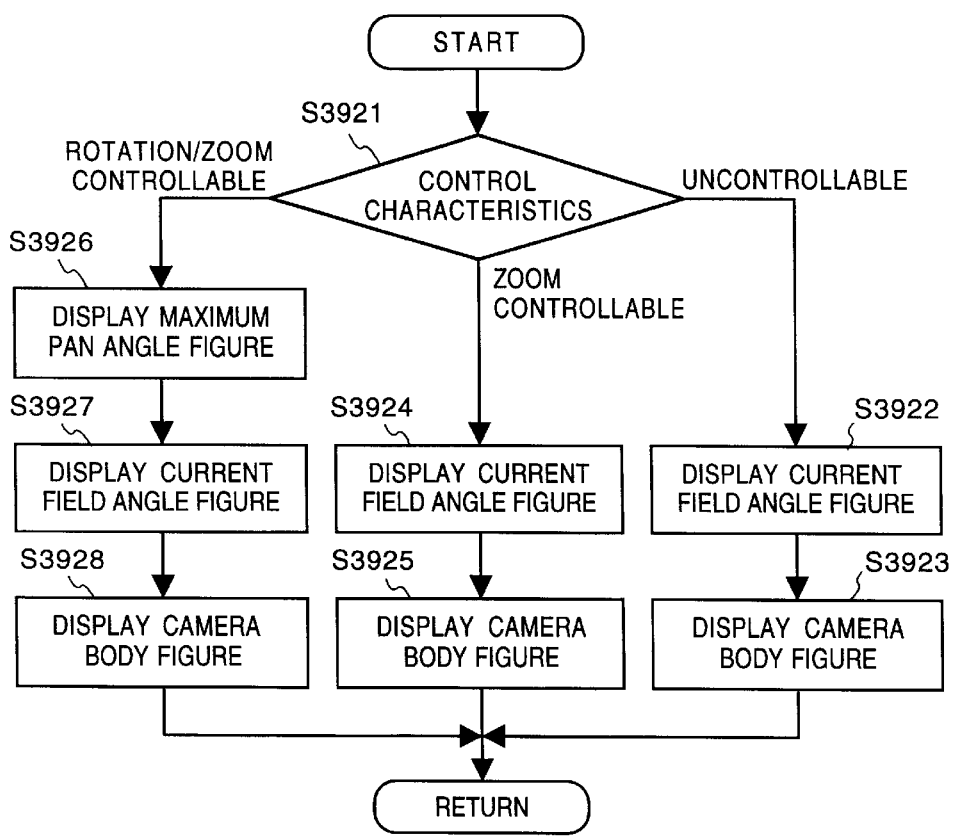
FIG. 40 is a flow chart showing the camera icon display processing in correspondence with camera control characteristics.
Figure 41:
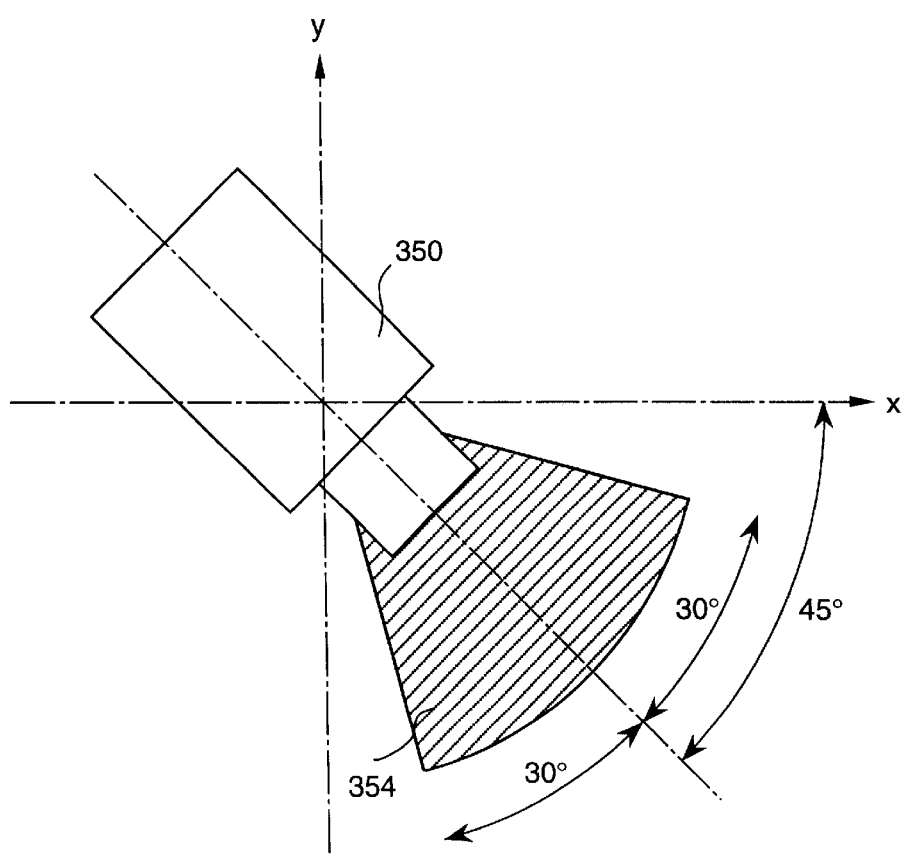
FIG. 41 shows display example 1 of the camera icon.

The display operation (step S3903) and the updating operating (step S3910) of the camera icon will be described in detail below with reference to FIG. 40. Different processing operations are performed depending on the control characteristics (step S3921). If the currently selected camera is an uncontrollable one (step S3921), the current field angle FIG. 354 is displayed (step S3922). The current field angle FIG. 354 to be drawn has a fan shape which has a predetermined radius and spreads through an angle ½ the maximum field angle on the two sides of the camera setting direction to have the camera setting position as the center. Then, the camera body FIG. 350 is displayed to be superposed on the current field angle FIG. 354 in a state wherein the center of the FIG. 350 is set at the camera setting coordinate position, and the FIG. 350 points to the camera setting direction (step S3923). For example, the camera icon corresponding to camera number 3 in FIG. 37 is displayed, as shown in FIG. 41.

Figure 42:
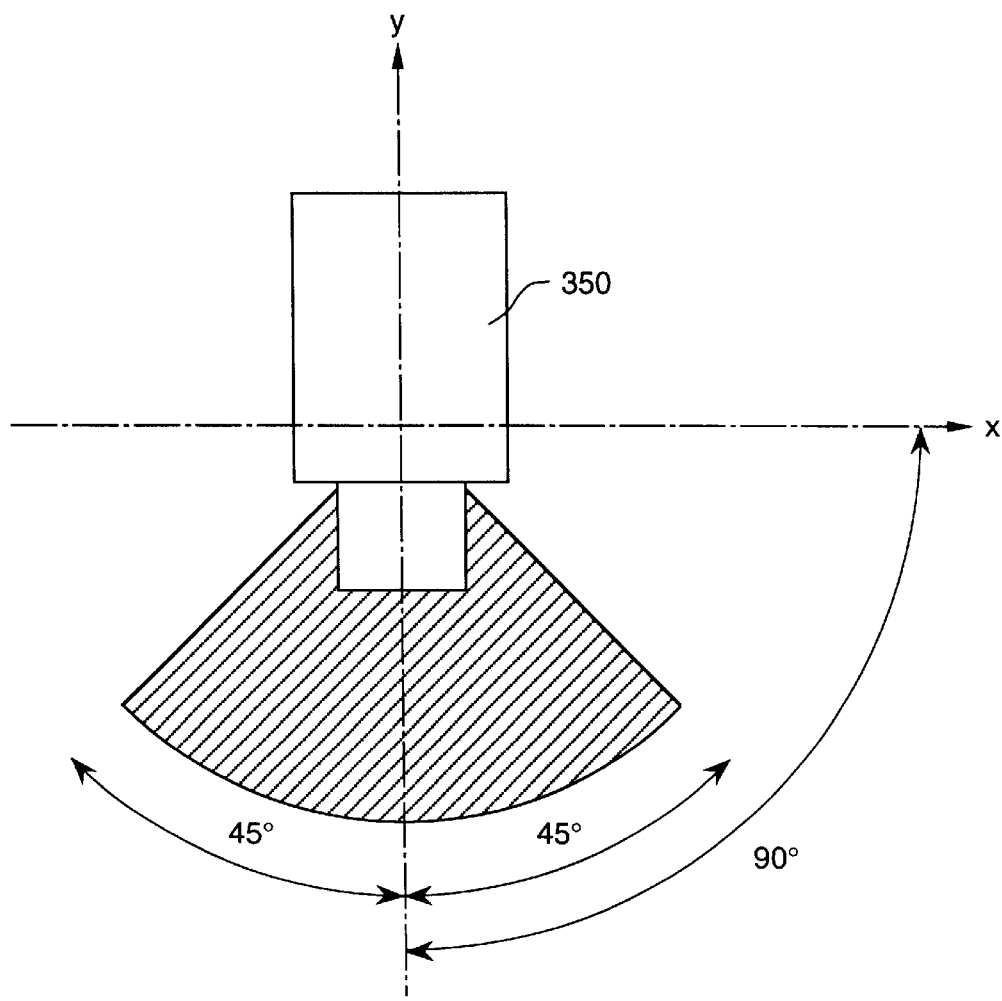
FIG. 42 shows display example 2 of the camera icon.

If the currently selected camera is a zoom controllable one (step S3921), the current field angle FIG. 354 is displayed (step S3924). The current field angle FIG. 354 to be drawn has a fan shape which has a predetermined radius and spreads through an angle ½ the maximum field angle on the two sides of the camera setting direction to have the camera setting position as the center. Then, the camera body FIG. 350 is displayed to be superposed on the current field angle FIG. 354 in a state wherein the center of the FIG. 350 is set at the camera setting coordinate position, and the FIG. 350 points to the camera setting direction (step S3925). For example, the camera icon corresponding to camera number 4 in FIG. 37 is displayed, as shown in FIG. 42, in the current state shown in FIG. 38.

Figure 43:
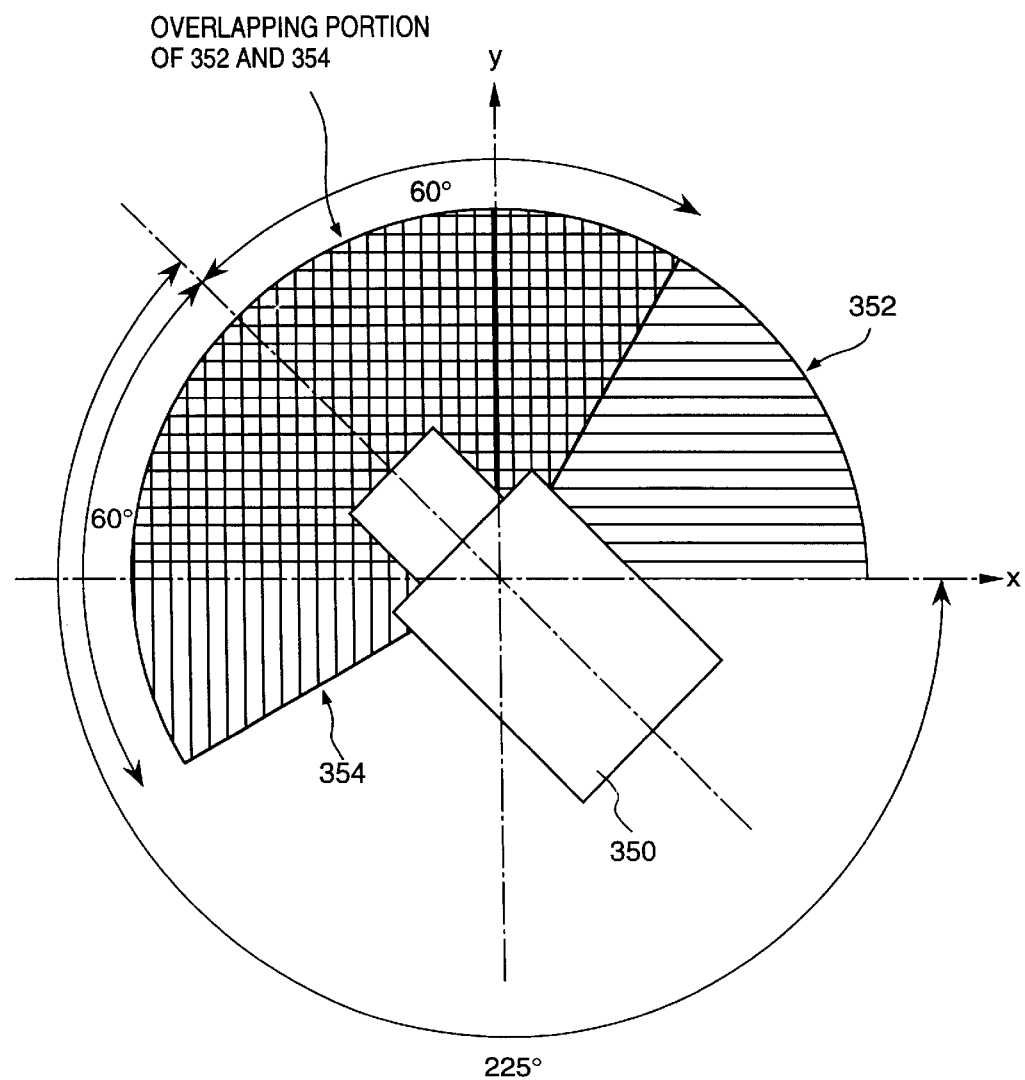
FIG. 43 shows display example 3 of the camera icon.

If the currently selected camera is a rotation/zoom controllable one (step S3921), the maximum pan angle FIG. 352 is displayed (step S3926). The maximum pan angle FIG. 352 to be drawn has a fan shape which has a predetermined radius and spreads through an angle ½ the maximum pan angle on the two sides of the camera setting direction to have the camera setting position as the center. Then, the current field angle FIG. 354 is displayed on the maximum pan angle FIG. 352 (step S3927). The current field angle FIG. 354 to be drawn has a fan shape which has a predetermined radius and spreads through an angle ½ the current field angle on the two sides of the current camera direction to have the camera setting position as the center. Finally, the camera body FIG. 350 is displayed to be superposed on the maximum pan angle FIG. 352 and the current field angle FIG. 354 so that its center is set at the camera setting position, and it points to the camera direction (step S3928). For example, the camera icon corresponding to camera number 5 in FIG. 37 is displayed, as shown in FIG. 43, in the current state shown in FIG. 38. More specifically, the camera points to the direction of 255°, and its pan angle is 180° to have, as the center, 270° as the setting angle. On the other hand, the field angle is 120° to have the camera direction as the center.

Camera control signals to be supplied from the CPU 22 to the camera control circuit 12 via the camera selector 32 in response to an operation on the operation panel 346 can be the same as control commands for a normal externally controllable camera. In this embodiment, for example, when a right-arrow button on the operation panel 346 is depressed, the CPU 22 supplies a pan control command in the clockwise direction to the camera control circuit 12 of the camera 10 selected at that time via the camera selector 32. At the same time, the CPU 22 updates the current camera direction and the current zoom ratio in the camera state table.

The current field angle, θc, of the camera is calculated according to the following formula on the basis of the maximum field angle, θmax, and the current zoom ratio, K:

$$\theta c = 2 \arctan\{(\tan(\theta max/2))/K\}$$

In this embodiment, the current camera directions of all the externally controllable cameras are set to be values equal to those of their camera setting directions as initial values in the camera state table, and the current zoom ratio is set to be 1.0.

The above-mentioned embodiment can be easily extended to a system that can be applied to a network. For example, as shown in FIG. 6, a plurality of camera operation apparatuses 50-1 to 50-n each having the same arrangement as that of the camera control system shown in FIG. 1 are connected to a network 52. As the network 52, a local area network LAN or a wide area network WAN which has a bandwidth large enough to transmit digital motion image data captured by the video capture device 34 and camera control signals is assumed. However, the present invention is not limited to these networks.

Each of the camera operation apparatuses 50-1 to 50-n can output video data captured by the video capture device 34 as a packet via the network interface 36, and can receive a video data packet from the network 52. The bit-map display 28 displays video data captured by the video capture device 34 and video data received from the network 52 on the image window. Each of the camera operation apparatuses 50-1 to 50-n can transmit data onto the network 52 via the network interface 36, and can receive data from the network 52. The camera operation commands and the camera switch command received from the network 52 are processed in the same manner as those generated in each apparatus. Such a technique is known to those who are skilled in the art.

Note that the camera information additionally includes an item of apparatus addresses and an item of map names (i.e., office names) in correspondence with the network, as shown in FIG. 44. Upon selection of a camera, the apparatus address and/or the map name must be selected using, e.g., a menu to switch the camera operation apparatus and/or the map. Note that the item of map names is effective not only for the network but also for a case wherein cameras are disposed at remote places, and cannot be drawn on a single map. More specifically, a plurality of maps need be selectively displayed on the map window 340. Upon selection of a camera, the map and/or the camera operation apparatus to which the camera to be operated is connected are and/or is selected using, e.g., a menu as needed.

When the camera to be controlled is selected, and its camera number is detected, the table shown in FIG. 44 is looked up to obtain the apparatus address based on the camera number. When the selected camera cannot be directly controlled, i.e., must be controlled via the network, camera operation commands and camera switch command are issued via the network. In the camera image display operation, if the camera operation apparatus at which a camera operation input is performed is represented by A, and the camera operation apparatus to which the selected camera is connected is represented by B, when the map is displayed and the camera is selected, the apparatus A requests the apparatus B to transmit a camera image, and video data captured by the apparatus B is transmitted to the apparatus A via the network.

As described above, when this embodiment is applied to a network, even when the number of inputs of the camera input selector is limited, a larger number of cameras can be controlled. One or a plurality of cameras at remote places can be easily bidirectionally controlled.

The pan angle range is expressed by the maximum pan angle figure. In place of or in addition to this figure, an image inputtable range may be displayed as a figure on the basis of the maximum pan angle information and the maximum field angle information. For example, a fan shape which has a predetermined radius may be drawn and spreads through an angle corresponding to the sum of an angle ½ the maximum pan angle and an angle ½ the maximum field angle on the two sides of the camera setting direction to have the camera setting position as the center may be drawn. The central angle of this fan-shaped figure represents an actual maximum photographing range.

As can be easily understood from the above description, according to the system of this embodiment, since information such as the direction, view field angle, maximum pan angle, and the like of each video input means, i.e., the camera, is visually displayed, the performance and the current state of each video input means can be visually recognized. More specifically, a visual user interface that is easy to use can be provided.

Fifth Embodiment

The fifth embodiment of the present invention will be described in detail below with reference to the accompanying drawings.

Figure 45:
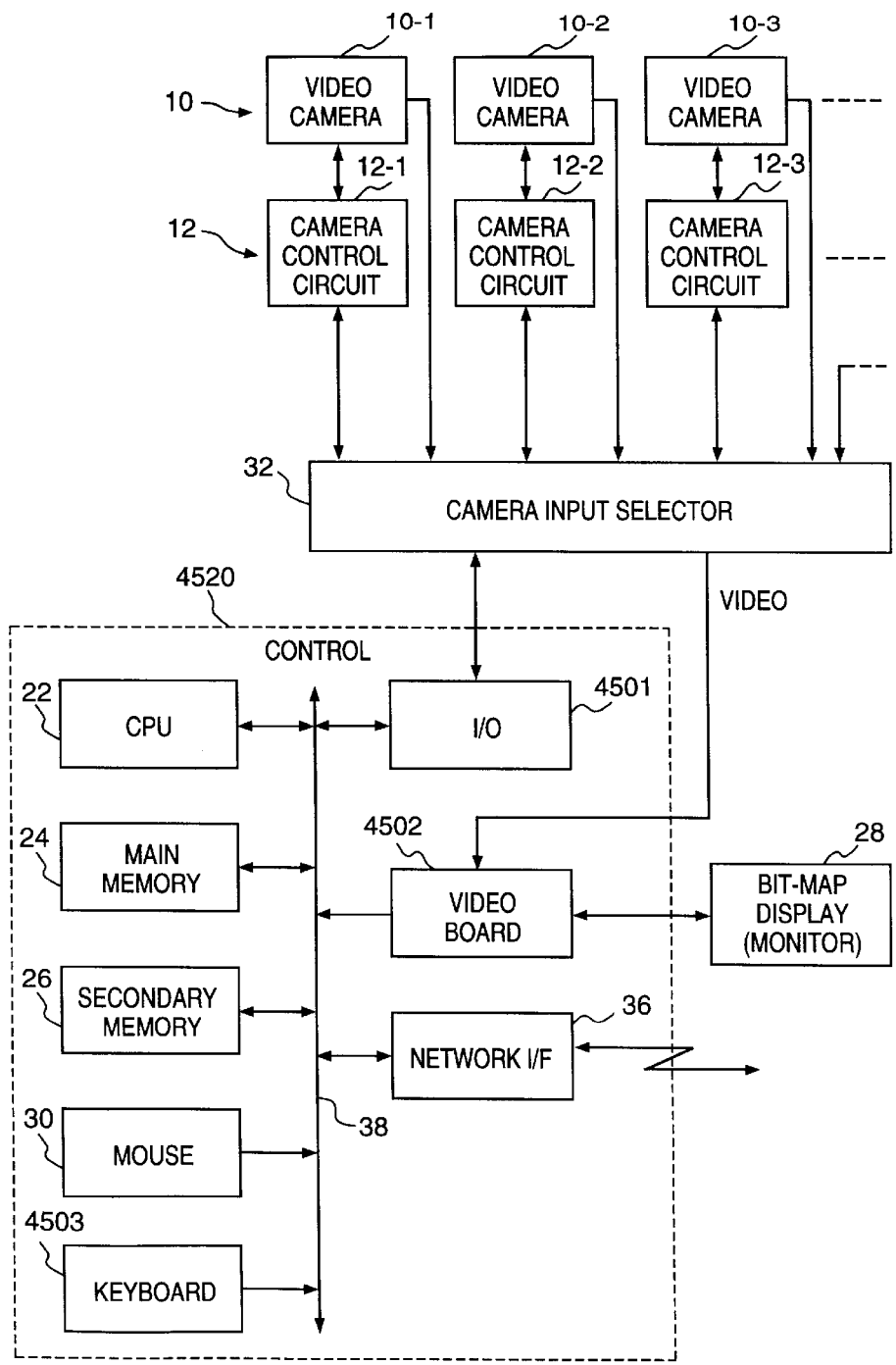
FIG. 45 is a schematic block diagram showing the schematic arrangement of a computer system according to the fifth embodiment of the present invention.

FIG. 45 is a schematic block diagram showing the arrangement of a video communication apparatus as a basic element in the fifth embodiment of the present invention, i.e., a computer system to which a plurality of camera devices are connected. Systems having the arrangement shown in FIG. 45 or systems having a similar arrangement are connected to each other via a computer network.

Referring to FIG. 45, reference numeral 10 (10-1, 10-2, 10-3, ...) denotes video cameras; 12 (12-1, 12-2, 12-3, ...), camera control circuits for directly controlling panning, tilting, zooming, focusing, aperture adjustment, and the like in accordance with external control signals; and 32, a camera input selector for selecting one to be controlled of the video cameras 10, from which an output signal is to be fetched. Note that the output signal is normally a video signal, but in the case of a camera with a microphone, the output signal includes a video signal and an audio signal. In the following description, the output signal is assumed to be only a video signal. As control signal lines, for example, RS-232C interfaces are used. However, the present invention is not limited to these.

A camera operation unit 4520 controls the camera selector 32 via an I/O 4501, and supplies control commands to the desired camera control circuit 12 via the camera selector 32, thereby controlling the video camera 10 connected to the circuit 12. The camera operation unit 4520 comprises a computer system. Reference numeral 22 denotes a CPU for controlling the entire apparatus; 24, a main memory for storing programs and the like executed by the CPU 22; 26, a secondary memory (e.g., a hard disk device); 30, a mouse; and 4503, a keyboard.

Reference numeral 4501 denotes an I/O port for connecting the camera selector 32 and supplying camera control commands and the like to the camera selector 32; 4502, a video board for capturing a video signal output from the video camera 10 selected by the camera selector 32, and displaying various kinds of images on a bit-map display 28; 36, a network interface for connecting the unit 20 to a computer network or a communication network; and 38, a system bus for connecting the respective devices (the CPU 22 to the network interface 36). Using the network interface 36, camera control signals can be supplied from a remote place to the camera operation unit 20 via the network so as to control the camera 10.

The camera selector 32 selects one of the control signal lines and one of video outputs connected to the plurality of camera control circuits 12, and supplies the selected video output to the video board 4502. In addition, the camera selector 32 logically connects the selected control signal line to the I/O port 4501. As the format of a video signal, for example, an NTSC signal of the luminance color difference separation method is known. The video board 4502 captures the video output selected by the camera selector 32. The captured video signal is displayed as a motion image on a predetermined window of the bit-map display 28, or is transferred to another apparatus.

The secondary memory 26 stores various kinds of information associated with the cameras 10, for example, camera position information data, camera figure data, and the like. These data will be described in detail later.

When only one camera 10 is connected, the camera selector 32 can be omitted, and the camera control circuit 12 is directly connected to the I/O port 4501. When no image is transmitted, the camera 10, the camera control circuit 12, and the camera selector 32 are omitted.

Figure 46:
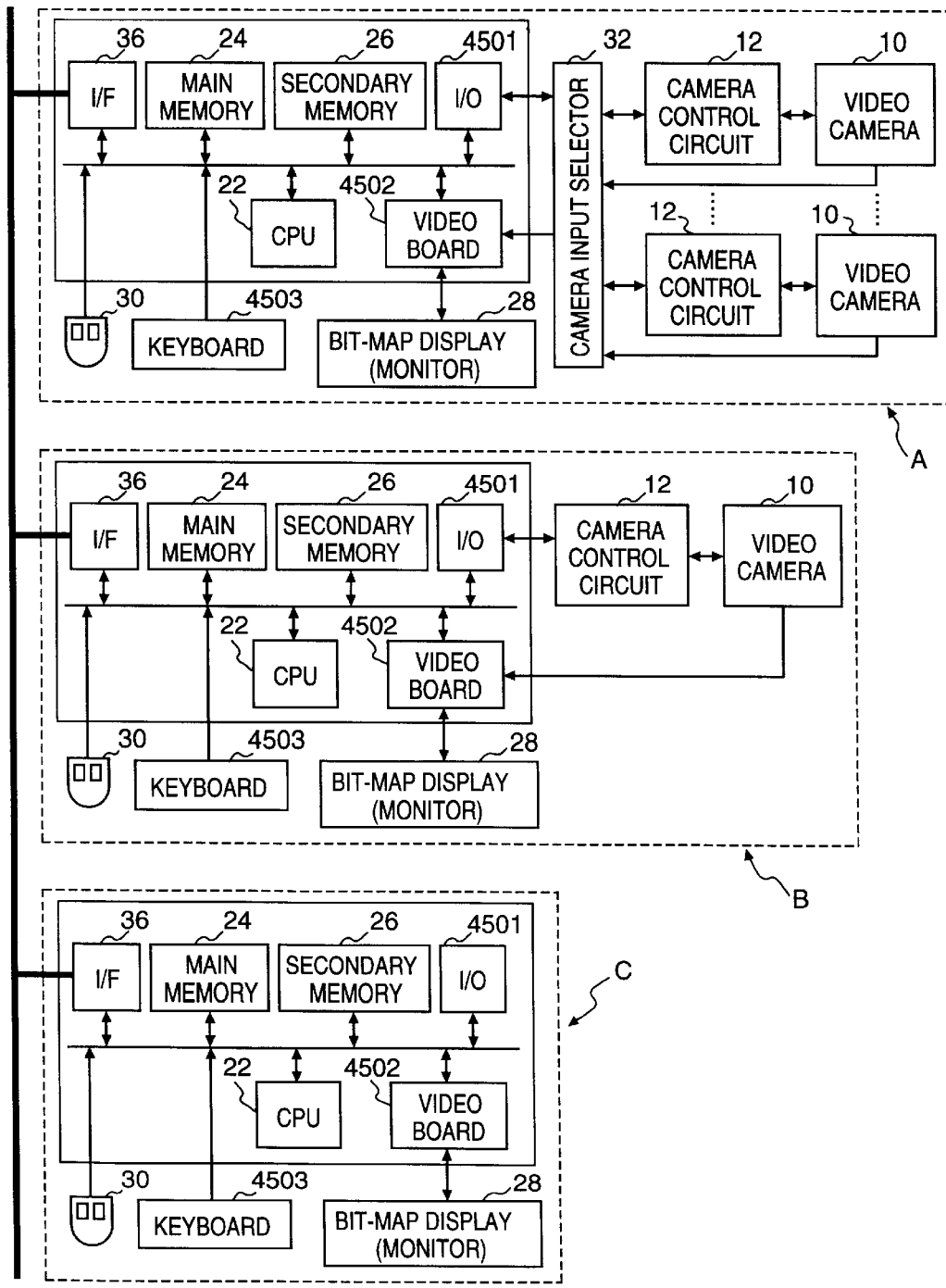
FIG. 46 is a schematic block diagram showing the hardware arrangement of the fifth embodiment in a network.

The apparatus shown in FIG. 45 is connected to a network, as shown in, e.g., FIG. 46. Referring to FIG. 46, a terminal A has the same arrangement as that of the apparatus shown in FIG. 45. In a terminal B, since only one camera is connected, the camera control circuit is directly connected to the I/O port. In a terminal C, no camera is connected. In general, the terminals A, B, and C with various arrangements are connected to a single network. As the network used in his embodiment, a LAN or WAN having a transmission and width large enough to transmit digital motion image data and camera control signal is assumed.

The video board 4502 has a video capture function, as described above, and supplies the captured video data not only to the bit-map display 28 to be displayed thereon, but also to the CPU 22 via the bus 38. The CPU 22 converts the video data into a packet, and outputs the packet onto the network via the network interface 36. From the network interface 36, camera operation commands, a camera switch command, and the like are also output onto the network as packets. Furthermore, information associated with the entire system is also sent onto the network as a packet. Such information is transmitted to a specified transfer destination or all the terminals depending on the contents of data to be transmitted and as needed.

The same applies to reception. More specifically, upon reception of video data, and camera operation and camera switch commands as packets, the terminals A, B, and C process the received data in the same manner as their internally captured data, and process the received camera operation and camera switch commands in the same manner as their internal commands. The information associated with the entire system is used for updating a system display of a user interface (to be described later).

Figure 47:
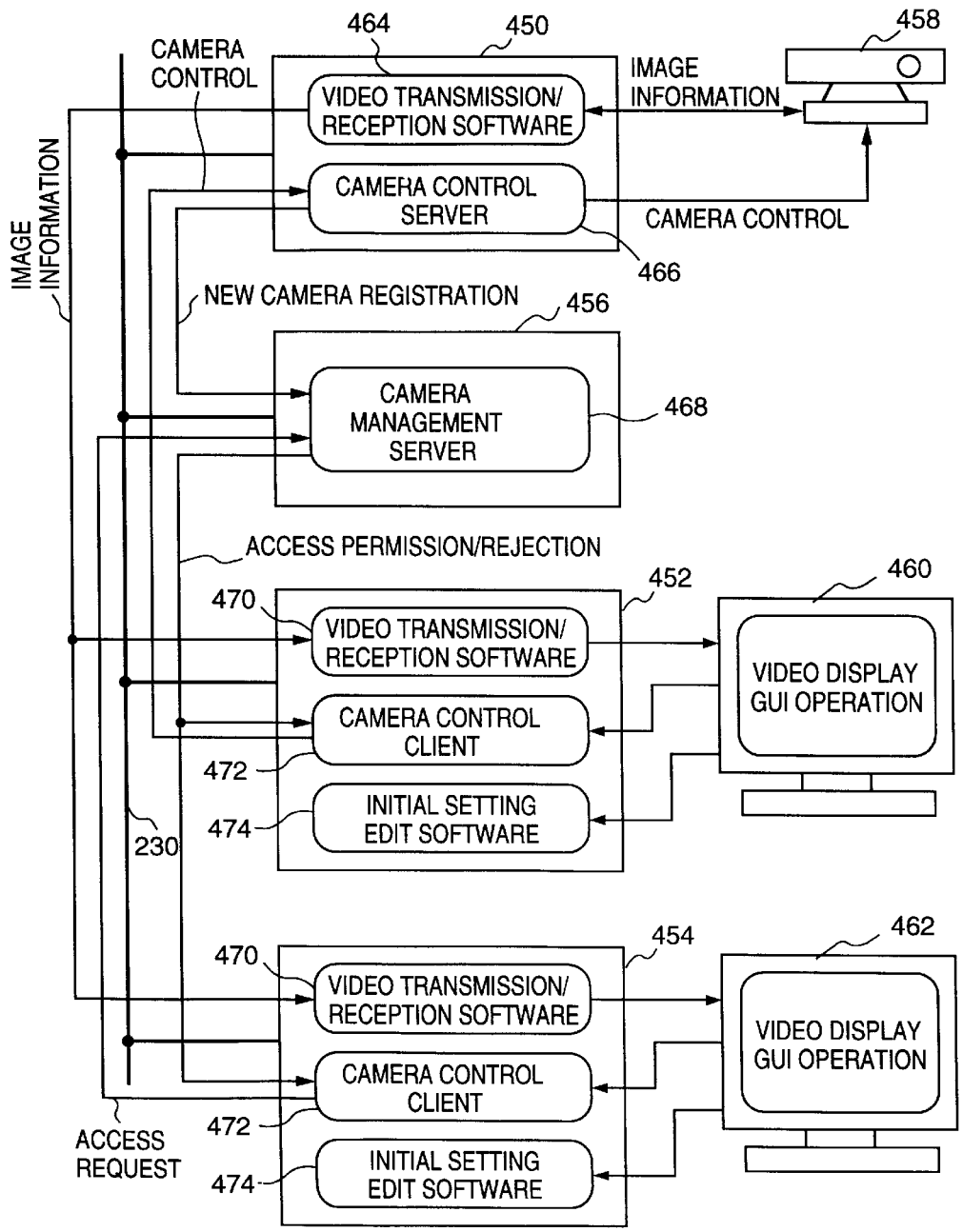
FIG. 47 is a schematic block diagram showing the software arrangement of the fifth embodiment in the network.

FIG. 47 shows the software arrangement in this embodiment. FIG. 47 illustrates software programs to be classified into software programs (servers) to be installed in a terminal to which a camera device is directly connected, and software programs (clients) to be installed in a terminal which remote-controls the camera device, in association with camera operations. Of course, in a normal use state, both the types of software programs are installed in a single terminal.

In FIG. 47, workstations 450, 452, 454, and 456 are connected to a network 457. A camera device 458 as the camera 10 is connected to the workstation 450, and monitors (bit-map displays) 460 and 462 are respectively connected to the workstations 452 and 454. The workstation 456 manages a camera which can be remote-controlled via the network, the rights, the use states, and the like in units of users in the network, as will be described later.

The workstation 450 stores a video transmission/reception software program for transmitting image information (motion image) obtained by the camera 458 to another workstation via the network 457, and a camera control server (software program) 466 for controlling the camera device 458 in accordance with camera control signals from other workstations 452 and 454.

In the workstation 456, a camera management server (software program) 468 is installed. The camera control server 466 reads a camera initial setting file including information shown in FIG. 48 upon starting of the camera 458, and informs the camera names and initial states (setting positions, initial directions, and zoom values) of all the cameras connected to a single workstation to the camera management server 468. The camera initial setting file is stored in the secondary memory. The camera management server 468 registers data indicating that the camera 458 can be actually utilized via the network 457 in a camera list in response to a registration request from the camera control server 466.

Each of the workstations 452 and 454 stores a video transmission/reception software program 470 for receiving an image (motion image) from the workstation 450 and displaying the received image on a corresponding one of the monitors 460 and 462, a camera control client (software program) 472 for displaying the state of the camera (in this case, the camera 458), displaying a camera display control panel used for remote-controlling a controllable camera, and processing the operation on the control panel, and an initial setting edit software program 474 for editing the initial setting data of this camera control system.

The users of the workstations 452 and 454 can look up, add, and correct various kinds of information managed by the camera management server 468 using their camera control clients 472, as will be described in detail later. Note that when the connection (reception of a picked-up image and remote control) with a camera (in this case, the camera 458) of another workstation is permitted by the camera management server 468, the camera control client 472 can transmit camera control signals to another workstation (in this case, the camera control server 466) without going through the camera management server 468.

In a normal use method, both a monitor and a camera device are connected to each workstation. For this reason, video transmission/reception software programs 464 and 470 normally comprise both the functions of video transmission and video reception. In general, each software program consists of a single program or a group of program modules. Each of the terminals A and C shown in FIG. 46 comprises the workstations 450 and 452 or 454 shown in FIG. 47, and the terminal B shown in FIG. 46 comprises the workstation 452 or 454. The workstation 456 shown in FIG. 47 corresponds to the terminal A, B, or C in FIG. 46.

The camera management server 468 is a software program for managing all the cameras which are open to the network 457 fully or limitedly. The camera management server 468 holds information associated with the camera names, setting positions, directions, and use states of all the cameras connected to the network 457, and manages registration upon connection of a camera to the network 457, deletion upon disconnection of a camera from the network 457, and access permission/rejection with respect to a camera access request from a user. Furthermore, the camera management server 468 periodically informs camera information to all the camera control clients via the network.

Figure 49:
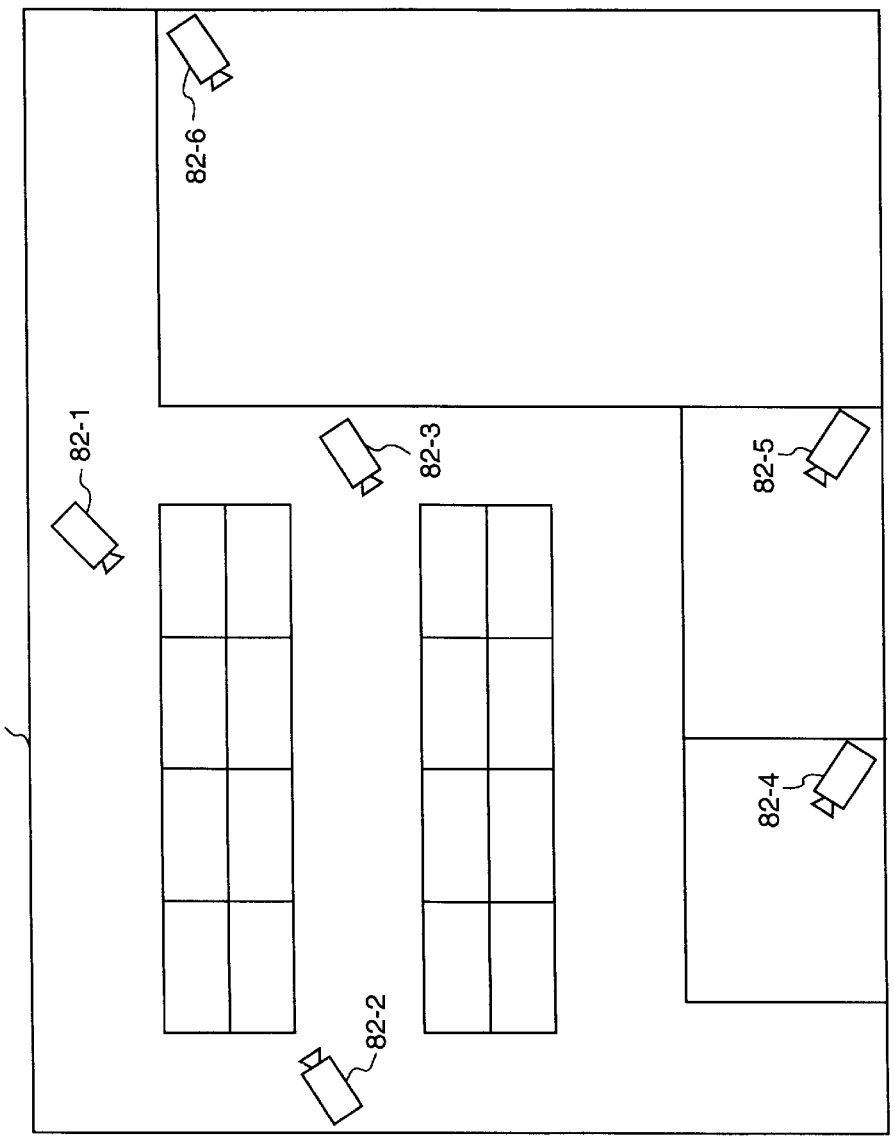
FIG. 49 is a view showing an example of a camera display control panel displayed on monitors 460 and 462 by a camera control client 472.

In FIG. 47, the camera management server 468 is installed in a special-purpose workstation, but may be installed in any one of workstations (in FIG. 47, the workstations 450, 452, and 454) connected to the network 457, as a matter of course. Alternatively, the camera management server may be installed in advance in all the terminals which are to be connected to the network, and the camera management server 468 may be started in one of two terminals which start, e.g., a video meeting for the first time FIG. 49 shows an example of the camera display control panel displayed on each of the monitors 460 and 462 by the camera control client 472. The camera control client 472 sets and displays, on the monitor screen, a map window 80 on which camera icons indicating the setting positions and directions of cameras are superimpose-displayed on a map indicating the setting positions of controllable cameras, an image window 84 for displaying a camera image, a camera operation panel 86 consisting of various camera control buttons, and current value display window 88 for displaying the parameter values of the currently selected camera. In this embodiment, assume that a window display system capable of simultaneously displaying a plurality of windows is running. On the map window 80, the map indicating the seat layout in an office is displayed, and camera icons 82-1 to 82-6 indicating the setting positions of cameras disposed in the office are displayed on the map. The camera icons 82-1 to 82-6 are displayed in substantially the same directions as the current directions of the corresponding cameras.

On the video window 84, an image output from the selected camera is displayed. Note that the camera icon corresponding to the selected camera is displayed in a color different from those of the camera icons corresponding to the non-selected cameras so as to identify the selected camera on the map window 80.

The operation panel 86 is displayed below the image window 84. The operation panel 86 comprises rotation operation buttons 861 used for pan and tilt operations, and two buttons 862 for a zoom operation. Upon operation of these buttons, rotation and zoom operations of an arbitrary designated camera can be attained. When the selected camera is an uncontrollable camera, the rotation and zoom operation buttons are displayed in an inoperable state. The current value display window 88 displays the current values (the setting position, pan angle, tilt angle, and zoom value) of the selected camera.

For example, when a certain user wants to access (remote-control) a given camera, he or she double-clicks the camera icon indicating the target camera. In response to this operation, the camera control client 472 requests the right of operation of the target camera to the camera management server 468, and camera management server 468 permits the remote control (including a display of an image) of the camera when none of users are currently using the camera. On the other hand, when another user has already been operating the camera, the server 468 rejects the right of remote control. When the right of operation is permitted, an image output from the camera is displayed on the image window 84, and the operations (pan, tilt, and zoom operations) using the camera operation panel 86 can be performed.

In this embodiment, the addition, removal, movement, and change in initial direction of a camera managed by each terminal can be reflected in the initial setting file by a simple operation via the initial setting edit software program 474.

Figure 50:
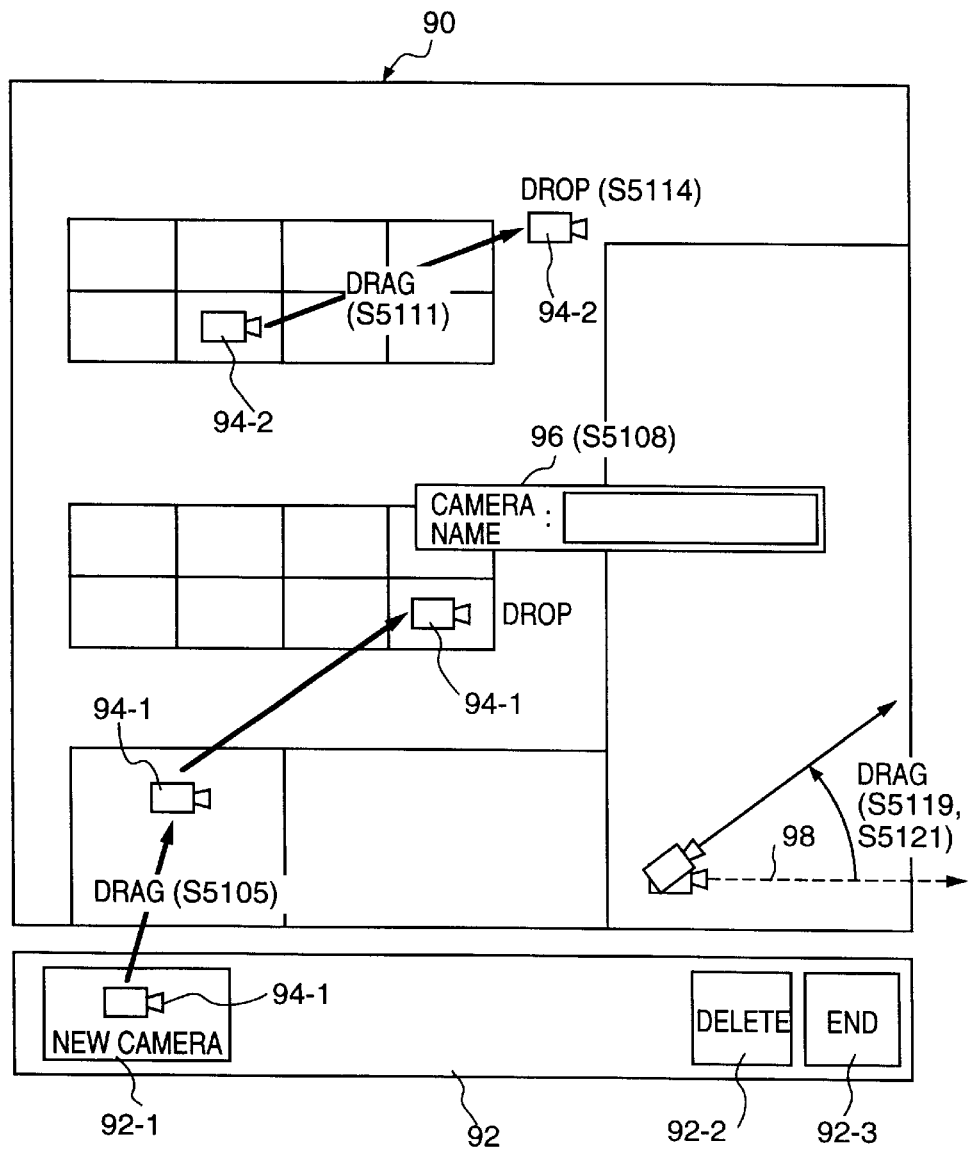
FIG. 50 is a view showing an example of the display screen of an initial setting edit software program 474.
Figure 51:
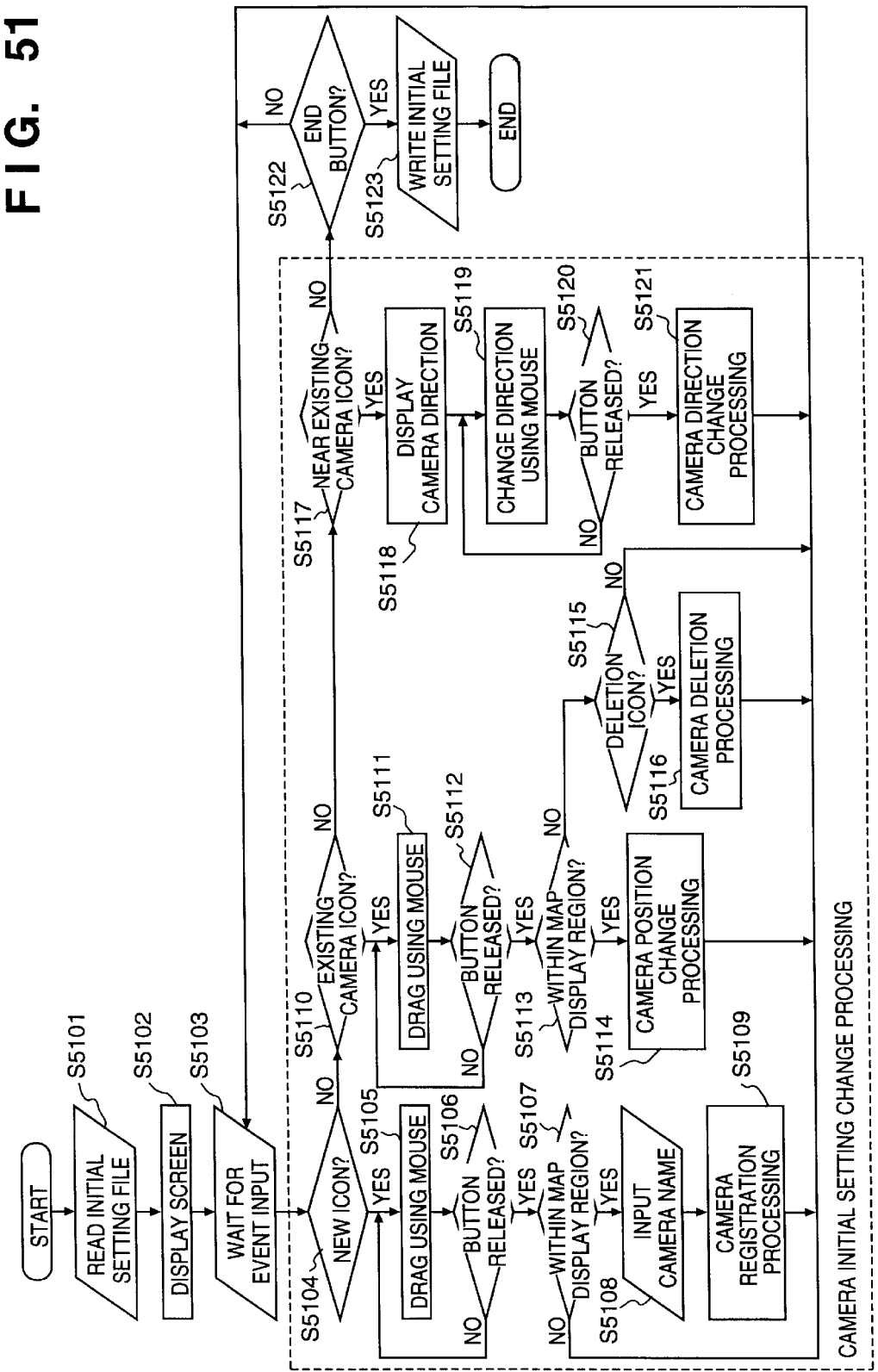
FIG. 51 is an operation flow chart of the initial setting edit software program 474 corresponding to FIG. 50.

FIG. 50 shows an example of the display screen of the initial setting edit software program 474, and FIG. 51 is an operation flow chart of the program 474. The same reference numerals in FIG. 50 denote the same operations corresponding to steps in FIG. 51. The initial setting edit software program 474 is started by the camera control client 470, but can be started independently.

The initial setting edit software program 474 reads the camera initial setting file shown in FIG. 48 when it is started (step S5101), and displays the camera layout map shown in FIG. 50 on the basis of information included in the read file (step S5102). Then, the program 474 enters an event waiting loop (step S5103). The contents of the camera initial setting file are held in the initial setting edit software program 474 as a camera initial setting list.

The display screen shown in FIG. 50 will be explained below. The display screen includes a map display section 90 and a command icon section 92. The map display section 90 superimpose-displays camera icons on the map in the same manner as the map window (FIG. 49) of the camera display control panel. The camera icons are disposed at the setting positions of the cameras registered in the initial setting file to point to their initial directions. The command icon section 92 displays a new icon 92-1 for adding a new camera, a deletion icon 92-2 for deleting an existing camera, and an end icon 92-3 for determining the change and ending the initial setting edit software program 474.

If some event has occurred in the event waiting loop, it is checked if the event requires processing (step S5104, S5110, S5117, S5122), and the corresponding processing is executed.

A case will be exemplified below wherein a new camera is set. In this case, a mouse button is depressed while the mouse cursor indicates the new icon 92-1 (step S5104). The initial setting edit software program 474 generates and displays a new camera icon denoted by reference numeral 94-1 in FIG. 50. The user moves the mouse cursor to a desired position while selecting the camera icon 94-1 (step S5105), and then releases the mouse button (step S5106). More the user drags the camera icon 94-1 to the desired position. If the release position of the mouse button falls outside the map region (step S5107), the flow returns to the event waiting loop; if the release position falls within the map region (step S5107), a dialog box 96 for inputting the camera name is displayed to prompt the user to input the camera name of the new camera (step S5108).

In this manner, the setting position and camera name of the new camera are determined, and are additionally registered in the camera initial setting list (step S5109)

When an existing camera is to be moved or removed, the following operation is performed. The camera icon (e.g., 94-2) of the camera to be moved or removed is selected (step S5110) and is dragged to the destination position in the case of movement or to the deletion icon 92-2 in the case of removal (step S5111). Then, the mouse button is released (step S5112). If the release position of the mouse button falls within the map region (step S5113), the camera setting position on the camera initial setting list is updated to the release position of the mouse button as a new camera setting position (step 5114). If the release position of the mouse button falls outside the map region (step S5113) and is located above the deletion button 92-2 (step S5115), information of the camera indicating the dragged camera icon is deleted from the camera initial setting list (step S5116). More specifically, all the pieces of information associated with the camera to be removed are deleted from the camera initial setting list. On the other hand, if the release position of the mouse button falls outside the map region (step S5113) and is not located above the deletion button 92-2 (step S5115), the camera icon is returned to the position before dragging, and the flow returns to the event waiting loop.

When the initial direction of a camera is to be changed, the following operation is performed. The mouse cursor is moved to a position in a surrounding portion (a circular region having the center of the camera icon as its central point and a predetermined radius) of the camera icon, the initial direction of which is to be changed, and the mouse button is depressed (step S5117). Upon depression of the mouse button, the initial setting edit software program 474 displays a dotted arrow 98 extending from the center of the camera icon as the start point in the current initial direction (step S5118). The direction of the arrow 98 indicates the pan angle, and its length indicates the tilt angle. By moving the mouse cursor while holding down the mouse button, the direction and length of the arrow 98 are changed (step 35119). When the arrow 98 has a required direction and length, the mouse button is released (step S5120). The changed direction and length become the initial values of the pan and tilt angles. Then, the contents of the camera direction on the camera initial setting list are changed (step S5121).

When the user wants to end the camera initial setting edit software program 474, he or she moves the mouse cursor to a position above the end button, and clicks the mouse button (step S5122). In response to this operation, the camera initial setting edit software program 474 updates the camera initial setting file with the information of the camera initial setting list held in the program (step S5123).

Thereafter, when the entire system is restarted, the contents changed in steps S5109, S5114, S5116, or S5121 are reflected in the respective software programs, i.e., the camera control server 466, the camera management server 468, and the camera control client 472. Using the initial setting edit software program 474, the user can visually and interactively create and change the initial setting file that describes the camera layout.

Figure 52:
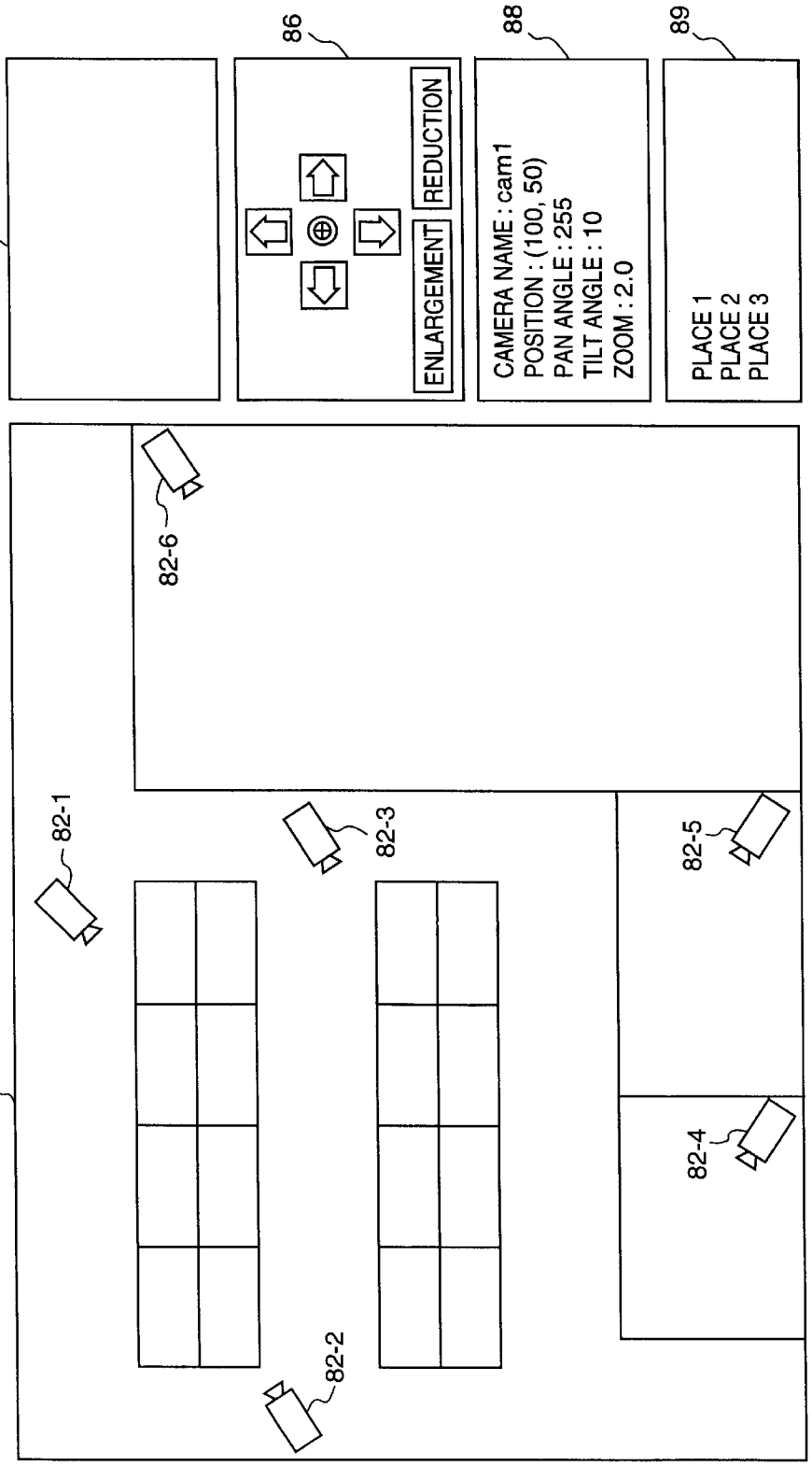
FIG. 52 is a view showing another example of the camera display control panel.

In consideration of a possibility that a large number of cameras are disposed at remote positions, e.g., cameras are disposed in different rooms or different floors, it is preferable to use a plurality of maps. For this purpose, a function of selecting a map can be added to the information shown in FIG. 49 as the camera display control panel displayed on the monitor 460 or 462 by the camera control client 472. FIG. 52 shows an example of such panel. The same reference numerals in FIG. 52 denote the same constituting elements as in FIG. 49. Reference numeral 89 denotes a map list display column for displaying a list of a plurality of maps. A selected one of the map s displayed in this list is displayed on the map window 80 together with camera icons indicating the cameras which are set th ere. Such a list may be displayed in the form of a menu on the upper portion of the screen or of a floating palette.

A plurality of pieces of map information are stored in, e.g., the camera management server 468, and the camera control client 472 receives the camera initial setting information and required maps from the camera management server 468 when it is started. The plurality of maps are managed, as shown in, e.g., FIG. 53. A map information file 5301 includes map number (ID) data, floor name data, bit-map file name data of map data, and the size of the bit-map data. The man information file 5301 is stored in the workstation 456 in which the camera management server 468 is installed. The camera management server reads this file 5301 upon starting, and holds it therein. The map information file and map data are transferred to the camera control client as needed.

An item of map names corresponding to the cameras must be added to the camera list managed by the camera management server 468. Similarly, an item of floor names corresponding to the cameras is added to the camera initial setting information stored as the camera initial setting file, as shown in FIG. 54. In this case, the floor name may be replaced by the map ID. On the camera display control panel, only cameras set on the maps displayed on the map window 80 can be selected and operated.

Figure 55:
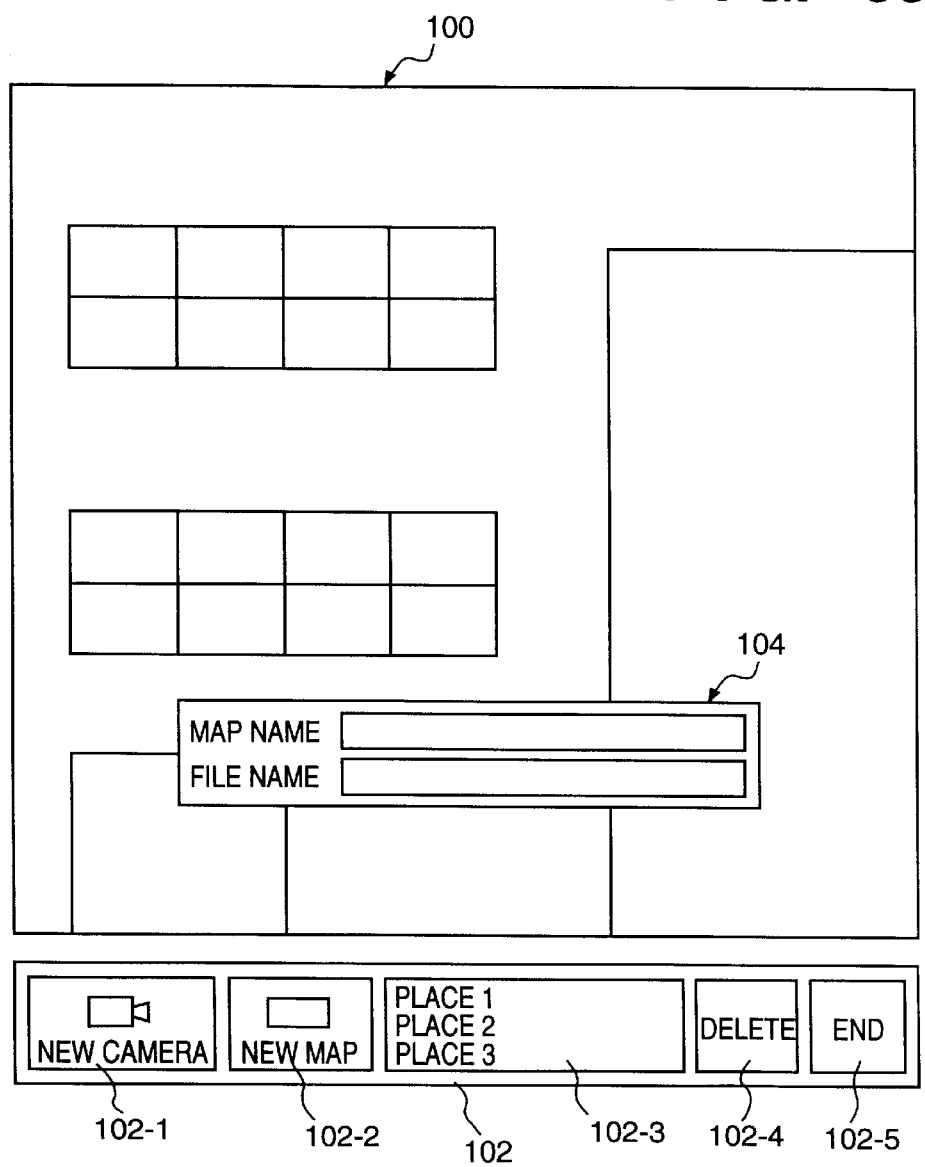
FIG. 55 is a view showing another example of the display screen of the initial setting edit software program 474.

In consideration of addition, removal, and movement of cameras, the function of adding and deleting a map is added to the initial setting edit software program 474. FIG. 55 shows the screen displayed when the function of the initial setting edit software program 474 is extended to accommodate this function. A map display section 100 displays a map in the same manner as in the map display section 90 shown in FIG. 50, and camera icons corresponding to the cameras to be set are superimpose-displayed on the map. Note that the map to be displayed in FIG. 55 is selected from the map list. A command icon section 102 displays a new icon 102-1 for adding a new camera, a new map icon 102-2 for adding a map, a map list display column 102-3 for displaying the map list, a deletion icon 102-4 for deleting a camera icon and a map, and an end icon 102-5 for determining a change and ending the initial setting edit software program 474.

Figure 56:
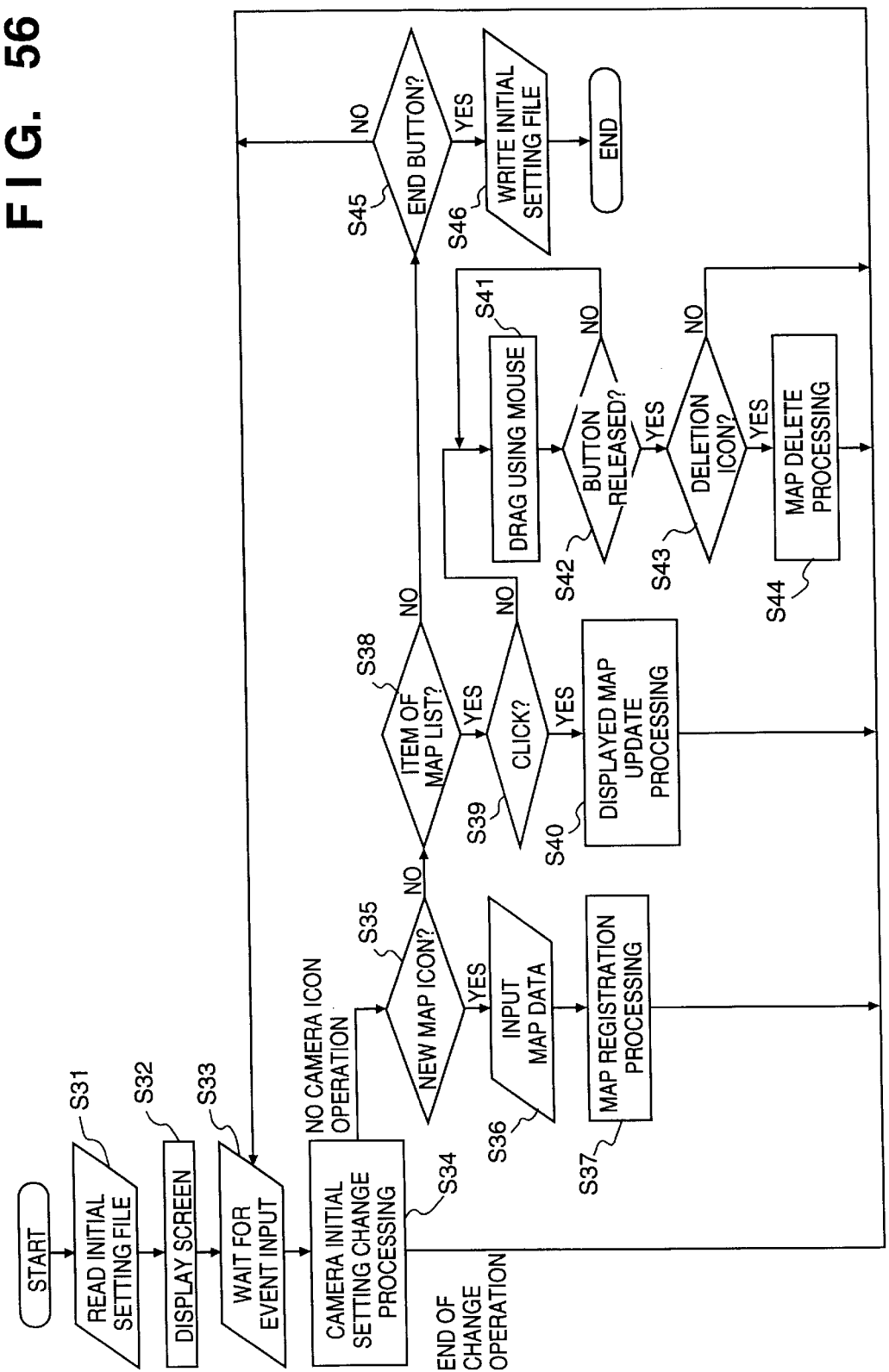
FIG. 56 is an operation flow chart of the initial setting edit software program 474 corresponding to FIG. 55.

FIG. 56 is an operation flow chart of the initial setting edit software program 474 whose function is extended, as described above. Note that common steps associated with the operation of the camera icon described above with reference to FIG. 51 are expressed as a single block S34, and a detailed description thereof will be omitted.

First, the map information file 5301 and a camera initial setting file 5401 which are saved in the formats shown in FIGS. 53 and are read (step S31), and the camera layout map shown in FIG. 55 is displayed based on the information contents in the files (step S32). Then, the control enters an event waiting loop (step S33). Note that the contents of the map information file 5301 and the camera initial setting file 5401 are respectively held as a map list and a camera initial setting list in the program.

If some event has been generated in the event waiting loop, it is checked if the event requires processing (steps S34, S35, S38, S45), and the corresponding processing is executed.

If the user clicks the new map icon 102-2 using the mouse cursor in the event waiting loop (step S35), a dialog box 104 (FIG. 55) is displayed to prompt the user to input the name of a map to be added and map information such as the bit-map file name (step S36). Upon completion of the input operation, the input information of the new map is added to the map list held in the program, and the changed map list is re-displayed on the map list display column 102-3 (step S37). Thus, the newly added map can be selected on the map list display column 102-3.

If the user depresses the mouse button on one of map names displayed on the map list display column 102-3 in the event waiting loop (step S38), the control enters the change processing of the displayed map or the deletion processing of the map. More specifically, when the user immediately releases the mouse button, the operation is considered as a clicking operation (step S39), and the map displayed on the map display section 100 is changed to the map selected on the map list display column 102-3 (step S40). When the mouse cursor is moved while holding down the mouse button (step S39), the map name selected on the map list display column 102-3 is moved upon movement (dragging) of the mouse cursor (step S41). When the mouse button is released at a position above the deletion icon 102-4 (steps S42, S43), the map name is deleted from the map list display column 102-3 (step S44). Of course, in order to prevent a deletion error, a dialog box for confirming deletion is displayed, and the information of the selected map is deleted from the map list under the confirmation of the user. At the same time, information of each camera present on the corresponding map is deleted. When the mouse button is released at a position other than that above the deletion icon 102-4 (step S43), no processing is performed, and the flow returns to the event waiting loop.

When the user depresses the mouse button while setting the mouse cursor above the end button 102-5 (step S45), the contents of the initial setting information are saved in the initial setting file, and the program ends (step S46). The contents of the initial setting information are classified into information associated with the maps shown in FIG. 53 and information associated with the cameras shown in FIG. 54, and are respectively saved in the map information file 5301 and the camera initial setting file 5401. In order to validate the changed information, the entire system must be restarted.

Figure 57:
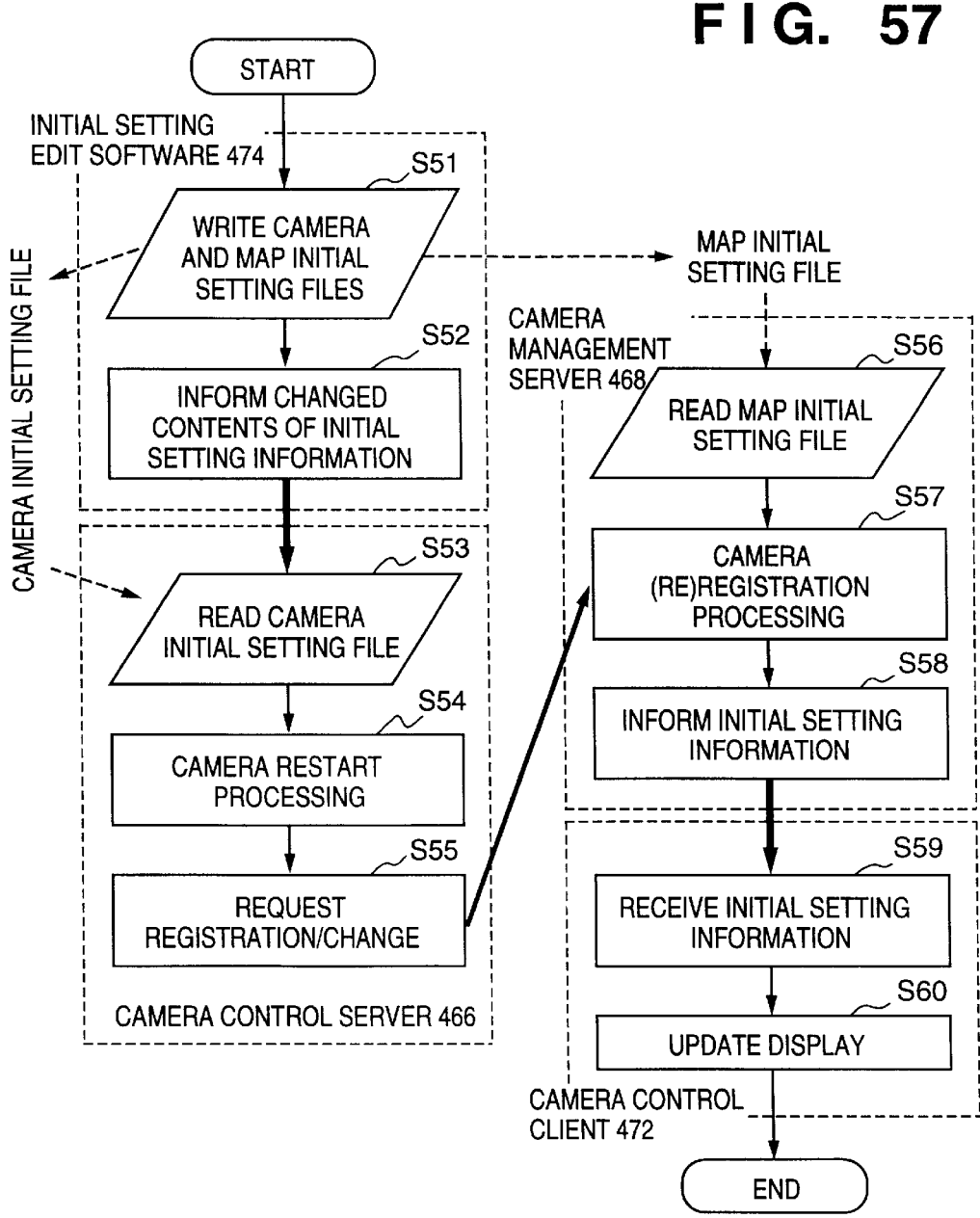
FIG. 57 is a flow chart showing the sequence for validating a system change without restarting the system.

In order to validate the changed contents of the initial setting information without restarting the system, when the initial setting information is changed, the changed contents are informed to the camera management server 468, and the camera management server 468 informs the camera control clients 472 of them. FIG. 57 shows this information sequence. FIG. 57 illustrates the sequence in which the initial setting edit software program 474, the camera control server 466, the camera management server 468, and the camera control client 472 inform each other of the changed contents of the initial setting information of the system via communications using the network.

As has been described above with reference to FIG. 56, the initial setting edit software program 474 writes the changed initial setting information in the camera initial setting file 5401 and the map information file 5301 (step S51). The camera initial setting file 5401 may be divisionally saved in the respective camera control servers 466 or may be saved as a single file. The file 5401 may be saved in the secondary memory of any terminal connected to the network. Normally, the file 5401 may be saved in the secondary memory of the terminal in which the camera management server 468 is installed.

The initial setting edit software program 474 informs, of the changed initial setting information, the camera management server 468 and the camera control server (or servers) 466 on the terminal to which the camera corresponding to the changed information is connected, and ends the processing (step S52). The present invention is not particularly limited to the information method. For example, a socket communication using an RPC (Remote Procedure Call) or TCP/IP may be used. The same applies to the inter-process communications in the subsequent processing, and the communication method is not limited to a specific method.

Upon receiving the changed initial setting information, the camera management server 468 reads the map information file 5301, and updates the map list in the file (step S56). On the other hand, the camera control server 466 reads the camera initial setting file 5401 (step S53), and if a new camera is connected under the control of the server 466, the server 466 attempts to start the newly connected camera (step S54). If the camera is successfully started, the server 466 requests registration of the new camera to the camera management server 468 (step S55). When the power switch of the camera is not turned on, starting of the camera fails. In this case, the server 466 does not request registration of this camera to the camera management server 468. When the position (and direction) of an existing camera is changed, the camera control server 466 which controls the camera of interest informs re-registration of the new setting position (and direction) to the camera management server 468 (step S55).

Upon receiving the registration or re-registration request from the camera control server 466, the camera management server 468 updates information associated with the initial setting information in the camera list (step S57). Thereafter, the server 468 informs all the camera control clients 472 of the changed contents of the system, and transmits new initial setting information (step S58)

Upon receiving the changed contents of the system, each camera control client 472 updates its display state on the basis of the received initial setting information (step 60).

In this manner, changed contents of the initial setting information can be validated without stopping or restarting the system As can be easily understood from the above description, according to the system of this embodiment, the user can easily change initial setting information associated with the camera layout and the map to be used. In this case, the operability can be improved using a user interface which is easily understood.

Any changed result of the initial setting information can be automatically reflected in the display state of each camera control client without stopping the system.

The present invention is not limited to the above embodiments and various changes and modifications can be made within the spirit and scope of the present invention. Therefore, to apprise the public of the scope of the present invention, the following claims are made.

What is claimed is:

1. A controller for controlling an image input unit, comprising:

image display means for displaying an image from the image input unit;

map display means for displaying a map including a target image input region of the image input unit, and displaying, on the map, the input unit as a predetermined symbol in correspondence with a position of the image input unit;

operation means for permitting a user to directly point at the symbol on the map for changing a display state of the symbol and to drag the symbol on the map, by using a pointing device;

command generation means for generating a command for controlling the image input unit in accordance with a result of the operation of the symbol by said operation means; and output means for outputting a control command to the input image unit.

2. The controller according to claim 1, wherein said output means controls a pan angle, a tilt angle, a zoom ratio, and a focal length of the selected input unit.

3. The controller according to claim 2, wherein when said operation means changes a direction of the symbol, the pan angle of the selected input unit is controlled by said control means in correspondence with the direction of the symbol.

4. The controller according to claim 2, wherein when said operation means changes the tilt angle of the selected input unit corresponding to the symbol, a control command for controlling the tilt angle of the selected input unit is outputted by said output means.

5. The controller according to claim 2, wherein when said operation means changes the zoom ratio of the selected input unit corresponding to the symbol, a control command for controlling the zoom ratio of the selected input unit is outputted by said output means.

6. The controller according to claim 2, wherein when said operation means changes the focal length of the selected input unit corresponding to the symbol, a command for controlling the focal length of the selected input unit is outputted by said output means.

7. The controller according to claim 2, wherein said operation means switches an operation mode among a mode for changing the focal length of the input unit, a mode for changing the tilt angle of the input unit, and a mode for changing the zoom ratio of the input unit, and allows a desired operation in the selected mode.

8. The controller according to claim 2, wherein said map display means displays a state of each of the at least one input unit.

9. The controller according to claim 8, wherein said map display means displays a maximum field angle and a maximum pan angle of each of the input units using a predetermined pattern having the symbol corresponding to the input unit as a center.

10. The controller according to claim 9, wherein the predetermined pattern is a fan shape having the symbol as the center.

11. The controller according to claim 1, wherein said map display means displays the symbol of the selected input unit to be identifiable from the symbol of the non-selected input unit.

12. The controller according to claim 11, further comprising selection means selects an input unit corresponding to the symbol closest to a point designated on the map.

13. The controller according to the claim 12, further comprising state display means for displaying a state of the input unit selected by selection means.

14. The controller according to claim 13, wherein said state display means displays the position, pan angle, tilt angle, and zoom ratio of the selected input unit.

15. The controller according to claim 1, further comprising arrangement operation means for changing the map display by said map display means in correspondence with a state of an arrangement of the controller.

16. The controller according to claim 15, wherein said arrangement operation means performs addition, deletion, and a change of position of the symbols corresponding to the input units in correspondence with the input units included in said image input means.

17. The controller according to claim 1, further comprising connection means for interconnecting said controller with another controller via a network.

18. The controller according to claim 1, wherein said operation means changes the state of the symbol without using the image input unit.

19. The controller according to claim 18, wherein said command generation means generates the command for controlling the image input unit so as to correspond to the state of the input unit with the state of the symbol changed by said operation means.

20. A controller for controlling an image input operation, comprising:

image input means including at least one externally controllable input unit;

selection means for selecting one from the at least one input unit, and receiving an image input from the selected input unit;

image display means for displaying the image input from the input unit selected by said selection means;

map display means for displaying a map indicating a target image input region of said image input means, and displaying, on the map, each of the at least one input unit as a predetermined symbol in correspondence with a position of the input unit;

operation means for dragging the symbol on a display screen in accordance with an operation by a user, and when said operation means changes a direction of the symbol, a pan angle of the input unit is controlled in correspondence with the direction of the symbol, said operation means comprises coordinate indication means for indicating a desired coordinate position on the display screen of said map display means and determines a direction connecting the symbol corresponding to the selected input unit and the desired coordinate position indicated by said coordinate indication means as a change direction of the symbol, and said map display means displays the changed direction using a straight line; and output means for outputting a control command to the selected input unit so as to control the selected input unit corresponding to the operated symbol in accordance with an operation result of the symbol by said operation means, said output means controls the pan angle, a tilt angle, a zoom ratio, and a focal length of the input unit.

21. A controller for controlling an image input operation, comprising:

image input means including at least one externally controllable input unit;

selection means for selecting one from the at least one input unit, and receiving an image input from the selected input unit;

image display means for displaying the image input from the input unit selected by said selection means;

map display means for displaying a map indicating a target image input region of said image input means, and displaying, on the map, each of the at least one input unit as a predetermined symbol in correspondence with a position of the input unit;

operation means for dragging the symbol on a display screen in accordance with an operation by a user, when said operation means changes a tilt angle of the input unit corresponding to the symbol, said operation means comprises coordinate indication means for indicating a desired coordinate position on the display screen of said map display means and determines the changed tilt angle of the selected input unit corresponding to the symbol in correspondence with the position of the desired coordinate position indicated by said coordinate indication means with respect to a position of the symbol corresponding to the selected input unit; and output means for outputting a control command to the selected input unit so as to control the selected input unit corresponding to the operated symbol in accordance with an operation result of the symbol by said operation means, said output means controls a pan angle, a zoom ratio, and a focal length of the selected input unit.

22. A controller for controlling an image input operation, comprising:

image input means including at least one externally controllable input unit;

selection means for selecting one from the at least one input unit, and receiving an image input from the selected input unit;

image display means for displaying the image input from the input unit selected by said selection means;

map display means for displaying a map indicating a target image input region of said image input means, and displaying, on the map, each of the at least one input unit as a predetermined symbol in correspondence with a position of the input unit;

operation means for dragging the symbol on a display screen in accordance with an operation by a user, when said operation means changes a zoom ratio of the input unit corresponding to the symbol, a control command for controlling the zoom ratio of the input unit is outputted, said operation means comprises coordinate, indication means for indicting a desired coordinate position on the display screen of said map display means, said coordinate indication means designates an angle defined between two half lines having the symbol corresponding to the selected input unit as a central line, and the changed zoom ratio of the input unit corresponding to the symbol is determined in correspondence with the designated angle; and output means for outputting a control command to the selected input unit so as to control the selected input unit corresponding to the operated symbol in accordance with an operation result of the symbol by said operation means, said output means controls a pan angle, a tilt angle, the zoom ratio, and a focal length of the input unit.

23. A controller for controlling an image input operation, comprising: image input means including at least one externally controllable input unit;

selection means for selecting one from the at least one input unit, and receiving an image input from the selected input unit;

image display means for displaying the image input from the input unit selected by said selection means;

map display means for displaying a map indicating a target image input region of said image input means, and displaying, on the map, each of the at least one input unit as a predetermined symbol in correspondence with a position of the input unit;

operation means for dragging the symbol on a display screen in accordance with an operation by a user, when said operation means changes a focal position of the selected input unit corresponding to the symbol, a command for controlling the focal position of the selected input unit is outputted, said operation means comprises coordinate indication means for indicating a desired coordinate position on the display screen of said map display means and determines a distance from the symbol corresponding to the selected input unit to the desired coordinate position indicated by said coordinate indication means as the changed focal position and output means for outputting a control command to the selected input unit so as to control the selected input unit corresponding to the operated symbol in accordance with an operation result of the symbol by said operation means, said output means controls a pan angle, a tilt angle, a zoom ratio, and the focal length of the selected input unit.

24. A camera controller comprising:

image display means for displaying an input image from a camera;

map display means for displaying a map of a region where the cameras are disposed, and displaying, on the map, the camera as a predetermined symbol in correspondence with a position of the camera;

operation means for permitting a user to directly point at the symbol on the map for changing a display state of the symbol and to drag the symbol on the map, by using a pointing device;

command generation means for generating a command for controlling the camera in accordance with a result of the operation of the symbol by said operation means; and output means for outputting a control command to the camera.

25. The controller according to claim 24, wherein said output means outputs a command for controlling a pan angle, a tilt angle, a zoom ratio, and a focal length of the camera.

26. The controller according to claim 24, further comprising means for maintaining the symbol corresponding to the camera on the map displayed by said map display means in correspondence with a state of an arrangement of said controller.

27. The controller according to claim 24, wherein said operation means changes the state of the symbol without using the camera.

28. The controller according to claim 27, wherein said command generation means generates the command for controlling the camera so as to correspond to the state of the camera with the state of the symbol changed by said operation means.

29. A camera controller comprising:

at least one externally controllable camera;

selection means for selecting one of the cameras and receiving an image input from the selected camera;

image display means for displaying the image input from the camera selected by said selection means;

map display means for displaying a map of a region where the cameras are disposed, and displaying, on the map, each of the cameras as a predetermined symbol in correspondence with a position of the camera, said map display means displays, on the map, a current field angle and a maximum pan angle of each of the at least one camera using a fan shape having the symbol corresponding to the camera as a center;

operation means for operating the symbol on a display screen; and control means for controlling the camera corresponding the operated symbol in accordance with an operation result of the symbol.

30. A camera control method for controlling a camera, comprising the steps of:

displaying a map, and displaying a symbol of a camera on the map in correspondence with a position of the camera;

displaying an input image input from the camera;

permitting a user to directly point at the symbol on the map for changing a display state of the symbol and to drag the symbol on the map, by using a pointing device; and changing a state of the camera including a pan angle of the camera in accordance with a result of the direct operation of the symbol on the map.

31. The method according to claim 30, further comprising, before the change step, the step of setting an operation mode, and wherein the change step includes the step of changing one of a focal length, a zoom ratio, and a tilt angle in correspondence with the operation mode.

32. The method according to claim 30, wherein the change step includes the step of changing a state of the camera in correspondence with an operation of the symbol of the camera by coordinate input means.

33. The method according to claim 30, wherein a focal length and the pan angle are set upon selection of the symbol in the selection step.

34. The method according to claim 30, wherein the display step includes the step of displaying the symbol of each of the cameras in correspondence with control characteristics of the camera corresponding to the symbol.

35. The method according to claim 34, wherein the display step includes the step of displaying the symbol of each of the cameras together with a maximum pan angle and a current field angle of the camera corresponding to the symbol if the control characteristics of the camera allow rotation and zoom operations, and displaying the symbol of each of the cameras together with the current field angle if the control characteristics of the camera do not allow rotation and zoom operations.

36. The controller according to claim 30, wherein said change step changes a state of the camera so as to correspond the state of the camera is changed with the state of the symbol changed by the dragging operation.

37. The method according to claim 30, further comprising the steps of:

setting a direction of the symbol of the camera as an initial sensing direction of the camera, and storing information about a map edited and the direction of the symbol of the camera as a map edited file.

38. The method according to claim 37, wherein the initial sensing direction of the camera is set by dragging the symbol of the camera.

39. A camera control method for controlling a remote camera, comprising:

the display step of displaying a map, and displaying symbols of cameras on the map;

the selection step of selecting a desired symbol from the symbols;

the step of displaying an image input from the camera corresponding to the symbol selected in the selection step, the symbol selected in the selection step is displayed together with an auxiliary line used for operating a state of the camera corresponding to the symbol, and the state is changed by operating the auxiliary line by coordinate input means; and the change step of changing a state including a pan angle of the camera selected in the selection step.

40. A camera control method for controlling a remote camera, comprising:

the display step of displaying a map, and displaying symbols of cameras on the map;

the selection step of selecting a desired symbol from the symbols;

the step of displaying an image input from the camera corresponding to the symbol selected in the selection step, the symbol selected in the selection step is displayed together with an auxiliary line used for operating a state of the camera corresponding to the symbol, and the state is changed by operating the auxiliary line by coordinate input means, the auxiliary line includes zoom lines representing a tilt angle and a tilt line indicating a tilt angle and the change step of changing a state including a pan angle of the camera selected in the selection step.

41. A camera controller comprising:

image display means for displaying the image input from a camera;

symbol display means for displaying the camera as a predetermined symbol and current field angle and maximum pan angle of the camera using a fan shape having the symbol corresponding to the camera as a center;

operation means for operating the symbol on a display screen; and control means for controlling the camera corresponding to the operated symbol in accordance with an operation result of the symbol.

42. A camera controlling method comprising the steps of:

displaying the image input from a camera;

displaying the camera as a predetermined symbol and current field angle and maximum pan angle of the camera using a fan shape having the symbol corresponding to the camera as a center;

operating the symbol on a display screen; and controlling the camera corresponding to the operated symbol in accordance with an operation result of the symbol.

43. A controller for controlling an image input unit, comprising:

a display control device arranged to display an image from the image input unit and a symbol which indicates a position of the image input unit on a map;

a control device arranged to permit a user to directly point at the symbol for changing a display state of the symbol and to drag the symbol on the map, by using a pointing device; and an output device arranged to output a control command, which is generated on the basis of changing a display state of the symbol, for controlling the image input unit.

44. A controller according to claim 43, wherein the control command is a command for controlling an image pickup direction of the image input unit.

45. A controller according to claim 43, wherein the control command is a command for controlling a zoom of the image input unit.

46. A controller according to claim 43, wherein the control command is a command for controlling a focus of the image input unit.

47. The controller according to claim 43, wherein said control device sets a direction of the symbol of the image input unit as an initial sensing direction of the image input unit, and further comprising a storing device that stores information about a map edited and the direction of the symbol of the image input unit as a map edited file.

48. The controller according to claim 47, wherein said control device sets the initial sensing direction of the image input unit by dragging the symbol of the image input unit.

49. The controller according to claim 45, wherein said control device sets a direction of the symbol of the image input unit as an initial sensing direction of the image input unit, and further comprising a storing device that stores information about a map edited and the direction of the symbol of the image input unit as a map edited file.

50. The controller according to claim 49, wherein said control device sets the initial sensing direction of the image input unit by dragging the symbol of the image input unit.

51. A camera control apparatus for controlling a remote camera, comprising:

a display unit for displaying a map, and displaying symbols of cameras on the map;

a selection unit for permitting a user select a desired symbol from the symbols;

a display control unit for displaying an image input from the camera corresponding to the symbol selected by said selection unit, the symbol selected by said selection unit is displayed together with an auxiliary line used for operating a state of the camera corresponding to the symbol, and the state is changed by operating the auxiliary line by a coordinate input unit; and a change unit for permitting a user to change a state including a pan angle of the camera selected by said selection unit.

52. The apparatus according to claim 51, wherein said auxiliary line is a line which indicates photographing optical axis of camera.

53. The apparatus to claim 51, wherein said display control unit changes the state of the symbol in accordance with the operation of the auxiliary line.

54. A computer program product comprising a computer readable medium having computer program code for controlling a remote camera, said product comprising:

displaying process procedure code for displaying a map, and displaying symbols of cameras on the map;

selecting process procedure code for permitting a user to select a desired symbol from the symbols;

display controlling process procedure code for displaying an image input from the camera corresponding to the symbol selected by said selecting process procedure code, the symbol selected by said selecting process procedure code is displayed together with an auxiliary line used for operating a state of the camera corresponding to the symbol, and the state is changed by operating the auxiliary line by a coordinate input process; and changing a process procedure code for permitting a user to change a state including a pan angle of the camera selected by said selecting process procedure code.

55. The computer program product according to claim 54, wherein said auxiliary line is a line which indicates photographing optical axis of the camera.

56. The computer program product according to claim 54, wherein said display controlling process procedure code changes the state of the symbol in accordance with the operation of the auxiliary line.

57. A control method for controlling an image input unit, comprising:

a displaying step of displaying an image from the image input unit and a symbol which indicates a position of the image input unit on a map;

a pointing step of permitting a user to directly point at the symbol for changing a display state of the symbol and to drag the symbol on the map, by using a pointing device; and an outputting step of outputting a control command, which is generated on the basis of changing a display state of the symbol, for controlling the image input unit.

58. A control method according to claim 57, wherein the control command is a command for controlling an image pickup direction of the image input unit.

59. A control method according to claim 57, wherein the control command is a command for controlling a zoom of the image input unit.

60. A control method according to claim 57, wherein the control command is a command for controlling a focus of the image input unit.

61. A computer program product comprising a computer readable medium having a computer program code for controlling an image input unit, said product comprising:

displaying process procedure code for displaying an image from the image input unit and a symbol which indicates a position of the image input unit on a map;

pointing process procedure code for permitting a user to directly point at the symbol for changing a display state of the symbol and to drag the symbol on the map, by using a pointing device; and outputting process procedure code for outputting a control command, which is generated on the basis of changing a display state of the symbol, for controlling the image input unit.

62. A computer program according to claim 61, wherein the control command is a command for controlling an image pickup direction of the image input unit.

63. A computer program product according to claim 61, wherein the control command is a command for controlling a zoom of the image input unit.

64. A computer program product according to claim 61, wherein the control command is a command for controlling a focus of the image input unit.

65. A controller for controlling an image input unit, comprising:

a display control device arranged to display an image from the image input unit and a symbol which indicates a position and state of the image input unit on a map;

a control device arranged to permit a user to directly point and drag the symbol for changing a display state of the symbol on the map, by using a pointing device; and an output device arranged to output a control command, related to a change of the display state of the symbol, for controlling the image input unit.

66. A controller according to claim 65, wherein the control command is a command for controlling an image pickup direction of the image input unit.

67. A controller according to claim 65, wherein the control command is a command for controlling a zoom of the image input unit.

68. A controller according to claim 65, wherein the control command is a command for controlling a focus of the image input unit.

69. A control method for controlling an image input unit, comprising:

a displaying step of displaying an image from the image input unit and a symbol which indicates a position and a state of the image input unit on a map;

a pointing step of permitting a user to directly point and drag the symbol for changing a display state of the symbol on the map, by using a pointing device; and an outputting step of outputting a control command, related to a change of the display state of the symbol, for controlling the image input unit.

70. A control method according to claim 69, wherein the control command is a command for controlling an image pickup direction of the image input unit.

71. A control method according to claim 69, wherein the control command is a command for controlling a zoom of the image input unit.

72. A control method according to claim 69, wherein the control command is a command for controlling a focus of the image input unit.

73. A computer program product comprising a computer readable medium having a computer program code for controlling an image input unit, said product comprising:

displaying process procedure code for displaying an image from the image input unit and a symbol which indicates a position and state of the image input unit on a map;

pointing process procedure code for permitting a user to directly point and drag the symbol for changing a display state of the symbol on the map, by using a pointing device; and outputting process procedure code for outputting a control command, related to a change of the display state of the symbol, for controlling the image input unit.

74. A computer program according to claim 73, wherein the control command is a command for controlling an image pickup direction of the image input unit.

75. A computer program according to claim 73, wherein the control command is a command for controlling a zoom of the image input unit.

76. A computer program according to claim 73, wherein the control command is a command for controlling a focus of the image input unit.

* * * * *

UNITED STATES PATENT AND TRADEMARK OFFICE
CERTIFICATE OF CORRECTION

PATENT NO. : 6,680,746 B2
APPLICATION NO. : 08/563703
DATED : January 20, 2004
INVENTOR(S) : Kawai et al.

Page 1 of 1

It is certified that error appears in the above-identified patent and that said Letters Patent is hereby corrected as shown below:

Title Page, Item [73] Assignee: Replace "Canon Kabushiki Kaisha (JP)" with --Canon Kabushiki Kaisha, Tokyo (JP)--

Claim 22, Col. 35, line 36: "indicating means for indicting a desired coordinate position" should read --indicating means for indicating a desired coordinate position--

Claim 40, Col. 38, line 17: insert --;-- between "angle" and "and".

Signed and Sealed this

Twenty Second Day of April, 2008

JON W. DUDAS
*Director of the United States Patent and Trademark Office*